United States Patent
Ueno et al.

(10) Patent No.: US 9,010,942 B2
(45) Date of Patent: *Apr. 21, 2015

(54) MOBILE ELECTRONIC DEVICE AND IMAGE PROJECTION UNIT

(75) Inventors: Yasuhiro Ueno, Yokohama (JP); Shigeki Tanabe, Yokohama (JP)

(73) Assignee: Kyocera Corporation, Kyoto-Shi, Kyoto (JP)

( * ) Notice: Subject to any disclaimer, the term of this patent is extended or adjusted under 35 U.S.C. 154(b) by 164 days.

This patent is subject to a terminal disclaimer.

(21) Appl. No.: 13/699,443

(22) PCT Filed: May 27, 2011

(86) PCT No.: PCT/JP2011/062291
§ 371 (c)(1),
(2), (4) Date: Nov. 21, 2012

(87) PCT Pub. No.: WO2011/149092
PCT Pub. Date: Dec. 1, 2011

(65) Prior Publication Data
US 2013/0063646 A1    Mar. 14, 2013

(30) Foreign Application Priority Data

| May 27, 2010 | (JP) | 2010-122087 |
| May 27, 2010 | (JP) | 2010-122088 |
| May 27, 2010 | (JP) | 2010-122089 |
| May 27, 2010 | (JP) | 2010-122090 |

(51) Int. Cl.
*G03B 21/14*    (2006.01)
*H04N 5/225*    (2006.01)
(Continued)

(52) U.S. Cl.
CPC .............. *H04N 5/225* (2013.01); *G03B 21/142* (2013.01); *G03B 21/26* (2013.01); *G03B 29/00* (2013.01);
(Continued)

(58) Field of Classification Search
CPC ...... G03B 21/00; G03B 21/14; H04N 9/3194; H04N 9/3197; H04N 5/74; H04N 9/3147; H04N 9/3185; H04M 1/0272; H04M 1/0202; H04M 1/72522
USPC ............... 353/15, 69, 70, 94, 121; 455/556.1, 455/556.2; 348/42, 51, 69, 743–747
See application file for complete search history.

(56) References Cited

U.S. PATENT DOCUMENTS 7,016,711 B2    3/2006  Kurakane
7,114,813 B2 *  10/2006  Wada et al. ..................... 353/70
(Continued)

FOREIGN PATENT DOCUMENTS

| JP | 9319556 A | 12/1997 |
| JP | 2001133728 A | 5/2001 |

(Continued)

OTHER PUBLICATIONS

International Search Report and Written Opinion corresponding to PCT/JP2011/062291, dated Aug. 30, 2011.

(Continued)

*Primary Examiner* — Sultan Chowdhury
(74) *Attorney, Agent, or Firm* — Lowe Hauptman & Ham LLP

(57) ABSTRACT

According to an aspect, a mobile electronic device includes an image projecting unit and a processing unit. The image projecting unit projects an image to a projection area. The processing unit is configured to acquire information for a second image related to a first image placed in the projection area, and cause the image projecting unit to project the second image based on the information acquired.

18 Claims, 31 Drawing Sheets

(51) Int. Cl.
*G03B 21/26* (2006.01)
*G03B 29/00* (2006.01)
*G06F 1/16* (2006.01)
*H04M 1/02* (2006.01)
*H04N 9/31* (2006.01)
*G06F 3/147* (2006.01)
*G09G 3/00* (2006.01)

(52) U.S. Cl.
CPC ........... *G06F 1/1639* (2013.01); *H04M 1/0272* (2013.01); *H04N 9/3173* (2013.01); *H04N 9/3194* (2013.01); *G06F 1/1616* (2013.01); *G06F 3/147* (2013.01); *G09G 3/002* (2013.01); *G09G 2358/00* (2013.01)

(56) References Cited

U.S. PATENT DOCUMENTS

| | | | |
|---|---|---|---|
| 7,237,911 B2 * | 7/2007 | Yamada | 353/121 |
| 7,860,587 B2 | 12/2010 | Berg et al. | |
| 8,322,862 B2 * | 12/2012 | Nara | 353/69 |
| 2002/0108108 A1 | 8/2002 | Akaiwa et al. | |
| 2008/0043205 A1 * | 2/2008 | Lonn | 353/69 |
| 2009/0086173 A1 * | 4/2009 | Combs et al. | 353/122 |
| 2009/0174868 A1 * | 7/2009 | Matsuda | 353/69 |
| 2009/0207322 A1 * | 8/2009 | Mizuuchi et al. | 348/745 |
| 2011/0231909 A1 | 9/2011 | Shibuya | |

FOREIGN PATENT DOCUMENTS

| | | | |
|---|---|---|---|
| JP | 2001211372 A | 8/2001 | |
| JP | 2001249924 A | 9/2001 | |
| JP | 20028064 A | 1/2002 | |
| JP | 2002358062 A | 12/2002 | |
| JP | 2002358063 A | 12/2002 | |
| JP | 2003152851 A | 5/2003 | |
| JP | 2003215707 A | 7/2003 | |
| JP | 2003241793 A | 8/2003 | |
| JP | 2004120698 A | 4/2004 | |
| JP | 2005222544 A | 8/2005 | |
| JP | 2005-258162 A | 9/2005 | |
| JP | 2005258751 A | 9/2005 | |
| JP | 2005300971 A | 10/2005 | |
| JP | 2006295779 A | 10/2006 | |
| JP | 2007096542 A | 4/2007 | |
| JP | 2008090285 A | 4/2008 | |
| JP | 2008252487 A | 10/2008 | |
| JP | 2009175529 A | 8/2009 | |
| WO | 2009034696 A1 | 3/2009 | |

OTHER PUBLICATIONS

Office Action mailed Dec. 3, 2013, corresponds to Japanese patent application No. 2010-122087, for which an explanation of relevance is attached.

Office Action mailed Dec. 10, 2013, corresponds to Japanese patent application No. 2010-122088, for which an explanation of relevance is attached.

Office Action mailed Dec. 10, 2013, corresponds to Japanese patent application No. 2010-122089, for which an explanation of relevance is attached.

Office Action mailed Dec. 10, 2013, corresponds to Japanese patent application No. 2010-122090, for which an explanation of relevance is attached.

Office Action mailed Jul. 8, 2014, corresponding to Japanese patent application No. 2010-122087, for which an explanation of relevance is attached.

Office Action drafted Oct. 29, 2014, corresponding to Japanese patent application No. 2010-122087, for which an explanation of relevance is attached.

* cited by examiner

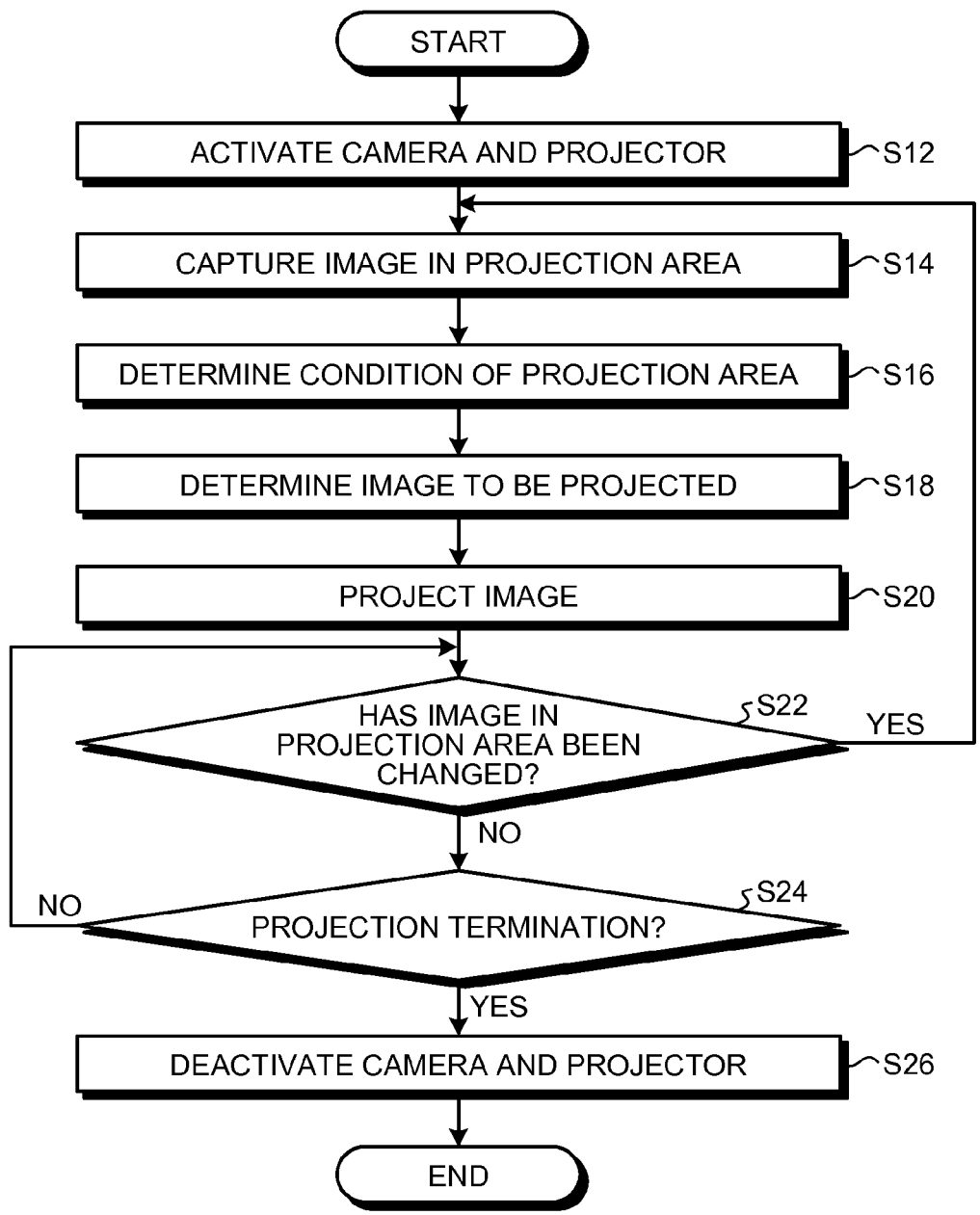

One day, an old man and an old woman went firewood gathering in the woods.

One day, an old man and an old woman went firewood gathering in the woods.

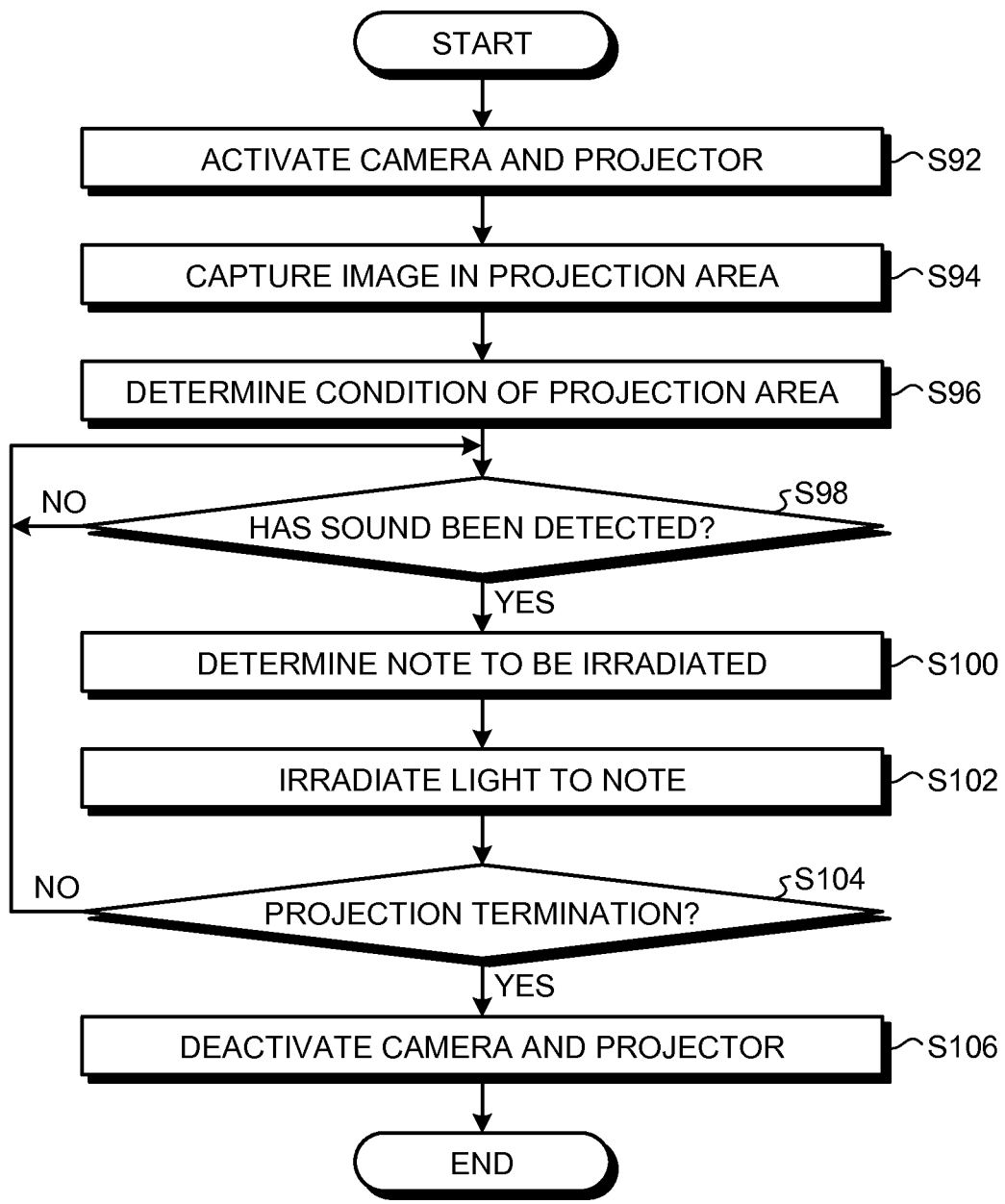

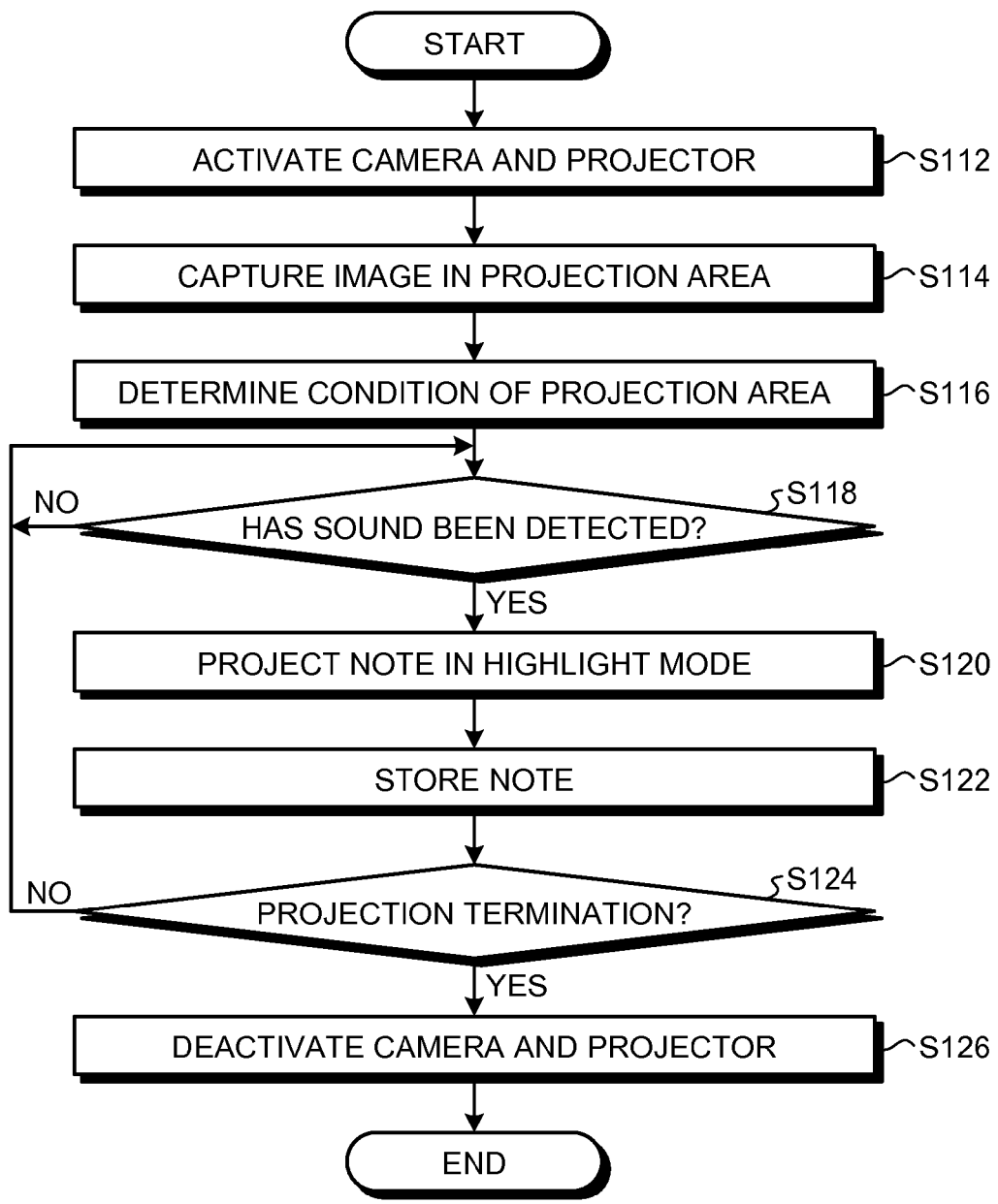

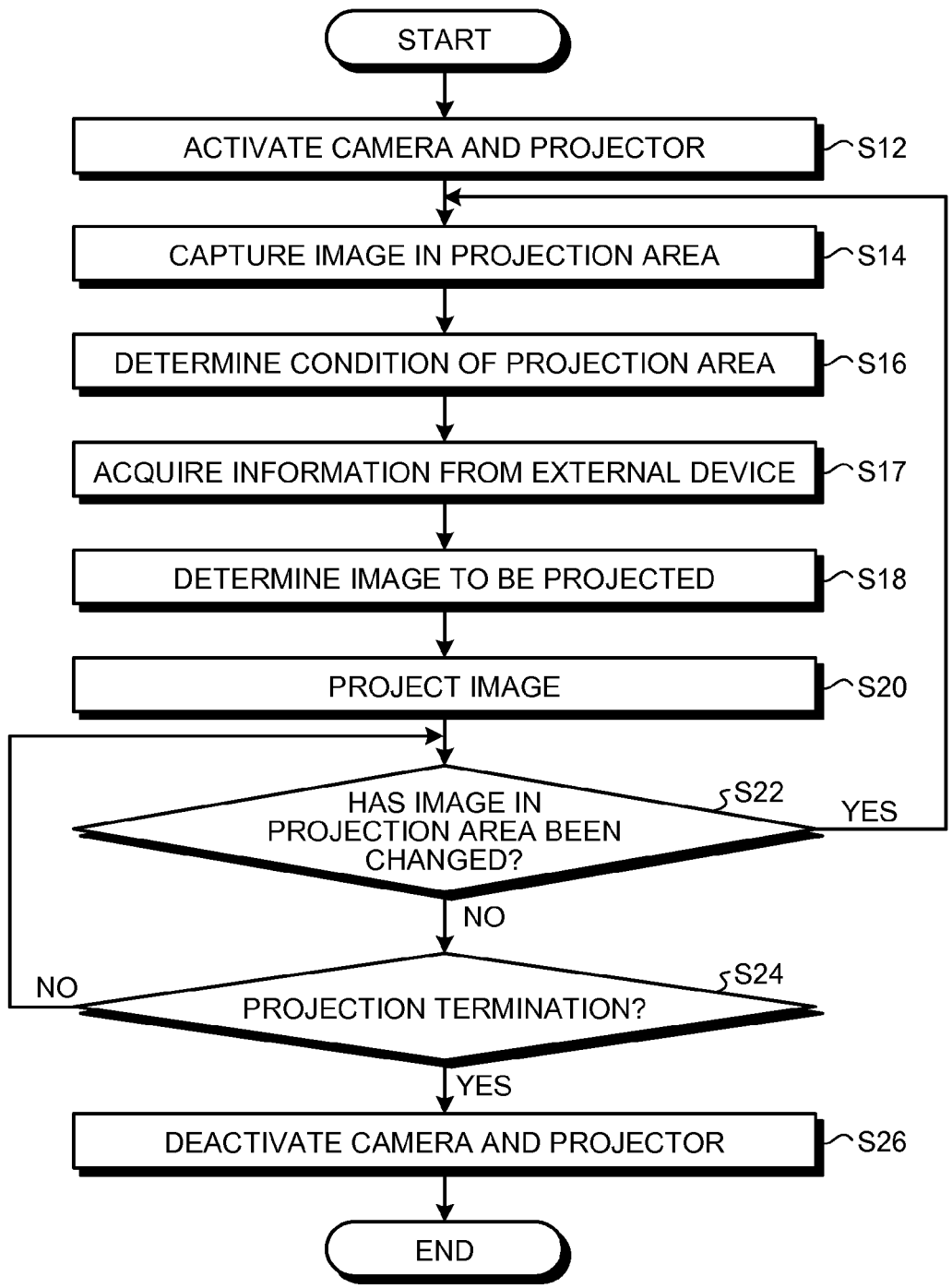

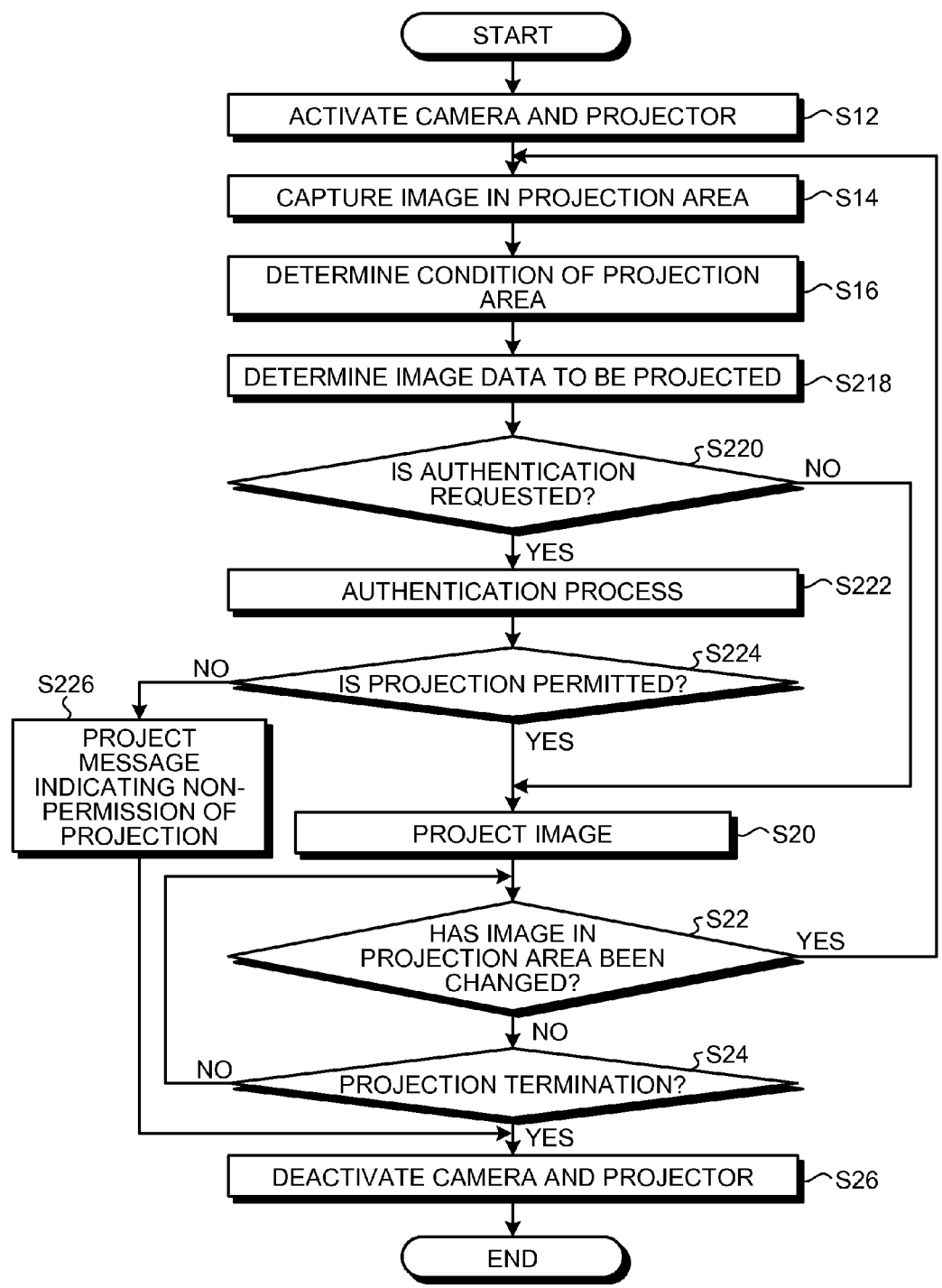

MOBILE ELECTRONIC DEVICE AND IMAGE PROJECTION UNIT

CROSS-REFERENCE TO RELATED APPLICATION

This application is a National Stage of PCT international application Ser. No. PCT/JP2011/062291 filed on May 27, 2011 which designates the United States, and which is based upon and claims the benefit of priority from Japanese Patent Applications No. 2010-122087, No. 2010-122088, No. 2010-122089, and No. 2010-122090, filed on May 27, 2010.

FIELD

The present disclosure relates to a mobile electronic device with an image projector and an image projection system that project an image to a screen or a wall surface.

BACKGROUND

A conventional device that projects an image to a wall surface or a screen includes a so-called projector. A mainstream of the projector is a so-called stationary type device which is supplied with power from a commercial power supply and is used in a state of being fixed at a certain position. The stationary type projector projects an image to a given portion of the wall surface or to the screen in its fixed state.

Recently, on the other hand, a mobile projector compact in size and easy to carry is proposed as the projector. For example, Patent Literature 1 describes a mobile terminal with a projector function that includes an upper cabinet, a lower cabinet, and a hinge for mutually pivotally connecting the upper cabinet and the lower cabinet, and also includes a projector having a lens and a light source.

As a mobile electronic device with a function of projecting an image, Patent Literature 2 to Patent Literature 4 describe mobile electronic devices allows the user to perform operations by projecting operation keys using an image projector and by detecting an input to a projection plane using an input detector. Patent Literature 2 describes a touch panel as an input detector, and Patent Literature 3 describes a detection device for detecting an obstacle on an image projection area as an input detector. Patent Literature 4 describes that a blank or printed flat paper is used as a screen to which an image including operation keys is projected.

As a display control system with a function of projecting an image, Patent Literatures 5 and 6 describe display control systems for controlling contents to be displayed on a display means based on a voice recognition result. Patent Literature 5 describes that contents to be displayed on a display means, of additional contents related to display contents of display data, are changed based on a voice recognition result. Patent Literature 6 describes that a result related to enhancement effect of voice recognition results is detected as enhanced voice information and that the enhancement effect is given in a display screen based on the detected enhanced voice information.

CITATION LIST

Patent Literature

Patent Literature 1: JP-A-2007-96542
Patent Literature 2: JP-A-2003-152851
Patent Literature 3: JP-A-2006-295779
Patent Literature 4: JP-A-2005-222544
Patent Literature 5: JP-A-2002-358062
Patent Literature 6: JP-A-2002-358063

Technical Problem

As described in Patent Literature 2 to Patent Literature 4, a projected image is used as part of an operating unit, so that the image projector can be used effectively. However, the image projector cannot be used enough only by using the image projected by the image projector as part of the operating unit.

The image projector cannot be used enough only by changing the display contents based on the voice recognition result as described in Patent Literatures 5 and 6.

The image projector provided in the mobile electronic device has lower resolution of the image than that of a fixed type image projector, and therefore if text or so is displayed with high resolution, it may be hard to be read.

Because the mobile electronic device is easy to carry, an image can be projected at various locations. Therefore, even if image projection is inappropriate, an image might be projected.

For the foregoing reasons, there is a need for a mobile electronic device and an image projection system capable of displaying a more effective image on a projection plane with a simple manner.

SUMMARY

According to an aspect, a mobile electronic device includes an image projecting unit and a processing unit. The image projecting unit projects an image to a projection area. The processing unit is configured to acquire information for a second image related to a first image placed in the projection area, and cause the image projecting unit to project the second image based on the information acquired.

According to another aspect, the mobile electronic device further includes a sound detecting unit for detecting a sound. The processing unit is configured to cause the image projecting unit to project the second image in synchronization with the sound detected by the sound detecting unit.

According to another aspect, the processing unit is configured to acquire the information for the second image based on the sound detected by the sound detecting unit.

According to another aspect, the processing unit is configured to change the second image to be projected when detecting, based on the sound detected by the sound detecting unit, that the first image in the projection area is changed.

According to another aspect, the mobile electronic device further includes an information acquiring unit for acquiring information from an external device. The processing unit is configured to acquire the information for the second image through the information acquiring unit.

According to another aspect, the processing unit is configured to acquire the information including whether content of the first image is updated from the external device.

According to another aspect, the mobile electronic device further includes an imaging unit for capturing an image in a direction in which the image projecting unit projects an image. The processing unit is configured to determine the first image in the projection area based on an image captured by the imaging unit, and cause the second image to be projected based on a result of the determining.

According to another aspect, the mobile electronic device further includes an imaging unit for capturing an image in a direction in which the image projecting unit projects an image. The processing unit is configured to determine the first image in the projection area based on an image captured by the imaging unit, and acquire the information for the second image through the information acquiring unit based on a result of the determining.

According to another aspect, the processing unit is configured to acquire identification information from the image captured by the imaging unit, determine the first image in the projection area based on the acquired identification information, and acquire the information for the second image related to the first image through the information acquiring unit.

According to another aspect, the mobile electronic device further includes an imaging unit for capturing an image in a direction in which the image projecting unit projects an image. The processing unit is configured to change the second image to be projected when detecting, based on the image captured by the imaging unit, that the first image in the projection area is changed.

According to another aspect, the processing unit is configured to acquire identification information from the image captured by the imaging unit, and determine the first image in a projection area based on the acquired identification information.

According to another aspect, a mobile electronic device includes an image projecting unit, an imaging unit, and a processing unit. The image projecting unit projects an image to a projection area. The imaging unit captures a first image placed in the projection area. The processing unit is configured to determine the first image in the projection area based on information captured by the imaging unit, acquire information for a second image related to the first image based on a result of the determining, perform an authentication process using at least one of the information for the second image and the first image, and cause the image projecting unit to project the second image when it is determined that projection is permitted in the authentication process.

According to another aspect, the processing unit is configured to, as the authentication process, detect information to be authenticated included in the first image, and cause the second image to be projected when the information to be authenticated included in the first image matches information to be authenticated included in the information for the second image.

According to another aspect, the mobile electronic device further includes a communication unit for communicating information with an external device. The processing unit is configured to, as the authentication process, detect information to be authenticated included in the first image, transmit the information to be authenticated to the external device through the communication unit, and determine, when receiving projection permission from the external device, that the projection is permitted.

According to another aspect, the information to be authenticated is identification code printed on a printed material placed in the projection area.

According to another aspect, the information to be authenticated is a signature entered in a face of the projection area.

According to another aspect, upon detecting that the first image in a projection area is changed based on the image captured by the imaging unit, the processing unit is configured to acquire the information for the second image related to the changed first image, and perform the authentication process again.

According to another aspect, the processing unit is configured to acquire identification information from the image captured by the imaging unit, determine the first image in the projection area based on the acquired identification information, and specify the second image related to the first image.

According to another aspect, the second image is an image related to the first image in the projection area.

According to another aspect, the processing unit is configured to, based on the image captured by the imaging unit, adjust a size of the second image to be projected, and cause the second image to be projected to a predetermined position in the projection area.

According to another aspect, the mobile electronic device further includes a connecting mechanism to be connected to a support.

According to another aspect, an image projection system includes: the above described mobile electronic device; the support for connecting to the connecting mechanism and fixing the mobile electronic device in a specific attitude; and a screen fixed to the support and placed in the projection area.

According to another aspect, the screen has a guide, indicating a placement position of a material on which the first image is printed, formed on the surface thereof.

Advantageous Effects of Invention

The mobile electronic device and the image projection system according to an embodiment of the present invention are capable of displaying a more effective image on a projection plane with a simple manner.

BRIEF DESCRIPTION OF DRAWINGS

FIG. 5 is a flowchart for explaining an example of an operation of the mobile electronic device.

FIG. 13 is a flowchart for explaining an example of the operation of the mobile electronic device.

FIG. 15 is a flowchart for explaining an example of the operation of the mobile electronic device.

FIG. 20 is a flowchart for explaining an example of the operation of the mobile electronic device.

FIG. 26 is a flowchart for explaining an example of the operation of the mobile electronic device.

DESCRIPTION OF EMBODIMENTS

Exemplary embodiments of the present invention will be explained in detail below with reference to the accompanying drawings. It should be noted that the present invention is not limited by the following explanation. In addition, the components in the explanation below include those which are easily thought of by persons skilled in the art, those which are substantially equivalents, and those in a scope of so-called equivalents. In the followings, a mobile phone is discussed as an example of the mobile electronic device; however, a target to which the present invention is applied is not limited to mobile phones. Therefore, the present invention is also applicable to, for example, PHSs (Personal Handy-phone System), PDAs, portable navigation devices, notebook computers, and gaming devices.

First Embodiment

Figure 1:
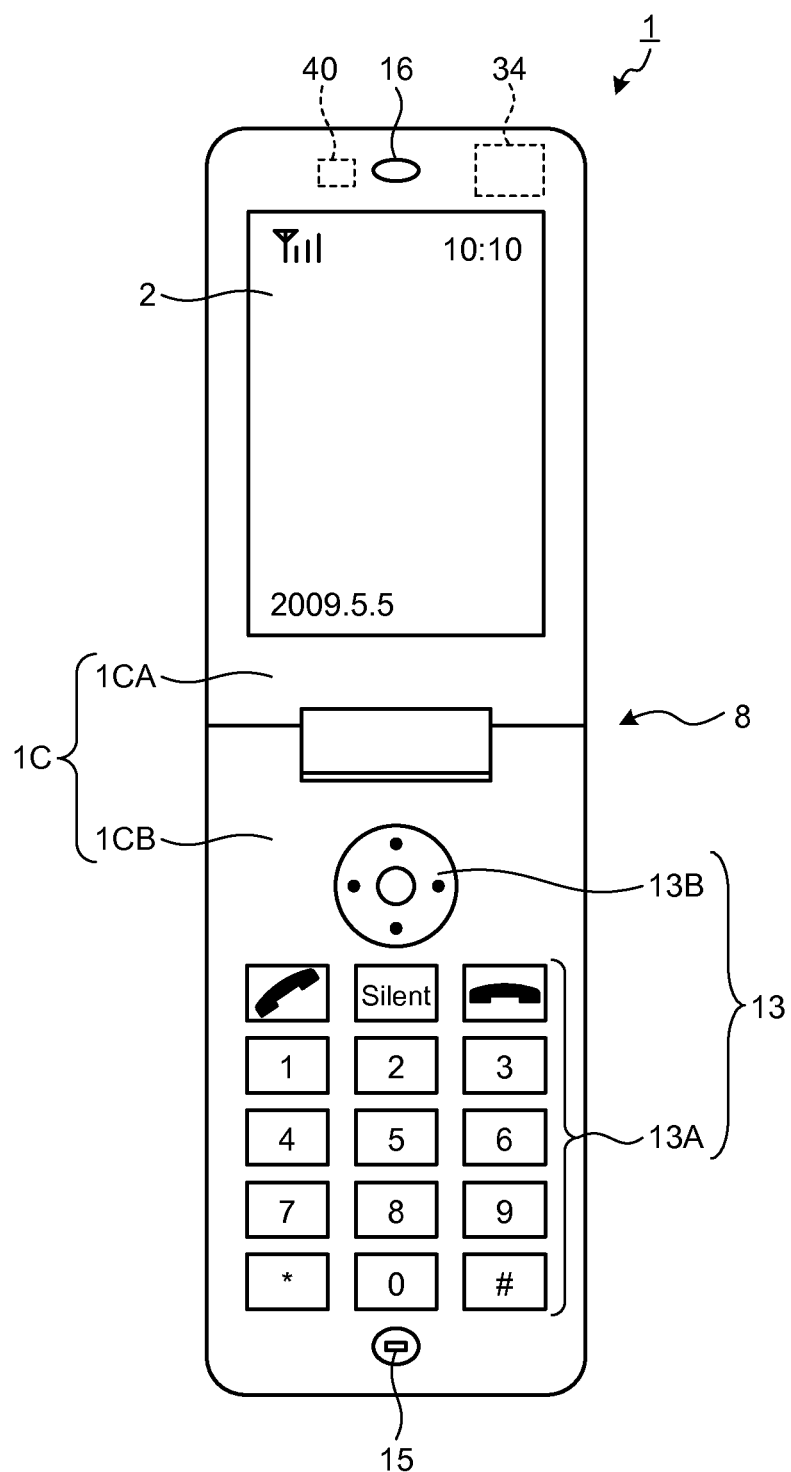
FIG. 1 is a front view of a schematic configuration of a mobile electronic device according to an embodiment.
Figure 2:
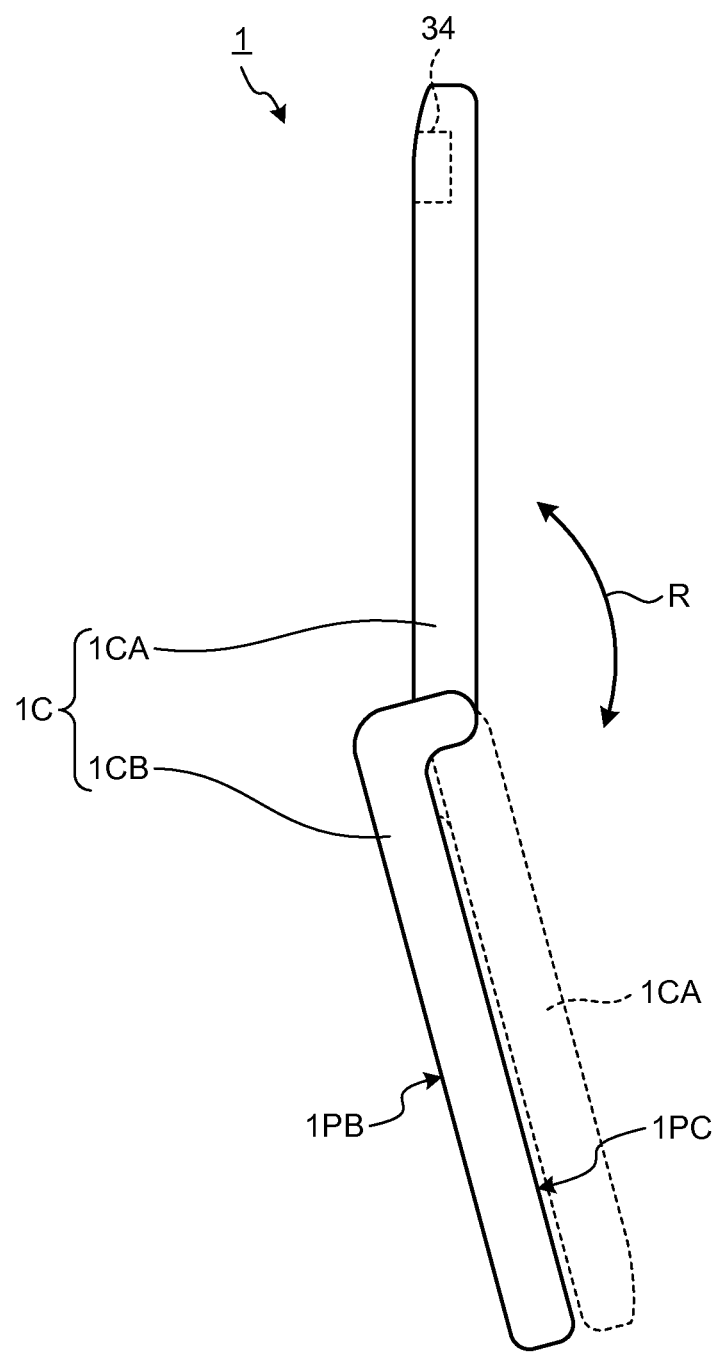
FIG. 2 is a side view of the mobile electronic device illustrated in FIG. 1.

FIG. 1 is a front view of a schematic configuration of a mobile electronic device according to an embodiment, and FIG. 2 is a side view of the mobile electronic device illustrated in FIG. 1. A mobile electronic device 1 illustrated in FIG. 1 and FIG. 2 is a mobile phone that includes a wireless communication function, an output means, a sound acquiring means, and an imaging means. The mobile electronic device 1 is formed with a housing 1C having a plurality of housings. Specifically, the housing 1C is formed with a first housing 1CA and a second housing 1CB which are openable and closable. In other words, the mobile electronic device 1 has a foldable housing. However, the housing of the mobile electronic device 1 is not limited to this configuration. For example, the housing of the mobile electronic device 1 may be a slidable housing with two housings in which one housing and the other housing can mutually slide each other from a state in which both the housings are overlapped, a rotating housing in which one of housings is configured to rotate around an axis line along an overlapping direction, or a housing in which two housings are coupled to each other via a two-axis hinge.

The first housing 1CA and the second housing 1CB are coupled to each other by a hinge mechanism 8 being a connecting unit. By coupling the first housing 1CA and the second housing 1CB with the hinge mechanism 8, both the first housing 1CA and the second housing 1CB can pivot around the hinge mechanism 8 so as to pivot in a direction farther away from each other and in a direction closer to each other (directions indicated by arrow R in FIG. 2). When the first housing 1CA and the second housing 1CB pivot in the direction farther away from each other, the mobile electronic device 1 opens, while when the first housing 1CA and the second housing 1CB pivot in the direction closer to each other, the mobile electronic device 1 closes, to become a folded state (state indicated by dotted line in FIG. 2).

The first housing 1CA includes a display 2 illustrated in FIG. 1 as a display unit. The display 2 displays an idle image when the mobile electronic device 1 awaits reception, and displays a menu image used to assist the operations of the mobile electronic device 1. The first housing 1CA also includes a receiver 16 being an output means that outputs a sound during a phone call on the mobile electronic device 1.

The second housing 1CB includes a plurality of operation keys 13A used to input a phone number of an intended party and text when a mail is composed, and also includes a direction and decision key 13B so as to easily perform selection and decision of a menu displayed on the display 2 and scrolling of a screen and the like. The operation keys 13A and the direction and decision key 13B constitute an operating unit 13 of the mobile electronic device 1. Provided in the second housing 1CB is a microphone 15 being a sound acquiring means that receives a sound during a phone call on the mobile electronic device 1. The operating unit 13 is provided on an operating face 1PC of the second housing 1CB as illustrated in FIG. 2. The face opposite to the operating face 1PC is a back face 1PB of the mobile electronic device 1.

An antenna is internally provided in the second housing 1CB. The antenna is a transmitting/receiving antenna used for wireless communication, and is used for transmission/reception of radio waves (electromagnetic waves) for phone calls and e-mails and so on between the mobile electronic device 1 and a base station. The second housing 1CB includes the microphone 15. The microphone 15 is provided on the operating face 1PC side of the mobile electronic device 1 as illustrated in FIG. 2.

Provided along an area of the first housing 1CA on the opposite side to the hinge mechanism 8 are a projector 34 being an image projector and a camera 40 for imaging (capturing) an image on a plane to which an image is projected. A light emitting portion of the projector 34 and an imaging window of the camera 40 are exposed to the outside of the first housing 1CA. This configuration enables the projector 34 to project an image to a projection target. Further, the camera 40 acquires a distance to the plane to which an image is projected and this enables to automatically adjust focus of the image projected by the projector 34. The camera 40 captures an image of the area to which an image is projected, so that a size and a focal length of an image to be projected can be adjusted.

Figure 3:
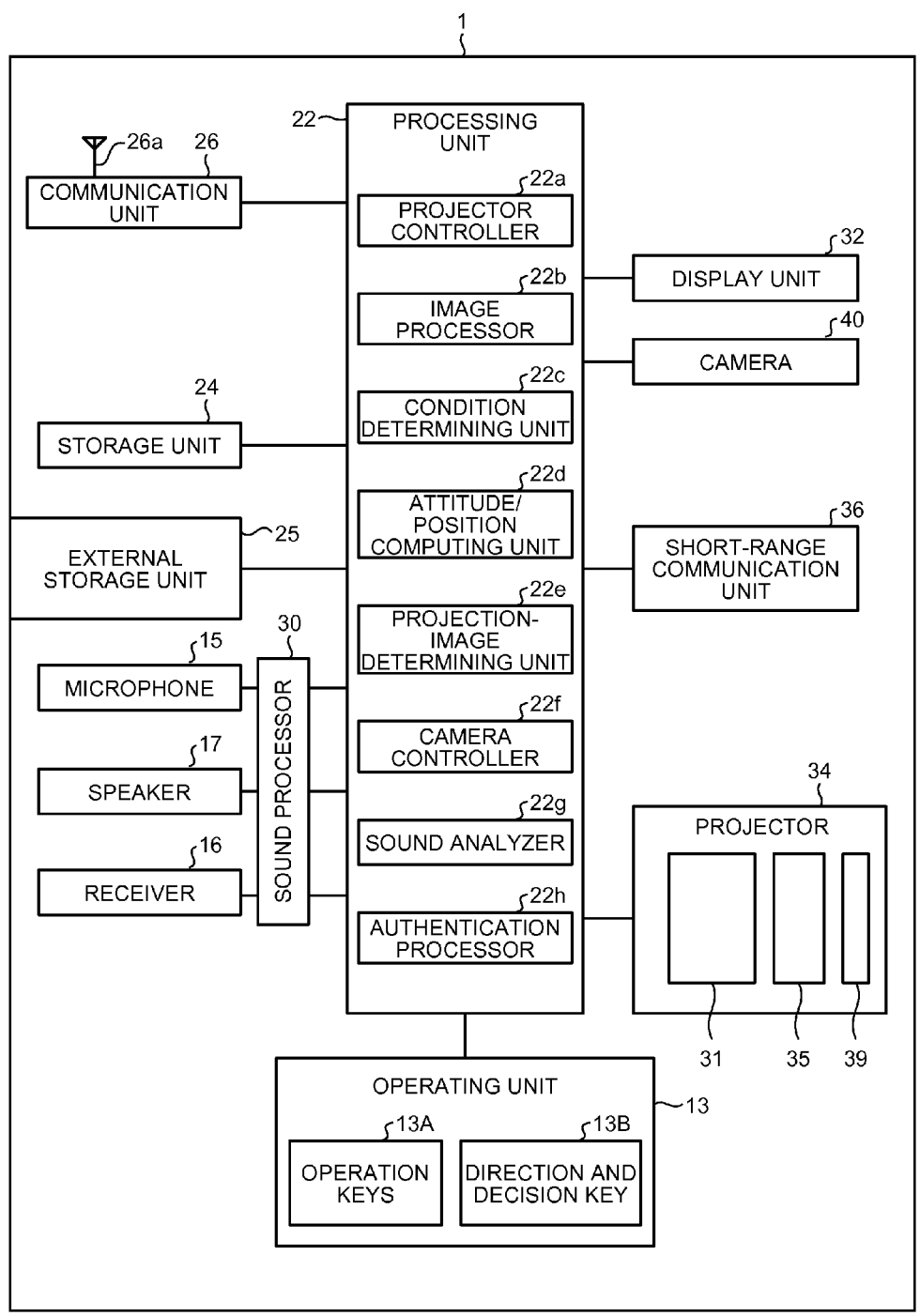
FIG. 3 is a block diagram of a schematic configuration of functions of the mobile electronic device illustrated in FIG. 1 and FIG. 2.

FIG. 3 is a block diagram of a schematic configuration of functions of the mobile electronic device illustrated in FIG. 1 and FIG. 2. As illustrated in FIG. 3, the mobile electronic device 1 includes a processing unit 22, a storage unit 24, an external storage unit 25, a communication unit (information acquiring unit) 26, the operating unit 13, a sound processor 30, a display unit 32, the projector 34, a short-range communication unit 36, and the camera 40. The processing unit 22 includes a function of integrally controlling an entire operation of the mobile electronic device 1. That is, the processing unit 22 controls the operations of the communication unit 26, the sound processor 30, the display unit 32, the projector 34, and the short-range communication unit 36 and so on so that various processes of the mobile electronic device 1 are executed in an appropriate procedure according to an operation through the operating unit 13 and software stored in the storage unit 24 of the mobile electronic device 1.

The various processes of the mobile electronic device 1 are, for example, voice phone conversation over a line switching network, composition transmission, and reception of e-mails, and browsing of Web (World Wide Web) sites on the Internet. The operations of the communication unit 26, the sound processor 30, and the display unit 32 and so on are, for example, signal transmission/reception by the communication unit 26, sound input/output by the sound processor 30, and image display by the display unit 32.

The processing unit 22 executes processes based on programs (for example, operating system programs and application programs) stored in the storage unit 24. The processing unit 22 is configured using, for example, MPU (Micro Processing Unit), and executes the various processes of the mobile electronic device 1 according to the procedure instructed by the software. That is, the processing unit 22 sequentially reads operation codes from the operating system programs, the application programs, or so stored in the storage unit 24, and executes the processes.

The processing unit 22 has a function of executing a plurality of application programs. The application programs executed by the processing unit 22 include a plurality of application programs such as an application program for controlling the drive of the projector 34 and the camera 40, an application program for reading various image files (image information) from the storage unit 24 and decoding them, and an application program for causing the display unit 32 to display an image obtained by decoding and/or for causing the projector 34 to project the image.

In the present embodiment, the processing unit 22 includes a projector controller 22a for controlling operations of the projector 34, an image processor 22b for generating an image to be displayed by the projector 34, a condition determining unit 22c for determining the condition of a projection area based on the image captured by the camera 40 and an input through the operating unit 13, an attitude/position computing unit 22d for computing and calculating an attitude and a position of the housing 1C with respect to the projection plane, a projection-image determining unit 22e for determining an image to be projected by the projector 34 from a plurality of image data, a camera controller 22f for controlling operations of the camera 40, a sound analyzer 22g for performing a sound recognition process, and an authentication processor 22h for performing an authentication process based on the information captured by the camera 40 upon image projection by the projector 34 to determine whether the image can be projected. The functions provided in the projector controller 22a, the image processor 22b, the condition determining unit 22c, the attitude/position computing unit 22d, the projection-image determining unit 22e, the camera controller 22f, and the sound analyzer 22g are implemented by hardware resources which are formed with the processing unit 22 and the storage unit 24 and perform each task assigned by a control unit of the processing unit 22. The task mentioned here represents a unit of processing in which some processes cannot be simultaneously executed, of all processes performed by the application software or of processes performed by the same application software.

The storage unit 24 stores therein software and data used for processes executed by the processing unit 22, and stores therein a task activating an application program that controls the drive of the projector 34 and the camera 40 and a task activating an image processing program. The storage unit 24 stores therein, in addition to the tasks, for example, sound data downloaded or obtained through communications, software used by the processing unit 22 to provide control for the storage unit 24, an address book in which phone numbers, mail addresses, and so on of the communications partners are written for management, a sound file such as a dial tone and a ring tone, and temporary data or so used in the processing process of the software.

The computer program and the temporary data used in the processing process of the software are temporarily stored in a work area of the storage unit 24 assigned thereto by the processing unit 22. The storage unit 24 includes, for example, nonvolatile storage devices (nonvolatile semiconductor memory such as ROM: Read Only Memory, a hard disk drive, and so on) and a readable/writable storage device (e.g., SRAM: Static Random Access Memory, and DRAM: Dynamic Random Access Memory).

The external storage unit 25 is a storage device that includes an external memory and a connection terminal, the external memory being removable from the housing 1C. Stored in the external memory are various types of software and data similarly to the storage unit 24. By connecting the external memory and the processing unit 22 through the communication terminal, the external storage unit 25 performs write and read of information to and from the external memory, similarly to the storage unit 24. Because the external memory is removable, the external storage unit 25 can replace the external memory connected to the processing unit 22. Various storage media such as an SD card (registered trademark), a Memory Stick (registered trademark), smart media, and USB memory can be used as the external memory.

The communication unit 26 includes an antenna 26a, and establishes a wireless signal path using CDMA (Code Division Multiple Access) system or so with a base station via a channel assigned by the base station and performs telephone communication and information communication with the base station. The operating unit 13 includes the operation keys 13A respectively assigned with various functions such as a power key, a talk key, numeric keys, character keys, direction keys, a decision key, and a send key; and the direction and decision key 13B. When a user operation is input to any one of the keys, the key generates a signal corresponding to the content of the user operation. The generated signal is input to the processing unit 22 as an instruction of the user. The communication unit 26 may perform wireless communication using short-range communication (Bluetooth (registered trademark), infrared communication, etc.) and wireless LAN or so instead of or in addition to the wireless communication with the base station. The communication unit 26 may use a communication system the same as or different from that of the short-range communication unit 36.

The sound processor 30 performs processes on a sound signal input to the microphone 15 and a sound signal output from the receiver 16 or a speaker 17. That is, the sound processor 30 amplifies the sound input through the microphone 15, subjects the sound to AD conversion (Analog-to-Digital conversion), thereafter, subjects the sound to signal processing such as encoding, converts the sound to digital sound data, and outputs the converted sound data to the processing unit 22. Also, the sound processor 30 subjects the sound data sent from the processing unit 22 to processes such as decoding, DA conversion (Digital-to-Analog conversion), and amplification, converts the sound signal to an analog sound signal, and then outputs the converted sound signal to the receiver 16 or the speaker 17. The speaker 17 is disposed in the housing 1C of the mobile electronic device 1, and outputs a ring tone, a send tone of mail, or the like.

The display unit 32 includes the display 2, and displays a video according to video data and an image according to image data supplied from the processing unit 22 on a display panel. The display 2 is configured using a display panel including, for example, LCD (Liquid Crystal Display), an organic EL (Organic Electro-Luminescence) panel, or so. The display unit 32 may include a sub-display in addition to the display 2.

The projector 34 includes a light source and an optical system for switching whether to project or not light emitted from the light source based on the image data. In the present invention, the projector 34 includes a visible-light irradiation device (visible-light irradiating unit) 31 being the light source, a drawing device 35 being the optical system, and a focus adjustment device 39. The visible-light irradiation device 31 irradiates visible laser light. The light in a visible light region is a light whose threshold in its short wavelength side is from 360 nm to 400 nm and whose threshold in its long wavelength side is from 760 nm to 830 nm. In the present embodiment, the visible-light irradiation device 31 irradiates lights in three colors of R (Red), G (Green), and B (Blue).

The drawing device 35 synthesizes the lights in three colors irradiated from the visible-light irradiation device 31, and irradiates the synthesized lights to the image projection target. The drawing device 35 includes a switching element for switching whether to pass or not the light emitted from the light source therethrough, and a mirror for causing the light having passed through the switching element to perform raster scan. The drawing device 35 changes an angle of the laser light emitted from the visible-light irradiation device 31 by the mirror and scans the laser light on the image projection target, to thereby project the image to the image projection target.

Used as the mirror is, for example, an MEMS (Micro Electro Mechanical System) mirror. The MEMS mirror uses a piezoelectric element to drive the mirror, scans the visible light irradiated from the visible-light irradiation device 31, and generates a visible image or an invisible image. In this case, the mirror is used to change an angle of the light irradiated from the light source and scan the light irradiated from the light source over the whole surface of the image projection target, so that the visible image or the invisible image can be projected to the image projection target. As explained above, the projector 34 is a scan type projector. The configuration of the projector 34 is not limited to the projector that uses the laser as a light source. For example, the projector 34 may be a projector that uses a halogen light, an LED light source, or an LD light source as a light source and includes an LCD (Liquid Crystal Display) or a DMD (Digital Micromirror Device) provided in the optical system.

The focus adjustment device 39 includes a function (focus adjustment function) of forming a visible image projected from the drawing device 35 on the image projection target by an instruction sent from the projector controller 22a. The focus adjustment device 39 is provided with, for example, a focus adjustment mechanism including a movable lens and so on, and moves the lens to implement the focus adjustment function. The focus adjustment device 39 may implement the focus adjustment function by causing the image processor 22b to subject image data projected by the projector 34 to predetermined image processing. The focus adjustment device 39 may implement the focus adjustment function by the focus adjustment mechanism and the image processing.

Figure 4:
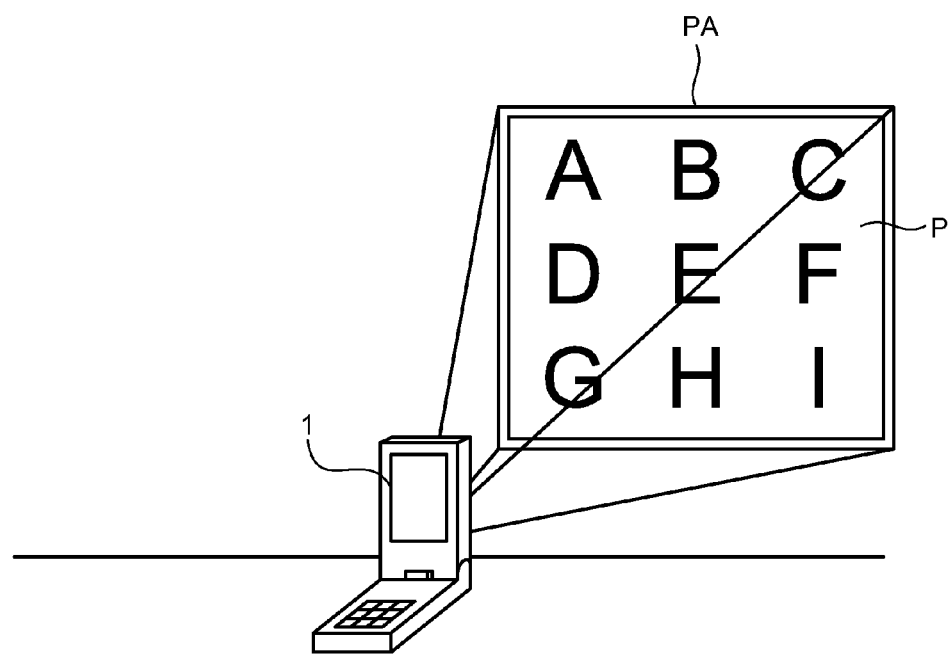
FIG. 4 is an explanatory diagram illustrating a state in which an image is displayed by a projector of the mobile electronic device illustrated in FIG. 1.

FIG. 4 is an explanatory diagram illustrating a state in which an image is displayed by a projector of the mobile electronic device illustrated in FIG. 1. As explained above, the projector 34 is the image projector that projects an image, and its image projecting surface is exposed to the outside of the housing 1C of the mobile electronic device 1. The mobile electronic device 1 projects an image from the projector 34 and can thereby project an image P to a predetermined area (projection area) PA, as illustrated in FIG. 4, of the image projection target (e.g., a wall surface or a screen) at a location facing the image projecting surface of the projector 34. The processing unit 22 controls the operation of the projector 34, so that the projector 34 projects various pictures such as a moving image and a presentation material sent from the processing unit 22 to be displayed in the projection area PA.

Next, the short-range communication unit 36 is a communication unit that performs communications with other communication unit by using short-range communication technology. As the short-range communication technology, infrared communication (IrDA (registered trademark), IrMC (registered trademark), IrSimple (registered trademark)) technology, visible light communication technology, Bluetooth (registered trademark) technology, and RFID (Radio Frequency Identification) technology can be used. For example, when RFID is used, the short-range communication unit 36 includes an IC tag for identifying itself and a reader for reading an IC tag provided in other communication device. In the present embodiment, the short-range communication unit 36 is provided; however, it is not limited thereto. The mobile electronic device 1 may integrate the communication unit 26 and the short-range communication unit 36, or does not have to provide the short-range communication unit 36.

The camera 40 is an imaging system that is disposed near the light emitting portion of the projector 34 and captures an image of an area including the projection area. That is, the camera 40 captures an image in a light emission direction of the projector 34. The camera 40 is the imaging system that captures an image at a wider field angle than a projection field angle of an image projected by the projector 34, and can capture an image of a wider area than a projection area where an image is projected by the projector 34. The mobile electronic device 1 is configured basically in the above manner.

Next, an image projection operation of the projector in the mobile electronic device will be explained with reference to FIG. 5. FIG. 5 is a flowchart illustrating an example of an operation of the mobile electronic device. The operation illustrated in FIG. 5 may be executed always when the projector 34 is activated, or may be executed when an execution instruction of a mode to perform the operation in FIG. 5 is input. The operation in FIG. 5 may be processed by executing an application stored in the storage unit 24 or may be processed by executing an application stored in the external storage unit 25. In other words, the program for executing the operation in FIG. 5 may be stored in any of the areas. The program can be acquired by downloading it from an external device or can be acquired by reading it from the external storage unit 25. In the flowchart illustrated in FIG. 5, a specific printed material is placed in an image projection area of the projector 34 in the mobile electronic device 1. For the operation according to the present embodiment, various operations can be implemented even by a configuration not including the sound analyzer 22g and the authentication processor 22h.

First of all, when an activation instruction of the projector 34 is input, then at Step S12, the processing unit 22 of the mobile electronic device 1 activates the camera 40 and the projector 34. If the camera 40 and the projector 34 have been activated when the activation instruction is input, the processing unit 22 proceeds to Step S14 without any operation thereon. The activation process of the projector 34 can be performed by the projector controller 22a and the activation process of the camera 40 can be performed by the camera controller 22f.

In the processing unit 22, when the camera 40 and the projector 34 are activated at Step S12, then at Step S14, the camera controller 22f controls the operation of the camera 40 to capture an image in the projection area (image displayed on the projection plane). In the processing unit 22, when the image in the projection area is captured at Step S14, then at Step S16, the condition determining unit 22c determines the condition of the projection area. Specifically, in the processing unit 22, the image processor 22b analyzes the captured image in the projection area and detects components of the image displayed in the projection area. Thereafter, the processing unit 22 determines the condition of the projection area based on the components of the image displayed in the projection area detected through the process by the image processor 22b.

In the processing unit 22, when the condition of the projection area is determined at Step S16, then at Step S18, the projection-image determining unit 22e determines an image to be projected. Specifically, in the processing unit 22, the projection-image determining unit 22e specifies the printed material placed in the projection area based on the condition (identification information) of the projection area determined at Step S16, extracts image data corresponding to the specified printed material, and determines an image to be projected. The image data is stored in the storage unit 24 or the external storage unit 25, and the image data corresponding to the specified printed material is stored in association with information for the printed material. Therefore, the projection-image determining unit 22e searches for the image data stored in the storage unit 24 or in the external storage unit 25 using the information for the printed material as a key, thus extracting corresponding image data.

In the processing unit 22, when the image to be projected is determined at Step S18, then at Step S20, the projector controller 22a controls the operation of the projector 34 to project the image determined at Step S18 from the projector 34.

When the image is projected at Step S20, then at Step S22, the processing unit 22 determines whether the image in the projection area has been changed, that is, whether the printed material placed in the projection area has been changed. The determination can be made by, for example, capturing the image by the camera 40 and comparing the image with the previous image. When it is determined that the image has been changed at Step S22, that is, there is any image (printed material), in the projection area, different from the image (printed material) placed in the projection area when captured at Step S14 (Yes at Step S22), the processing unit 22 proceeds to Step S14, performs the processes from Step S14 to Step S20 to change the image to be projected from the projector 34 according to the image in the projection area.

When it is determined that the image has not been changed at Step S22 (No at Step S22), then at Step S24, the processing unit 22 determines whether projection termination has been instructed. When it is determined that the termination has not been instructed at Step S24 (No at Step S24), the processing unit 22 proceeds to Step S22, and performs the process of Step S22. When it is determined that the projection termination has been instructed at Step S24 (Yes at Step S24), then at Step S26, the processing unit 22 deactivates the camera 40 and the projector 34 and ends the present process. The camera 40 and the projector 34 can be deactivated by the control of the camera controller 22f and the projector controller 22a respectively.

Figure 6A:
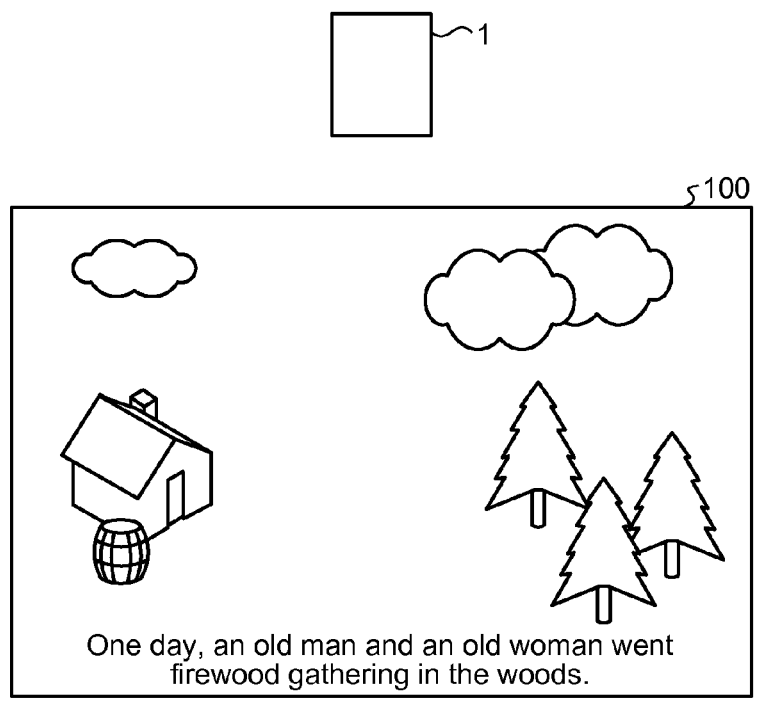
FIG. 6A is an explanatory diagram for explaining an example of the operation of the mobile electronic device.
Figure 6B:
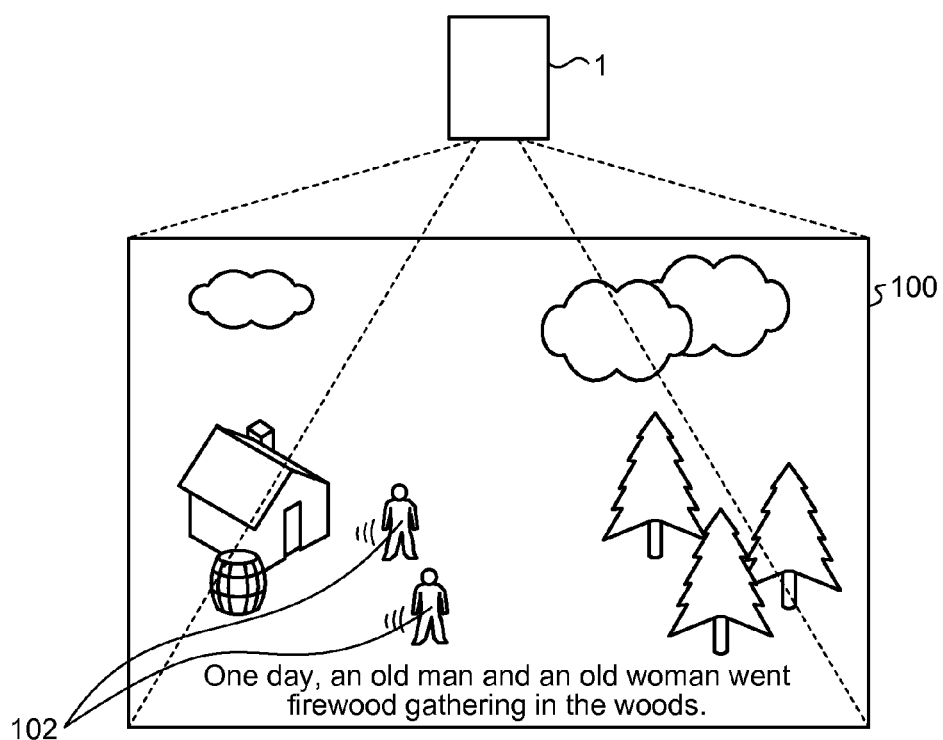
FIG. 6B is an explanatory diagram for explaining an example of the operation of the mobile electronic device.
Figure 7A:
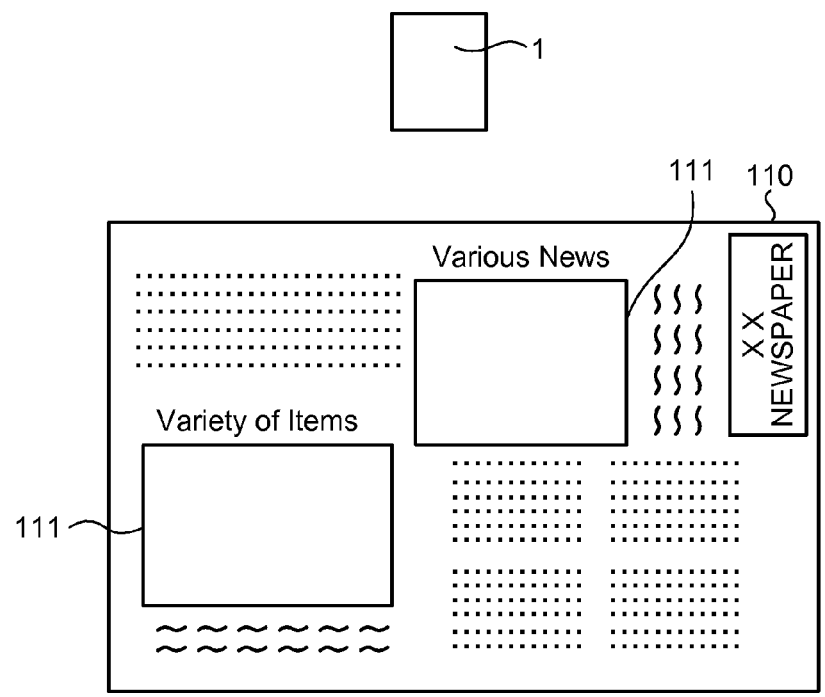
FIG. 7A is an explanatory diagram for explaining an example of the operation of the mobile electronic device.
Figure 7B:
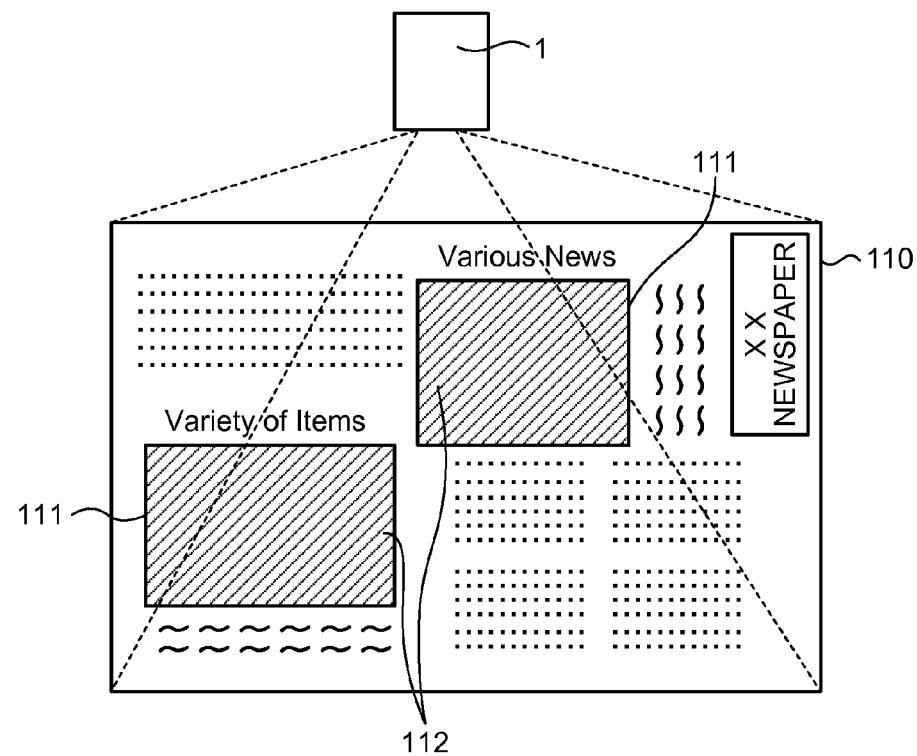
FIG. 7B is an explanatory diagram for explaining an example of the operation of the mobile electronic device.

Next, the mobile electronic device 1 will be explained in more detail using specific examples. FIG. 6A and FIG. 6B are explanatory diagrams for explaining an example of the operation of the mobile electronic device. FIG. 7A and FIG. 7B are explanatory diagrams for explaining an example of the operation of the mobile electronic device. FIG. 6A to FIG. 7B depict the mobile electronic device 1 as a simple box. First of all, in the example illustrated in FIG. 6A, a printed material 100 is placed in the projection area. The printed material 100 is printed with an image of one scene of a picture book. Specifically, images of a house, trees, and clouds as a background, and text as contents ("One day, an old man and an old woman went firewood gathering in the woods.") are printed on the printed material 100.

When detecting that the printed material 100 is in the projection area, that is, that one scene at a predetermined page of a picture book or so is therein through the processes in FIG. 5, the mobile electronic device 1 acquires image data corresponding to the printed material 100, and, as illustrated in FIG. 6B, projects an image of persons 102 from the projector 34 to the projection area. This allows the image of the persons 102 to be displayed on the printed material 110 in addition to the printed components. In the present embodiment, the image of the persons is projected; however, an object or a landscape may be projected.

Next, in the example of FIG. 7A, a printed material 110 is placed in the projection area. The printed material 110 in this case is a page of a newspaper. Specifically, the name of the newspaper, headlines, and texts as contents of each news are printed on the printed material 110. Frames 111 are also printed on the printed material 110, but contents of the frames 111 are empty.

When detecting that the printed material 110 is in the projection area, that is, detecting the name of a newspaper and the date and the page thereof through the processes in FIG. 5, the mobile electronic device 1 acquires image data corresponding to the printed material 110, and, as illustrated in FIG. 7B, projects images 112 from the projector 34 to the frames 111 of the printed material 110 of the projection area. This allows the images 112 to be displayed in the frames 111 on the printed material 110 in addition to the printed components.

In this way, by projecting the image corresponding to the image in the projection area from the projector 34, that is, by superimposing the image projected from the projector 34 on the image in the projection area to create a single image, the mobile electronic device 1 can create a highly effective image with a simple manner.

If the image is composed of only a printed material, then it cannot be updated after the printing, so that the image cannot be moved. If the image is projected only by the projector, then it is difficult to display a clear image. To project an image in which even small letters are easily read, an expensive projector with high performance needs to be installed, and this causes the size of the device to be more increased, the configuration to be more complicated, and the cost of the device to be more increased. On the other hand, the mobile electronic device 1 projects a required image according to the image on the printed material placed in the projection area, and can, therefore, have both advantages of the printed material and the projector 34. For example, the printed material allows a high-resolution image to be displayed and the projector 34 allows part of the image to be moved i.e. to be a moving image. In addition, because the image to be projected by the projector 34 in the mobile electronic device 1 is reduced to part of the projection area, the load on the image processing can be reduced, thus reducing power consumption.

As explained above, because the small letters and images can be previously printed on the printed material, an image to be displayed in the projection area can be made a sharp image with high resolution even if the projector is not upgraded.

The mobile electronic device 1 combines a printed material with an image projection device to combine the printed material with a projected image, that is, projects an image to the printed material, and thus displays a content in which one image is complete. The printed material and the image data can be distributed as one product or a package. For example, when the printed material and an external memory with the image data stored therein are distributed as a package, the user connects the external memory to the external storage unit 25 of the mobile electronic device 1 for acquiring the image data and places the printed material in the projection area, so that the image stored in the external memory can be projected to the printed material in the projection area.

The image cannot be completed with only one of the printed material and the image data, and therefore, by managing one of the image data and the printed material, it is possible to prevent the image from being copied or from being sold without permission. For example, by restricting the number of acquisition times of image data and the number of terminals that can acquire image data with respect to one printed material or by setting so that notification is transmitted to a provider of the image data when the image data is acquired, the usage of the image data can be restricted. This enables the completed image to be viewed only by a specific user.

Figure 8:
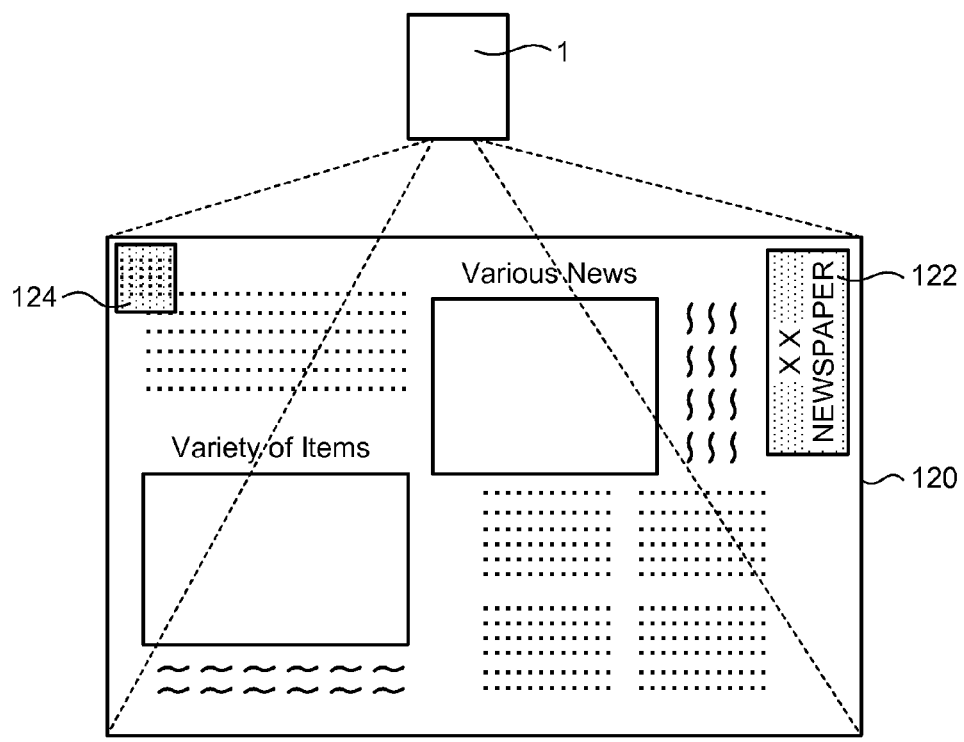
FIG. 8 is an explanatory diagram for explaining an example of an operation of the mobile electronic device.

As a method for specifying an image (e.g., printed material) placed in the display area from an image captured by the camera 40 of the mobile electronic device 1, various image processing methods can be used. For example, the mobile electronic device 1 extracts identification information such as a specific character and symbol from an image in the projection area such as the printed material, a drawn picture, and written text, and can thereby specify an image in the projection area. The mobile electronic device 1, for example, performs detection of edges of four sides, and can thereby specify an image in the projection area. An example will be explained below with reference to FIG. 8. FIG. 8 is an explanatory diagram for explaining an operation of the mobile electronic device. FIG. 8 depicts the mobile electronic device 1 as a simple box. In the example illustrated in FIG. 8, a printed material 120 is placed in the projection area. The printed material 120 is a page of a newspaper, in which a character string 122 describing a name of the newspaper, headlines, and texts as contents of each news are printed. A two-dimensional barcode 124 is also printed on the printed material 120.

The mobile electronic device 1 extracts the character string 122 from the image captured by the camera 40, and can thereby specify that the printed material 120 in the projection area is a newspaper. The mobile electronic device 1 may further considers information or so for the position of the character string 122 in the entire projection area, that is, consider layout information so that the printed material 120 can be more appropriately specified. In this case, the mobile electronic device 1 further acquires information for the date of issue and a page number from the image, and can thereby specify the printed material 120. The mobile electronic device 1 extracts the two-dimensional barcode 124 from the image captured by the camera 40, and can thereby also specify the printed material 120. When the two-dimensional barcode 124 is used, the information for the printed material 120 being the newspaper, the date of issue, and the page number can be included in the two-dimensional barcode. This enables the mobile electronic device 1 to specify the printed material 120 only by reading the two-dimensional barcode 124.

The mobile electronic device 1 specifies an image in the projection area, acquires the image corresponding to the specified image, and projects it to the projection area in the above manner, and can thereby display an image, in which the projected image is superimposed on the previously placed image, in the projection area.

Although the mobile electronic device 1 specifies an image to be projected from the image data stored in the storage unit 24 or in the external storage unit 25, the present invention is not limited thereto. The mobile electronic device 1 may acquire an image to be projected from an external server or so through communication via the communication unit 26. For example, when specifying the printed material as an image in the projection area, the mobile electronic device 1 may access database of a publisher that publishes the printed material to acquire data for the image to be projected. When the two-dimensional barcode is used, URL may be included in the information for the two-dimensional barcode. The URL storing therein the data for the image to be projected may also be previously printed in part of the printed material.

The mobile electronic device 1 may process an image to be projected corresponding to the image in the projection area. The mobile electronic device 1 may use an image processed or an image created by the mobile electronic device 1 as an image associated with the image in the projection area. The mobile electronic device 1 may change an image previously set in association with the image in the projection area. If an image to be associated is changed, the mobile electronic device 1 simply stores the changed image in the storage unit 24 or the external storage unit 25 such that the link data for the identification information of the image in the projection area is added thereto.

The mobile electronic device 1 may calculate a distance to a projection area (projection plane) and a positional relation between the image and the projection area based on the image data captured by the camera 40, to adjust a position and a size of an image to be projected from the projector 34 in the projection area. The mobile electronic device 1 may acquire an image in the projection area when it is projected by the projector 34 and adjust a position and a size of the image to be projected from the projector 34 in the projection area based on the acquired result. In this way, by adjusting the position and the size of the image to be projected in the projection area, a more appropriate image can be displayed in the projection area.

The mobile electronic device 1 may display an image in which an image captured by the camera 40 is combined with an image to be projected, that is, an image to be displayed in the projection area (an image predicted when it is projected) on the display unit 32. This enables the image to be projected to the projection area to be checked by using the display unit 32. The mobile electronic device 1 may project an image from the projector 34 after an operation for projection permission is input.

Because the user operation becomes simpler and the burden can be reduced, the embodiment is configured so that an image in the projection area is captured by the camera 40, the image in the projection area is specified, and an image to be projected is automatically determined; however, the present invention is not limited thereto. For example, the user inputs an operation to the operating unit 13 to select an image corresponding to the image in the projection area as an image to be projected, and inputs a projection instruction of the selected image, so that an image projected from the projector 34 may be superimposed on the image in the projection area, to display a single image in the display area. In this case also, the data for an image created as an image associated with the image in the projection area is acquired, and this enables one completed image to be displayed.

For the mobile electronic device 1 according to the embodiment, described are an example in which an image to be projected is a person in the case the image in the projection area is an image of one scene of a picture book or so and an example in which an image in the projection area is a newspaper and an image to be projected is an image (photo) to be displayed in a frame. However, a combination of an image in the projection area, i.e. an image previously created and placed in the projection area of the printed material or so with an image to be projected i.e. an image to be projected from the projector 34 can include a variety of combinations.

First of all, if the image (printed material or so) in the projection area is an image of a newspaper, the mobile electronic device 1 may set images in motion, as an image to be projected, i.e. a four-panel comic as an animation in frames provided in a space of the newspaper. An image to be projected may be an advertisement. By projecting an advertisement, the content of an advertisement to be projected can be changed according to a region, a place where it is distributed, and a contractant. In this case, the mobile electronic device 1 acquires date and a target item as identification information, and can project data for the target item corresponding to the date. An area in which age and category are written may be provided in the printed material, so that a novel and an article corresponding to the input result can be projected by reading the input result.

If the image in the projection area is an image of comic, the mobile electronic device 1 may set dialogue as an image to be projected. That is, the dialogue may be projected to a balloon of the comic in the projection area. Therefore, the printed material has no dialogue, and even by looking at only the printed material, the whole contents thereof cannot be recognized. This enables consumer interests to be promoted. By performing an input or so to the operating unit 13, the user may compose a dialogue. By storing the input dialogue associated with the balloon, it can be repeatedly displayed. In addition, various dialogues can be assigned to the comic.

If the image in the projection area is an image of a picture-card show, the mobile electronic device 1 may set a person or a specific object as an image to be projected. When the image in the projection area is the picture-card show, the mobile electronic device 1 can determine that a page number i.e. which image it is based on its background image. Only the identification information may be displayed on the image in the projection area. In this case also, an appropriate image can be displayed in the display area while associating a blank sheet of the front with text displayed on the back.

If the image in the projection area is an image of a paperback book, the mobile electronic device 1 may set an outline or an illustration as an image to be projected. In this case, a sentence and a page number can be used as identification information.

If the image in the projection area is a magazine, the mobile electronic device 1 may set the identification information as application ID and set a prize result as an image to be projected. This enables the user to learn of the result upon the application. A question and hint of a puzzle may be set as the identification information, and an answer to the puzzle may be set as an image to be projected. That is, by placing the question of a puzzle of a magazine and an area of the hint in the projection area, the answer to the puzzle can be displayed. The result of ranking may be displayed in an area where ranks or only a frame are/is displayed in the magazine.

If the image in the projection area is a question of a reference book, a test, a textbook, or the like, the mobile electronic device 1 may set a correct answer, a comment, and a hint of the question as an image to be projected. In this case, the number or so of the question becomes identification information. In this case, if a question is placed in the projection area, its correct answer or so may be displayed; however, a hint, a correct answer, a comment may be displayed each time when time elapses or when the time limit is exceeded. When the question with the answer written therein is placed in the projection area, the answer may be analyzed using the image captured by the camera 40, and an image indicating the score or the rank may be projected.

If the image in the projection area is a map, the mobile electronic device 1 may set intended information (selected information) as an image to be projected. This enables only required information to be displayed, thus using the map in an easy-to-see manner.

If the image in the projection area is an image of a guidebook, the mobile electronic device 1 may set sightseeing area information, souvenir information, word-of-mouth information, shop information, or a translated sentence in other language as an image to be projected. It is preferable that the sightseeing area information is displayed corresponding to the map, that the souvenir information is displayed corresponding to the shop information, that the word-of-mouth information is displayed corresponding to the image of the sightseeing area, that the shop information is displayed corresponding to the image of the map, and that the translated sentence in other language is displayed corresponding to a sentence in any language.

If the image in the projection area is an image of a cooking book, the mobile electronic device 1 may set an explanatory animation, a sequence, and a cooking record as an image to be projected. It is preferable that the explanatory animation is displayed corresponding to an explanatory text, that the sequence is displayed corresponding to an image of a cooking or to a frame in a space, and that the record is displayed corresponding to a recipe. The record can be projected by storing the date and time when the recipe is viewed. Various items (date on which cooking is done, time required for that, and remark) input by the user may be projected as a record.

If the image in the projection area is an image of a photo collection or a photo, the mobile electronic device 1 may set information for the date and time on which a photo is taken and for its location or text data associated with the image as an image to be displayed. If the image in the projection area is an image of a technical book, the mobile electronic device 1 may project an explanatory text associated with a technical term as an image to be projected.

If the image in the projection area is a signboard, the mobile electronic device 1 may set an advertisement image as an image to be projected. For the advertisement image, a different image can be displayed by each mobile electronic device 1 or at each time. If the image in the projection area is a road sign, the mobile electronic device 1 may set construction information and traffic-jam information as an image to be projected.

If the image in the projection area is an entry area such as a notebook or a whiteboard, the mobile electronic device 1 may set a symbol, a diagram, or so corresponding to entered text as an image to be projected. When identification information indicating a specific page is entered, the mobile electronic device 1 may project an image (picture, sentence) corresponding to the identification information.

If the image in the projection area is a name plate, the mobile electronic device 1 may set a name as an image to be projected. If the image in the projection area is a label, the mobile electronic device 1 may set price information, discount information, stock information, production-area information, or so, as an image to be projected. This enables an amount of information to be printed on the label to be reduced. In addition, if the discount information, the stock information, or the like is to be displayed, variable information can be displayed.

If the image in the projection area is ID or a product code described on a slip, the mobile electronic device 1 may set a product image as an image to be projected. The user can easily and visually understand which product has been bought from the ID or the product code. If the image in the projection area is a warranty, the mobile electronic device 1 may set a warranty period as an image to be projected. If the image in the projection area is a card, the mobile electronic device 1 may set points amassed on the card as an image to be projected.

If the image in the projection area is a prescription, the mobile electronic device 1 may set a use history or a use method as an image to be projected. This enables the user to check a frequency of use and the like.

If the image in the projection area is a document for handwriting, the mobile electronic device 1 may set an image that assists handwriting as an image to be projected. For example, an address may be displayed in an address box of a postcard. A line may be displayed in an entry column of characters. A layout may be displayed. In this way, by handwriting while an assist screen is projected, a character and a picture can be easily written and drawn respectively.

If the image in the projection area is an original image of coloring paper, the mobile electronic device 1 may set a color image in each area as an image to be projected. This enables the user to enjoy coloring by selecting colors. The coloring paper is not actually colored, and therefore the user can enjoy coloring as many times as he/she likes. In this case, the mobile electronic device 1 acquires area information corresponding to the original image of the coloring paper as a corresponding image, and the user controls the mobile electronic device 1 to overwrite selected color information, so that the mobile electronic device 1 updates the data for the image to be projected and projects the colored image.

If the image in the projection area is text displayed on a display such as electronic paper, the mobile electronic device 1 may set a moving image as an image to be projected. This enables a moving image to be displayed on the display where, for example, only text is displayed. In addition, the moving image can be displayed without burden placed on a terminal on the display side. In this case, the mobile electronic device may exchange various pieces of information through communication with the terminal on the display side. This enables easy adjustment of an area of a moving image to be projected and of an area of text to be projected or so.

If the image in the projection area is a moving image displayed on a display of a mobile communication terminal, the mobile electronic device 1 may set an image of a subtitle as an image to be projected.

If the image in the projection area is a TV phone image displayed on a display of a mobile communication terminal, the mobile electronic device 1 may set call time and/or call charge as an image to be projected. If the image in the projection area is a television image displayed on a display of a mobile communication terminal, the mobile electronic device 1 may set information related to the other party of a call such as a name or the content of a received mail as an image to be projected. The image to be projected is preferably displayed on the outside of the frame (edge) of the display. This enables various pieces of information to be displayed without making smaller the image displayed on the display.

The housing of the mobile electronic device may be configured to include two separate portions, to provide the display on one of housings, and to provide the projector on the other housing, so that the processes can be performed by a single mobile electronic device.

It goes without saying that a combination of replacing an image in the projection area and an image to be projected can be used.

Second Embodiment

Next, other embodiments of the image projection operation of the projector in the mobile electronic device will be explained below with reference to FIG. 9 to FIG. 19. The processes illustrated in FIG. 9 to FIG. 19 can be implemented by the mobile electronic device. The image projection operation illustrated in FIG. 9 to FIG. 19 controls an image to be projected based on acquired sound using the function of the sound analyzer 22g. For the operation according to the present embodiment, various types of operations can be implemented even by a configuration not including the authentication processor 22h.

Figure 9:
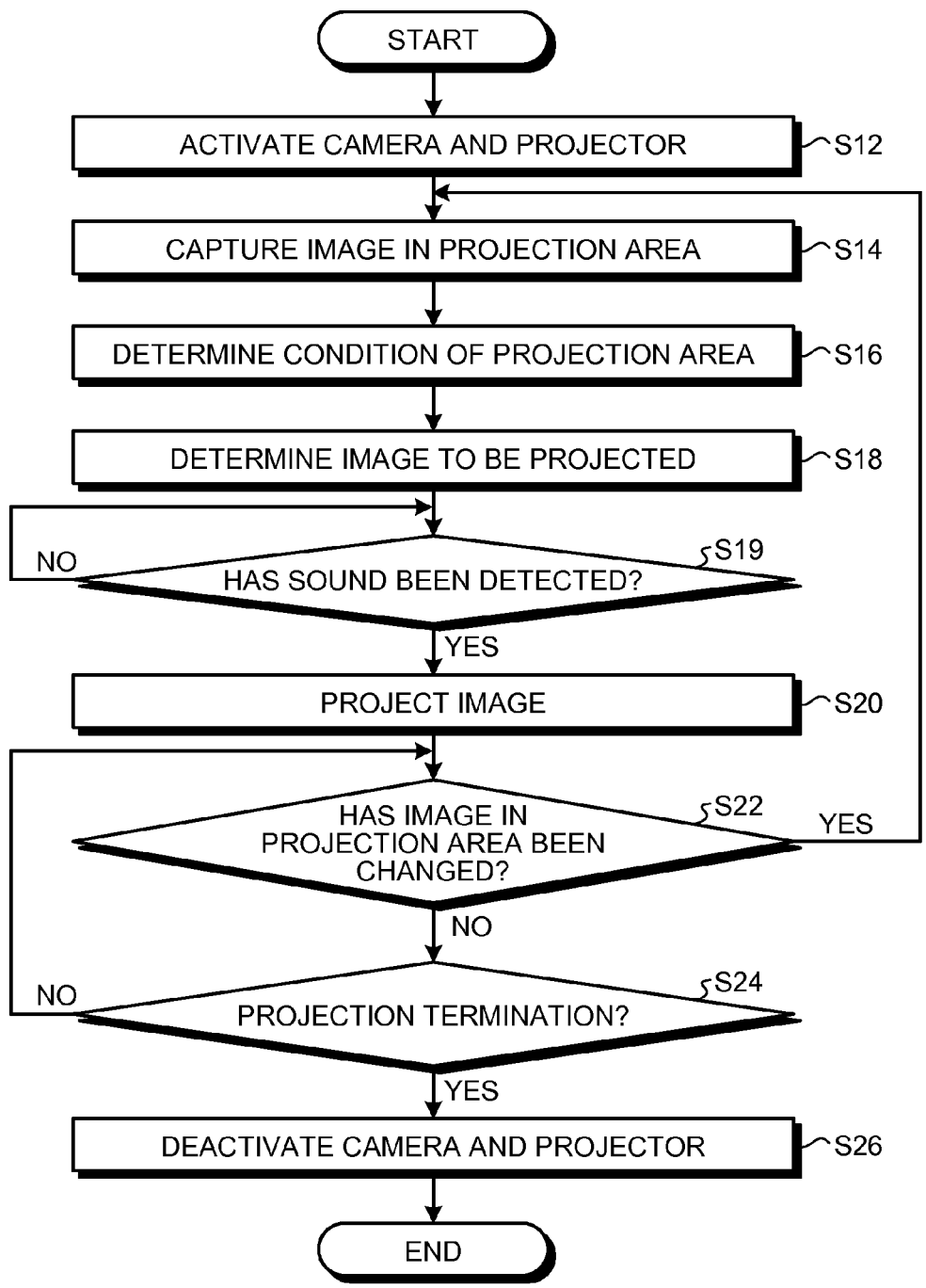
FIG. 9 is a flowchart for explaining an example of the operation of the mobile electronic device.

The image projection operation of the projector in the mobile electronic device will be explained below with reference to FIG. 9. FIG. 9 is a flowchart illustrating an example of the operation of the mobile electronic device. Part of operations in FIG. 9 is the same as operations in the flowchart illustrated in FIG. 5. Therefore, the same step numbers are assigned to the operations, of the operations in FIG. 9, the same as these of the flowchart in FIG. 5, and detailed explanation thereof is omitted.

First of all, when an activation instruction of the projector 34 is input, then at Step S12, the processing unit 22 of the mobile electronic device 1 activates the camera 40 and the projector 34. In the processing unit 22, when the camera 40 and the projector 34 are activated at Step S12, then at Step S14, the camera controller 22f controls the operation of the camera 40 to capture an image in the projection area. In the processing unit 22, when the image in the projection area is captured at Step S14, then at Step S16, the condition determining unit 22c determines the condition of the projection area.

In the processing unit 22, when the condition of the projection area is determined at Step S16, then at Step S18, the projection-image determining unit 22e determines an image to be projected. The processing unit 22 extracts image data corresponding to the specified printed material and sound data related to the content of the specified printed material (here, sound data obtained by reading out at least part of script of the printed material), and determines the extracted data as an image to be projected. The sound data related to the content of the printed material has only to be any that can uniquely specify a page of the printed material, and therefore sound data may be obtained by reading out, for example, the opening portion of the script of the printed material. The image data and the sound data are stored in the storage unit 24 or the external storage unit 25, and the image data corresponding to the specified printed material and the sound data related to the content of the specified printed material are stored in association with information for the printed material. Therefore, the projection-image determining unit 22e searches for the image data stored in the storage unit 24 or in the external storage unit 25 using the information for the printed material as a key, thus extracting the corresponding image data and sound data.

In the processing unit 22, when the image to be projected is determined at Step S18, then at Step S19, the sound analyzer 22g determines whether a sound related to the content of the printed material has been detected by the microphone 15. The detection of the sound related to the content of the printed material can be implemented by the sound analyzer 22g subjecting the sound detected by the microphone 15 to the sound recognition process and determining whether the sound matches the sound data related to the content of the printed material. If the sound related to the content of the printed material has not been detected at Step S19 (No at Step S19), the processing unit 22 causes the process to wait at Step S19. When the sound has been detected at Step S19 (Yes at Step S19), the processing unit 22 proceeds the process to Step S20.

In the processing unit 22, when the sound related to the content of the printed material has been detected at Step S19 (Yes at Step S19), then at Step S20, the projector controller 22a controls the operation of the projector 34 to project the image determined at Step S18 from the projector 34. That is, the processing unit 22 projects the image determined at Step S18 in synchronization with the sound.

When the image is projected at Step S20, then at Step S22, the processing unit 22 determines whether the image in the projection area has been changed. When it is determined that the image has been changed at Step S22 (Yes at Step S22), the processing unit 22 proceeds to Step S14, performs the processes from Step S14 to Step S20, and changes the image to be projected from the projector 34 according to the image in the projection area.

When it is determined that the image has not been changed at Step S22 (No at Step S22), then at Step S24, the processing unit 22 determines whether projection termination has been instructed. When it is determined that the termination has not been instructed at Step S24 (No at Step S24), the processing unit 22 proceeds to Step S22, and performs the process of Step S22. When it is determined that the projection termination has been instructed at Step S24 (Yes at Step S24), then at Step S26, the processing unit 22 deactivates the camera 40 and the projector 34 and ends the present process.

Next, the mobile electronic device 1 will be explained in more detail using specific examples. First of all, the operation of the mobile electronic device 1 according to the present embodiment will be explained below with reference to FIG. 6A and FIG. 6B. As illustrated in FIG. 6A, the printed material 100 is placed in the projection area of the mobile electronic device 1.

When detecting that the printed material 100 is in the projection area, that is, that one scene at a predetermined page of a picture book or so is therein through the processes as illustrated in FIG. 9, the mobile electronic device 1 acquires image data corresponding to the printed material 100. Subsequently, when the user reads out "One day" of a sentence in the content of the page, the mobile electronic device 1 projects the image of the persons 102 from the projector 34 to the projection area in synchronization with the user's voice as illustrated in FIG. 6B. This enables the image of the persons 102 to be displayed on the printed material 100 in addition to the printed components. In the present embodiment, the image of the person is projected; however, an object or a landscape may be projected. When the user reads out "went firewood gathering" of the sentence in the content of the page, the mobile electronic device 1 moves the projected position of the image of the persons 102 to the woods in synchronization with the user's voice through the processes in FIG. 9. This allows the mobile electronic device 1 to move the projected image in synchronization with the user's voice, that is, to project the moving image.

In this way, even if the image to be projected is controlled based on the voice, the mobile electronic device 1 can obtain various effects the same as these of the first embodiment. For example, by projecting the image corresponding to the image in the projection area from the projector 34, the mobile electronic device 1 can create a highly effective image with a simple manner. Moreover, even when the processes according to the present embodiment are performed, the mobile electronic device 1 may be modified in various manners, similarly to the first embodiment.

The sound analyzer 22g of the mobile electronic device 1 simply compares the determined sound data (e.g., the sound data obtained by reading out at least part of the script of the printed material) with the sound data detected by the microphone 15, which facilitates the sound recognition process.

The mobile electronic device 1 may be configured such that user inputs voice to the microphone 15 to select the image corresponding to the image in the projection area as an image to be projected and inputs a projection instruction of the selected image by voice, and the mobile electronic device 1 thereby superimpose the image projected from the projector 34 on the image in the projection area to display a single image in the display area. This enables the user to instruct selection and projection of an image to be projected by voice.

Figure 10:
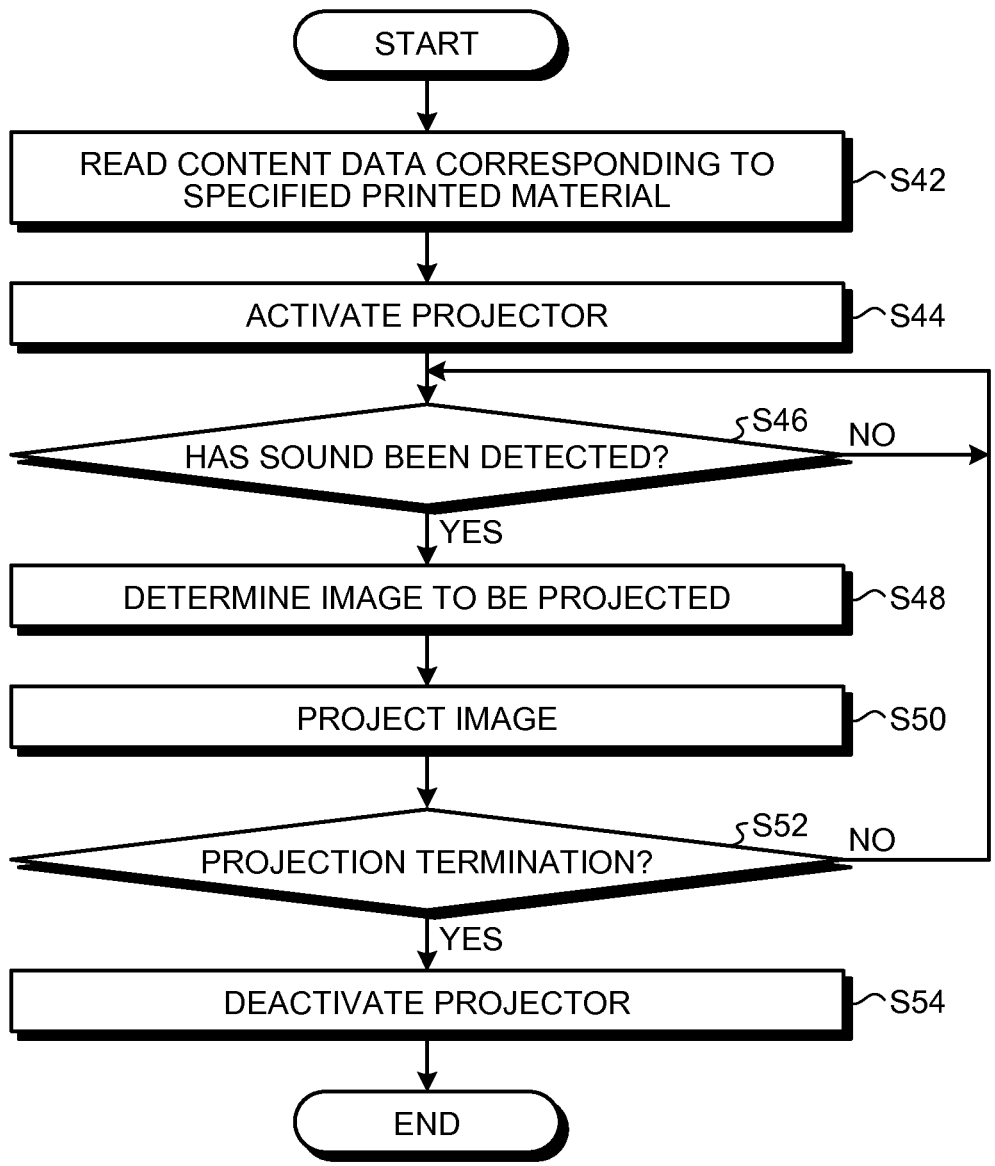
FIG. 10 is a flowchart for explaining an example of the operation of the mobile electronic device.

The image projection operation of the projector 34 in the mobile electronic device 1 in the case of not using the camera 40 as explained above will be explained below. FIG. 10 is a flowchart illustrating an example of the operation of the mobile electronic device. The operation illustrated in FIG. 10 may be executed always when the projector 34 is activated, or may be executed when an execution instruction of a mode to perform the operation in FIG. 10 is input. The operation in FIG. 10 may be processed by executing an application stored in the storage unit 24 or may be processed by executing an application stored in the external storage unit 25. In other words, the program for executing the operation in FIG. 10 may be stored in any of the areas. The program can be acquired by downloading it from an external device or can be acquired by reading it from the external storage unit 25. In the flowchart illustrated in FIG. 10, a specific printed material is placed in an image projection area of the projector 34 in the mobile electronic device 1.

First of all, at Step S42, the processing unit 22 of the mobile electronic device 1 reads content data corresponding to the specified printed material from the storage unit 24 or from the external storage unit 25. The content data corresponding to the specified printed material may be selected by the user. The content data is stored by associating related sound data (here, sound data obtained by reading out at least part of the script of the printed material), for each page, with image data to be projected for each page of the printed material. Therefore, the projection-image determining unit 22e can extract corresponding image data by searching for content data stored in the storage unit 24 or the external storage unit 25 using the sound data as a key. The sound data related to the content of the printed material has only to be any that can uniquely specify a page of the printed material, and, for example, the sound data may be obtained by reading out the opening portion of the script of the printed material.

When the content data is read at Step S42, then at Step S44, the processing unit 22 activates the projector 34. If the projector 34 has been activated when the activation instruction is input, the processing unit 22 proceeds to Step S46 without any operation thereon. The activation process of the projector 34 can be performed by the projector controller 22a.

In the processing unit 22, when the projector 34 is activated at Step S44, then at Step S46, the sound analyzer 22g determines whether a sound has been detected by the microphone 15. When the sound has not been detected at Step S46 (No at Step S46), the processing unit 22 causes the process to wait at Step S46, while when the sound has been detected at Step S46 (Yes at Step S46), the processing unit 22 proceeds the process to Step S48.

In the processing unit 22, when the sound has been detected at Step S46, then at Step S48, the projection-image determining unit 22e determines an image to be projected. Specifically, in the processing unit 22, the projection-image determining unit 22e specifies a page of the printed material placed in the projection area based on the sound data obtained when the sound processor 30 subjects the sound detected at Step S46 to sound recognition, extracts image data corresponding to the specified page, and determines the extracted image data as an image to be projected.

In the processing unit 22, when the image to be projected is determined at Step S48, then at Step S50, the projector controller 22a controls the operation of the projector 34 to project the image determined at Step S48 from the projector 34. That is, the processing unit 22 projects the image determined at Step S48 in synchronization with the sound.

When the image is projected at Step S50, then at Step S52, the processing unit 22 determines whether projection termination has been instructed. When it is determined that the termination has not been instructed at Step S52 (No at Step S52), the processing unit 22 proceeds to Step S46, and performs the process of Step S46. When it is determined that the projection termination has been instructed at Step S52 (Yes at Step S52), then at Step S54, the processing unit 22 deactivates the projector 34 and ends the present process. The projector 34 can be deactivated by the control of the projector controller 22a.

Next, the mobile electronic device 1 will be explained in more detail again with reference to FIG. 6A and FIG. 6B previously explained. As illustrated in FIG. 6A, the printed material 100 is placed in the projection area of the mobile electronic device 1.

The mobile electronic device 1 reads specific content data from the storage unit 24 or from the external storage unit 25 through the processes in FIG. 10. Subsequently, when the user reads out "One day" of the sentence in the content of the page, the mobile electronic device 1 detects that the printed material 100 is in the projection area, that is, that one scene at a predetermined page of the picture book or so is therein through the processes as illustrated in FIG. 10, and determines image data corresponding to the printed material 100. The mobile electronic device 1 projects the image of the persons 102 from the projector 34 to the projection area in synchronization with the user's voice as illustrated in FIG. 6B. This enables the image of the persons 102 to be displayed on the printed material 100 in addition to the printed components. In the present embodiment, the image of the person is projected; however, an object or a landscape may be projected.

In this way, the mobile electronic device 1 can detect a user's voice to determine an image to be projected based on the user's voice, and project the determined image.

The processing unit 22 may be configured to change brightness of an image to be projected in synchronization with the user's voice. For example, if the user sounds out "The night came.", then the processing unit 22 may darken the image to be projected.

The processing unit 22 may be configured to cause the sound processor 30 to identify the voice of an owner of the mobile electronic device 1, and to project an image in response to only the voice of the owner of the mobile electronic device 1. This allows a security function to be implemented.

The processing unit 22 may be configured to change the speed of a moving image to be projected according to a speed at which the user reads out a sentence in the content of a page. This enables the user to control the speed at which the characters of a picture book or so are moved.

The processing unit 22 may be configured to identify a keyword of a sentence in the content of the page and to project an image. Because it is difficult for the user to read the sentence in the content of the page without misreading of every word of the sentence, keywords of the sentence in the content of the page are previously set, and the processing unit 22 projects images according to a flow of the keywords that are sounded out. This enables the processing unit 22 to project a moving image even if the user misreads the sentence in the content of the page.

The processing unit 22 may be configured to identify a voice emitted by the user by separating it word by word and to project a moving image of a different pattern according to a word (when, who, what, etc.) emitted by the user. This enables the user to operate each character and to freely create a story like RPG (role-playing game).

Figure 11:
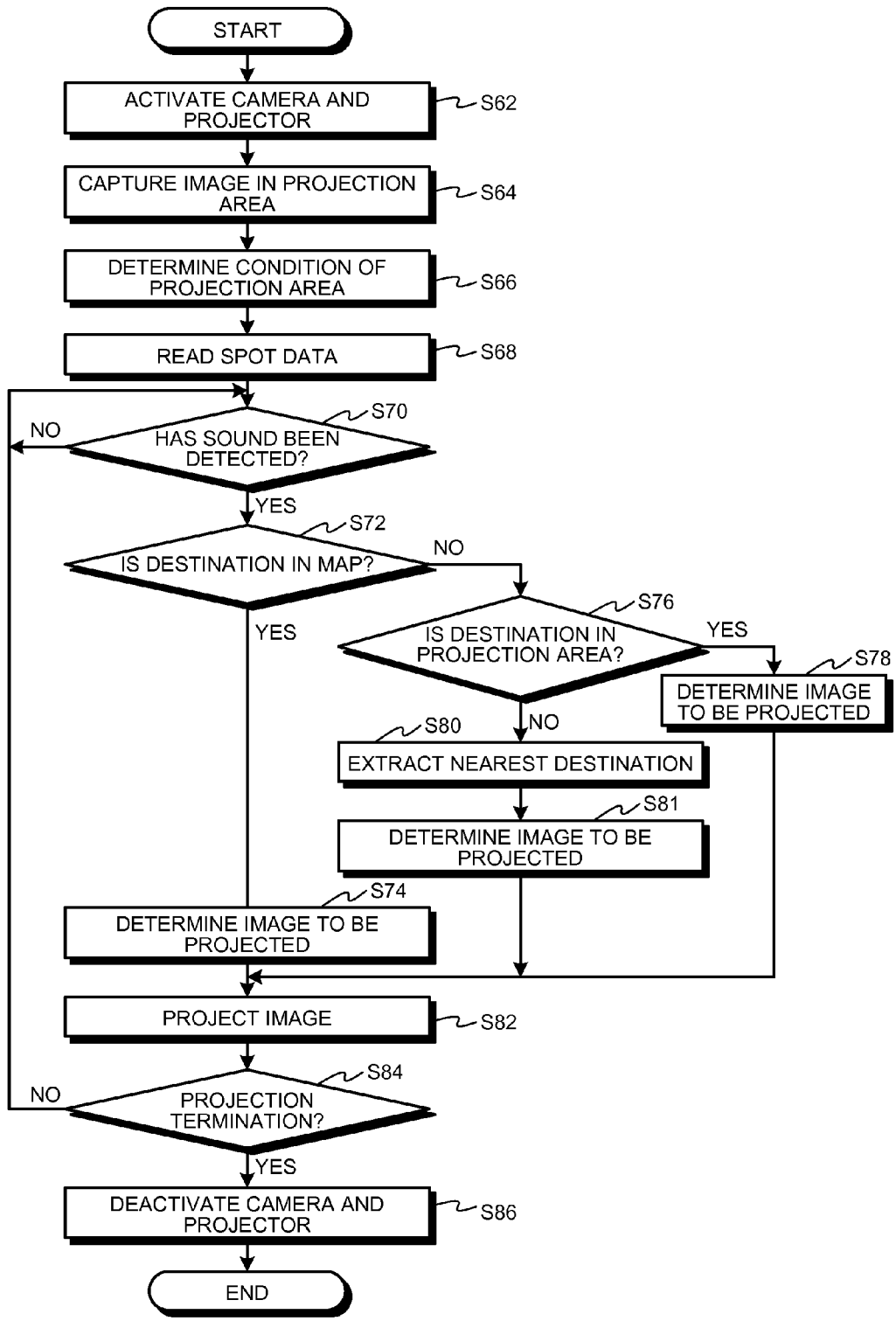
FIG. 11 is a flowchart for explaining an example of the operation of the mobile electronic device.

Next, another embodiment of the present invention will be explained below. The present embodiment is configured to project a spot desired by the user onto a map printed on a sheet of paper, a signboard, or so. FIG. 11 is a flowchart illustrating an example of the operation of the mobile electronic device. The operation illustrated in FIG. 11 may be executed always when the projector 34 is activated, or may be executed when an execution instruction of a mode to perform the operation in FIG. 11 is input. The operation in FIG. 11 may be processed by executing an application stored in the storage unit 24 or may be processed by executing an application stored in the external storage unit 25. In other words, the program for executing the operation in FIG. 11 may be stored in any of the areas. The program can be acquired by downloading it from an external device or can be acquired by reading it from the external storage unit 25. In the flowchart illustrated in FIG. 11, a printed material such as a sheet of paper and a signboard on which a map is printed is placed in an image projection area of the projector 34 in the mobile electronic device 1.

First of all, when an activation instruction of the projector 34 is input, then at Step S62, the processing unit 22 of the mobile electronic device 1 activates the camera 40 and the projector 34. If the camera 40 and the projector 34 have been activated when the activation instruction is input, the processing unit 22 proceeds to Step S64 without any operation thereon. The activation process of the projector 34 can be performed by the projector controller 22a and the activation process of the camera 40 can be performed by the camera controller 22f.

In the processing unit 22, when the camera 40 and the projector 34 are activated at Step S62, then at Step S64, the camera controller 22f controls the operation of the camera 40 to capture an image in the projection area (image displayed on the projection plane). In the processing unit 22, when the image in the projection area is captured at Step S64, then at Step S66, the condition determining unit 22c determines the condition of the projection area. Specifically, in the processing unit 22, the image processor 22b analyzes the captured image in the projection area and detects the components of the image displayed in the projection area. Thereafter, the processing unit 22 determines the condition of the projection area based on the components of the image displayed in the projection area detected through the process by the image processor 22b. That is, the processing unit 22 determines which area the map placed in the projection area indicates.

When the condition of the projection area is determined at Step S66, then at Step S68, the processing unit 22 reads spot data of the area corresponding to the projection area from the storage unit 24 or the external storage unit 25. The spot data is stored in the storage unit 24 or the external storage unit 25, in which information for latitude and longitude is associated with sound data for names (place names, shop names, etc.). Therefore, the processing unit 22 searches for the spot data stored in the storage unit 24 or the external storage unit 25 using the sound data for names as a key, thus extracting corresponding information for latitude and longitude. In some cases, the projection area may not coincide with the map, or the projection area may be wider than the map.

In the processing unit 22, when the spot data is read at Step S68, then at Step S70, the sound analyzer 22g determines whether a sound representing a destination has been detected by the microphone 15. When the sound representing the destination has not been detected at Step S70 (No at Step S70), the processing unit 22 causes the process to wait at Step S70. When the sound representing the destination has been detected at Step S70 (Yes at Step S 70), the processing unit 22 proceeds the process to Step S72.

When the sound representing the destination has been detected at Step S70 (Yes at Step S70), then at Step S72, the processing unit 22 determines whether the destination is in the map based on the sound data subjected to the sound recognition process by the sound analyzer 22g. When it is determined that the destination is in the map at Step S72 (Yes at Step S72), then at Step S74, the processing unit 22 determines an image to be projected. Specifically, the processing unit 22 extracts the spot data including the name that matches the name obtained by subjecting the user's voice to sound recognition in the sound analyzer 22g, and determines an image indicating a position on the map corresponding to the latitude and the longitude of the extracted spot data.

When it is determined that the destination is not in the map at Step S72 (No at Step S72), then at Step S76, the processing unit 22 determines whether the destination is outside the map and inside an area corresponding to the projection area. When it is determined that the destination is outside the map and inside an area corresponding to the projection area at Step S76 (Yes at Step S76), then at Step S78, the processing unit 22 determines an image to be projected. Specifically, the processing unit 22 extracts the spot data including the name that matches the name obtained by subjecting the user's voice to sound recognition in the sound processor 30, and determines an image indicating a location corresponding to the latitude and the longitude of the extracted spot data. It is ideal that the processing unit 22 makes different an image determined herein from the image (Step S74) when the destination is inside the map.

When it is determined that the destination is not in the area corresponding to the projection area at Step S76 (No at Step S76), then at Step S80, the processing unit 22 extracts spot data of a destination nearest to the area corresponding to the projection area. Subsequently, at Step S81, the processing unit 22 determines an image to be projected. Specifically, the processing unit 22 determines an image indicating the direction of the destination as an image to be projected.

In the processing unit 22, when an image to be projected is determined at Step S74, Step S78, or at Step S81, then at Step S82, the projector controller 22a controls the operation of the projector 34 to project the image determined at Step S74, Step S78, or at Step S81 from the projector 34.

When the image is projected at Step S82, then at Step S84, the processing unit 22 determines whether projection termination has been instructed. When it is determined that the termination has not been instructed at Step S84 (No at Step S84), the processing unit 22 proceeds to Step S70, and performs the process of Step S70. When it is determined that the projection termination has been instructed at Step S84 (Yes at Step S84), then at Step S86, the processing unit 22 deactivates the camera 40 and the projector 34 and ends the present process. The camera 40 and the projector 34 can be deactivated by the control of the camera controller 22f and the projector controller 22a respectively.

Figure 12A:
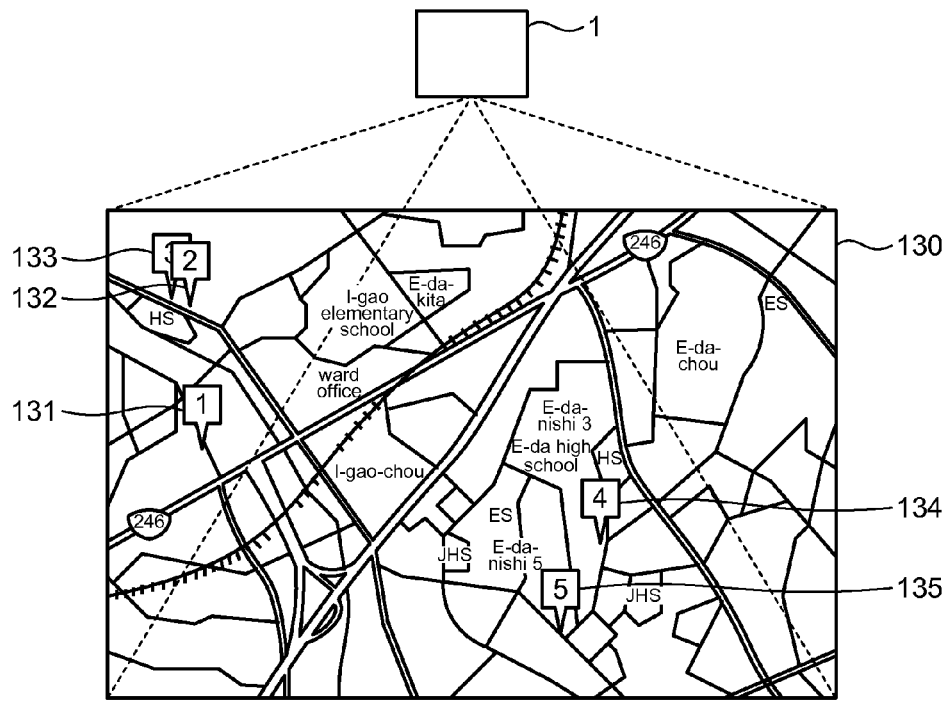
FIG. 12A is an explanatory diagram for explaining an example of the operation of the mobile electronic device.
Figure 12B:
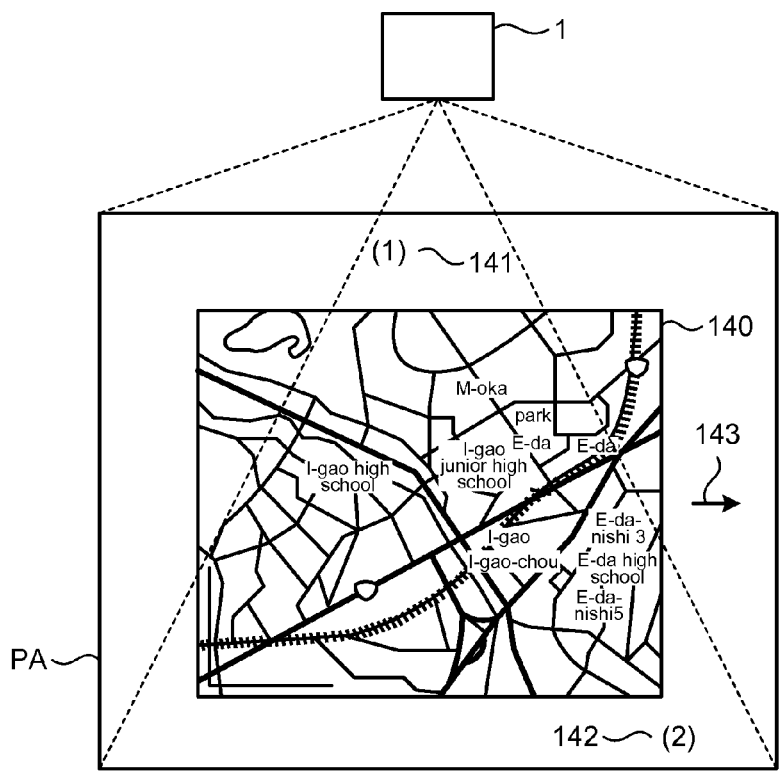
FIG. 12B is an explanatory diagram for explaining an example of the operation of the mobile electronic device.

Next, the mobile electronic device 1 will be explained in more detail using specific examples. FIG. 12A and FIG. 12B are explanatory diagrams for explaining examples of the operation of the mobile electronic device. FIG. 12A and FIG. 12B depict the mobile electronic device 1 as a simple box. First of all, in the example of FIG. 12A, a printed material 130 is placed in the projection area. A map is printed on the printed material 130.

When detecting that the printed material 130 is in the projection area, that is, that a map of a certain area is therein through the processes illustrated in FIG. 11, the mobile electronic device 1 acquires spot data corresponding to the printed material 130. Subsequently, when the user sounds out, for example, "post office" as a name of a user's desired destination, the mobile electronic device 1 extracts spot data including the post office in the name through the processes illustrated in FIG. 11. Then, as illustrated in FIG. 12A, the mobile electronic device 1 projects an image with marks 131 to 135 indicating post offices on to the map printed on the printed material 130. This allows the image indicating the user's desired destination to be displayed in addition to the map printed on the printed material 130.

In this way, the mobile electronic device 1 projects the image corresponding to the image in the projection area from the projector 34, that is, creates a single image in which the image projected from the projector 34 is superimposed on the image in the projection area, thus creating a highly effective image with a simple manner.

Next, in the example of FIG. 12B, a printed material 140 smaller than the projection area PA is placed inside the projection area PA. A map is printed on the printed material 140. When detecting that the printed material 140 is in the projection area, that is, that a map of a certain area is therein, the mobile electronic device 1 acquires spot data corresponding to the projection area PA. Subsequently, when the user sounds out, for example, "golf driving range" as a name of the user's desired destination, the mobile electronic device 1 extracts spot data including the golf driving range in the name through the processes illustrated in FIG. 11. When there is no destination in the area of the printed material 140, the mobile electronic device 1 determines whether the destination is located outside the area of the printed material 140 and inside an area corresponding to the projection area PA. When the destination is located outside the area of the printed material 140 and inside the area corresponding to the projection area PA, the mobile electronic device 1 projects an image with marks 141 and 142 indicating the destination located outside the printed material 140 and inside the projection area PA. When the destination is not located inside the area corresponding to the projection area PA, the mobile electronic device 1 extracts a destination nearest to the area corresponding to the projection area through the processes illustrated in FIG. 11, and projects an arrow 143 indicating a direction in which the destination is located inside the projection area PA. This enables to notify the user that the map corresponding to the direction of the arrow 143 has only to be placed in the projection area PA.

Next, another embodiment of the present invention will be explained below. The present embodiment is configured to irradiate light to a note on a musical score. FIG. 13 is a flowchart illustrating an example of the operation of the mobile electronic device. The operation illustrated in FIG. 13 may be executed always when the projector 34 is activated, or may be executed when an execution instruction of a mode to perform the operation in FIG. 13 is input. The operation in FIG. 13 may be processed by executing an application stored in the storage unit 24 or may be processed by executing an application stored in the external storage unit 25. In other words, the program for executing the operation in FIG. 13 may be stored in any of the areas. The program can be acquired by downloading it from an external device or can be acquired by reading it from the external storage unit 25. In the flowchart illustrated in FIG. 13, a printed material as a musical score is placed in an image projection area of the projector 34 in the mobile electronic device 1.

First of all, when an activation instruction of the projector 34 is input, then at Step S92, the processing unit 22 of the mobile electronic device 1 activates the camera 40 and the projector 34. If the camera 40 and the projector 34 have been activated when the activation instruction is input, the processing unit 22 proceeds to Step S94 without any operation thereon. The activation process of the projector 34 can be performed by the projector controller 22a and the activation process of the camera 40 can be performed by the camera controller 22f.

In the processing unit 22, when the camera 40 and the projector 34 are activated at Step S92, then at Step S94, the camera controller 22f controls the operation of the camera 40 to capture an image in the projection area (image displayed on the projection plane). In the processing unit 22, when the image in the projection area is captured at Step S94, then at Step S96, the condition determining unit 22c determines the condition of the projection area. Specifically, in the processing unit 22, the image processor 22b analyzes the captured image in the projection area and detects the components of the image (a five-line staff and notes) displayed in the projection area. Thereafter, the processing unit 22 determines the condition of the projection area based on the components of the image displayed in the projection area detected through the process by the image processor 22b.

In the processing unit 22, when the condition of the projection area is determined at Step S96, then at Step S98, the sound analyzer 22g determines whether a sound has been detected by the microphone 15. When the sound has not been detected at Step S98 (No at Step S98), the processing unit 22 causes the process to wait at Step S98. When the sound has been detected at Step S98 (Yes at Step S 98), the processing unit 22 proceeds the process to Step S100.

When the sound has been detected at Step S98 (Yes at Step S98), then at Step S100, the processing unit 22 determines the note corresponding to the detected sound (pitch) as a note to be irradiated with the light based on the sound data subjected to the sound recognition process by the sound analyzer 22g. When the note to be irradiated with the light is determined at Step S100, then at Step S102, the processing unit 22 irradiates the light to the note.

When the note is irradiated with the light at Step S102, then at Step S104, the processing unit 22 determines whether projection termination has been instructed. When it is determined that the termination has not been instructed at Step S104 (No at Step S104), the processing unit 22 proceeds to Step S98, and performs the process of Step S98. When it is determined that the projection termination has been instructed at Step S104 (Yes at Step S104), then at Step S106, the processing unit 22 deactivates the camera 40 and the projector 34 and ends the present process. The camera 40 and the projector 34 can be deactivated by the control of the camera controller 22f and the projector controller 22a respectively.

Next, the mobile electronic device 1 will be explained in more detail using specific examples. FIG. 14A to FIG. 14D are explanatory diagrams for explaining an example of the operation of the mobile electronic device. FIG. 14A to FIG. 14D depict the mobile electronic device 1 as a simple box. In the example illustrated in FIG. 14A to FIG. 14D, a printed material 150 is placed in the projection area. A musical score is printed on the printed material 150. Specifically, a five-line staff and notes 151 to 156 are printed on the printed material 150.

Figure 14A:
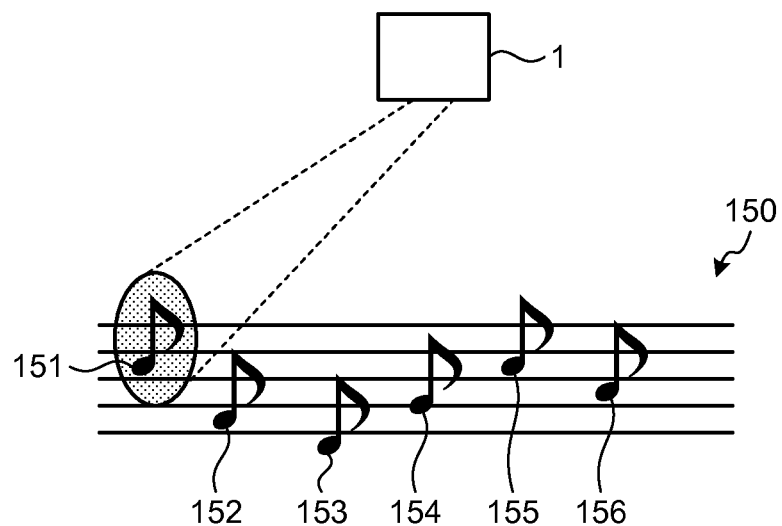
FIG. 14A is an explanatory diagram for explaining an example of the operation of the mobile electronic device.
Figure 14B:
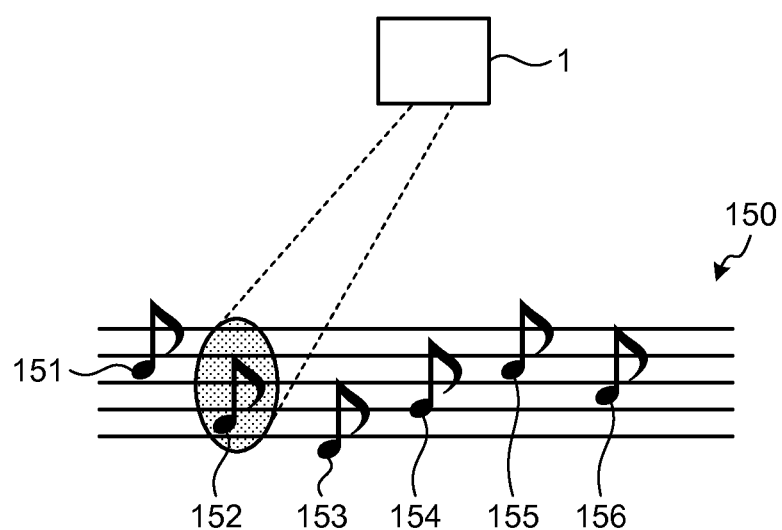
FIG. 14B is an explanatory diagram for explaining an example of the operation of the mobile electronic device.
Figure 14C:
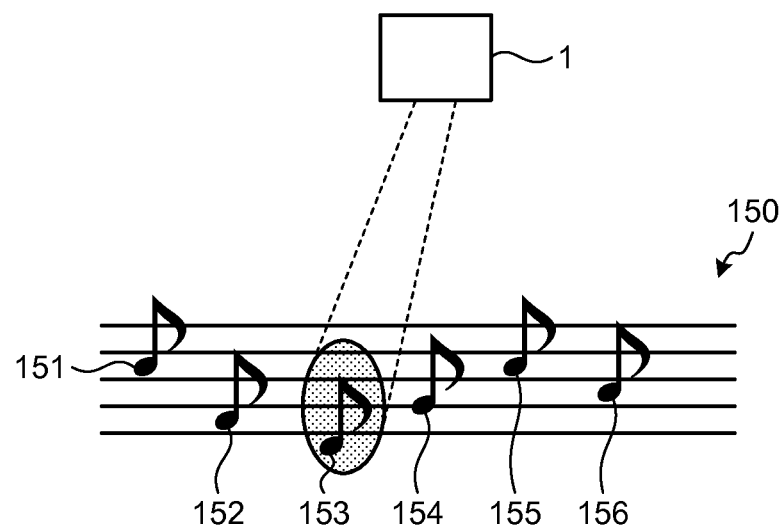
FIG. 14C is an explanatory diagram for explaining an example of the operation of the mobile electronic device.
Figure 14D:
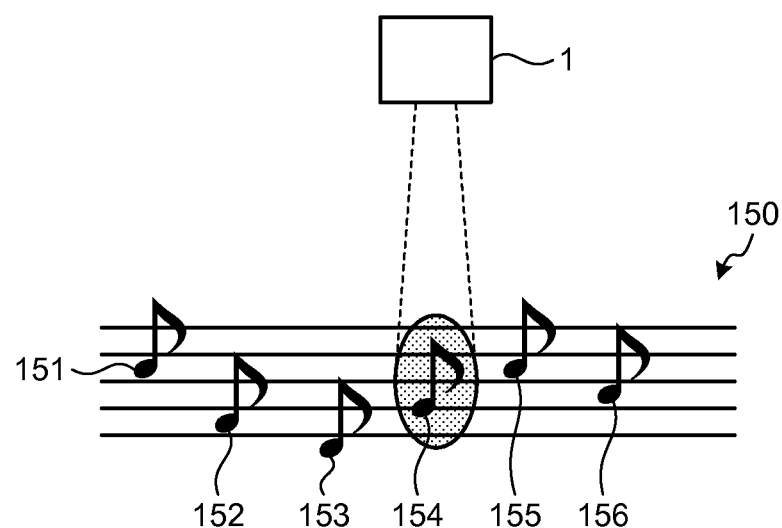
FIG. 14D is an explanatory diagram for explaining an example of the operation of the mobile electronic device.

When detecting that the printed material 150 is in the projection area, that is, that a musical score is therein through the processes illustrated in FIG. 13, the mobile electronic device 1 detects the notes 151 to 156. Subsequently, the mobile electronic device 1 detects a sound through the processes illustrated in FIG. 13. When detecting the sound, the mobile electronic device 1 irradiates the light to a note corresponding to the sound through the processes illustrated in FIG. 13. For example, when detecting a sound corresponding to the note 151, the mobile electronic device 1 irradiates the light to the note 151 as illustrated in FIG. 14A. Likewise, when detecting a sound corresponding to the note 152, the mobile electronic device 1 irradiates the light to the note 152 as illustrated in FIG. 14B; when detecting a sound corresponding to the note 153, the mobile electronic device 1 irradiates the light to the note 153 as illustrated in FIG. 14C; and when detecting a sound corresponding to the note 154, the mobile electronic device 1 irradiates the light to the note 154 as illustrated in FIG. 14D.

In this way, the mobile electronic device 1 irradiates the light to the note corresponding to each detected sound, and can thereby notify the user of a part of the musical score he/she is playing.

The mobile electronic device 1 detects a sound by the microphone 15 in the explanation; however, music data is previously stored in the storage unit 24 or the external storage unit 25 of the mobile electronic device 1, so that the mobile electronic device 1 may output a tune based on the music data and irradiate the light to a corresponding note. This allows the mobile electronic device 1 to implement a function as a learning material for the user to learn the tune.

Next, another embodiment of the present invention will be explained below. The present embodiment is configured to irradiate an image of a note to a five-line staff. FIG. 15 is a flowchart illustrating an example of the operation of the mobile electronic device. The operation illustrated in FIG. 15 may be executed always when the projector 34 is activated, or may be executed when an execution instruction of a mode to perform the operation in FIG. 15 is input. The operation in FIG. 15 may be processed by executing an application stored in the storage unit 24 or may be processed by executing an application stored in the external storage unit 25. In other words, the program for executing the operation in FIG. 15 may be stored in any of the areas. The program can be acquired by downloading it from an external device or can be acquired by reading it from the external storage unit 25. In the flowchart illustrated in FIG. 15, a material on which the five-line staff is described is placed in an image projection area of the projector 34 in the mobile electronic device 1. The five-line staff may be handwritten or printed.

First of all, when an activation instruction of the projector 34 is input, then at Step S112, the processing unit 22 of the mobile electronic device 1 activates the camera 40 and the projector 34. If the camera 40 and the projector 34 have been activated when the activation instruction is input, the processing unit 22 proceeds to Step S114 without any operation thereon. The activation process of the projector 34 can be performed by the projector controller 22a and the activation process of the camera 40 can be performed by the camera controller 22f.

In the processing unit 22, when the camera 40 and the projector 34 are activated at Step S112, then at Step S114, the camera controller 22f controls the operation of the camera 40 to capture an image in the projection area (image displayed on the projection plane). In the processing unit 22, when the image in the projection area is captured at Step S114, then at Step S116, the condition determining unit 22c determines the condition of the projection area. Specifically, in the processing unit 22, the image processor 22b analyzes the captured image in the projection area and detects the components of the image (five-line staff) displayed in the projection area. Thereafter, the processing unit 22 determines the condition of the projection area based on the components of the image displayed in the projection area detected through the process by the image processor 22b.

In the processing unit 22, when the condition of the projection area is determined at Step S116, then at Step S118, the sound analyzer 22g determines whether a sound has been detected by the microphone 15. When the sound has not been detected at Step S118 (No at Step S118), the processing unit 22 causes the process to wait at Step S118. When the sound has been detected at Step S118 (Yes at Step S 118), the processing unit 22 proceeds the process to Step S120.

When the sound has been detected at Step S118 (Yes at Step S118), then at Step S120, the processing unit 22 projects a note corresponding to the detected sound (pitch) in a highlight mode to the five-line staff based on the sound data subjected to the sound recognition process by the sound processor 30. As for second and subsequent notes, the processing unit 22 projects the previous note(s) in a normal (non-highlight) mode and projects the current note in the highlight mode to the right side of the immediately preceding note. When notes are already projected up to the end of the lines of the five-line staff, the processing unit 22 projects the current note in the highlight mode to the beginning of the next lines. When the note is projected in the highlight mode at Step S120, then at Step S122, the processing unit 22 stores the note in the storage unit 24 or the external storage unit 25.

When the note is stored at Step S122, then at Step S124, the processing unit 22 determines whether projection termination has been instructed. When it is determined that the termination has not been instructed at Step S124 (No at Step S124), the processing unit 22 proceeds to Step S118, and performs the process of Step S118. When it is determined that the projection termination has been instructed at Step S124 (Yes at Step S124), then at Step S126, the processing unit 22 deactivates the camera 40 and the projector 34 and ends the present process. The camera 40 and the projector 34 can be deactivated by the control of the camera controller 22f and the projector controller 22a respectively.

Next, the mobile electronic device 1 will be explained in more detail using specific examples. FIG. 16 to FIG. 19 are explanatory diagrams for explaining an example of the operation of the mobile electronic device. FIG. 16 to FIG. 19 depict the mobile electronic device 1 as a simple box. In the example illustrated in FIG. 16 to FIG. 19, a printed material 160 is placed in the projection area. A five-line staff is drawn on the printed material 160. The five-line staff may be printed. Two or more five-line staffs may be drawn thereon.

Figure 16:
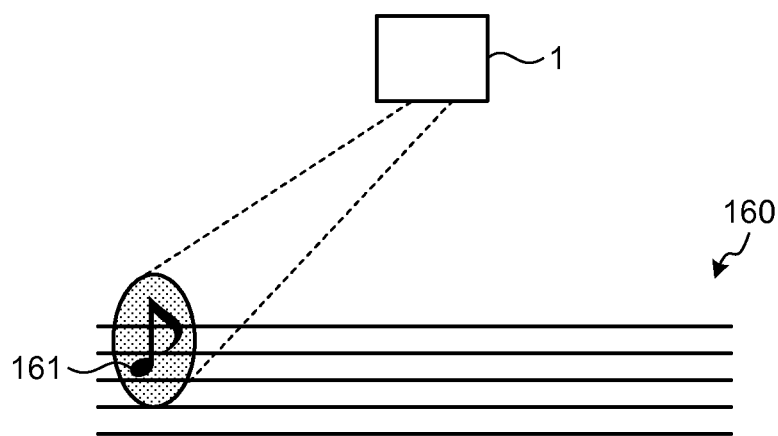
FIG. 16 is an explanatory diagram for explaining an example of the operation of the mobile electronic device.
Figure 17:
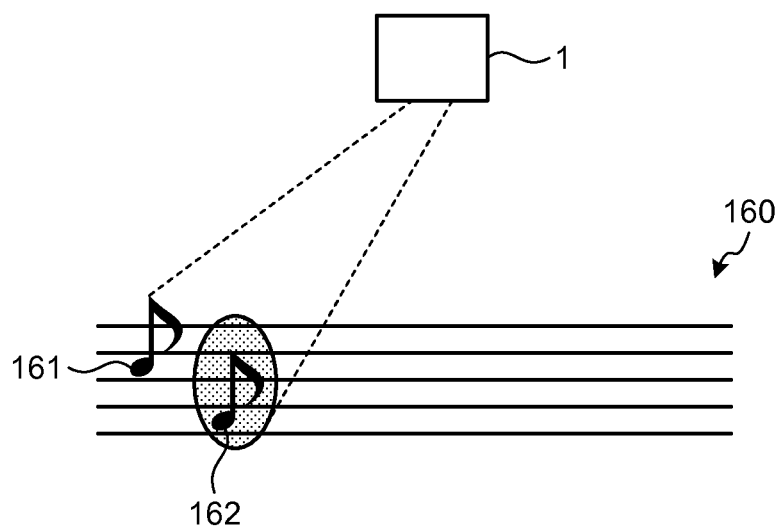
FIG. 17 is an explanatory diagram for explaining an example of the operation of the mobile electronic device.
Figure 18:
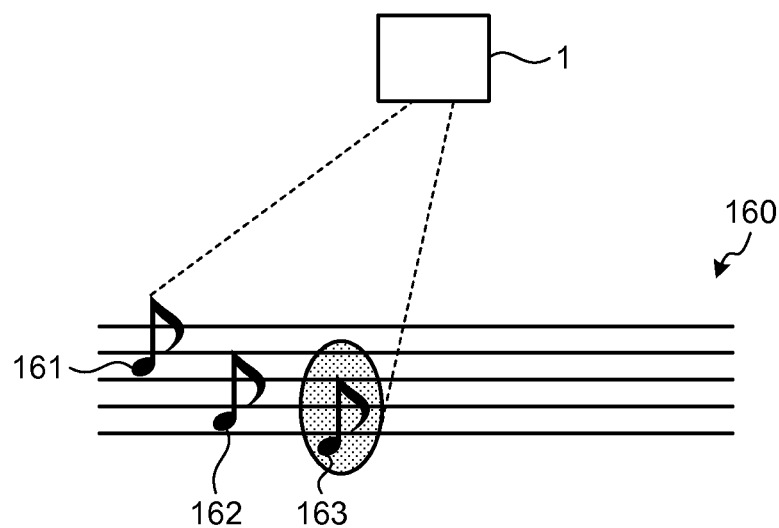
FIG. 18 is an explanatory diagram for explaining an example of the operation of the mobile electronic device.
Figure 19:
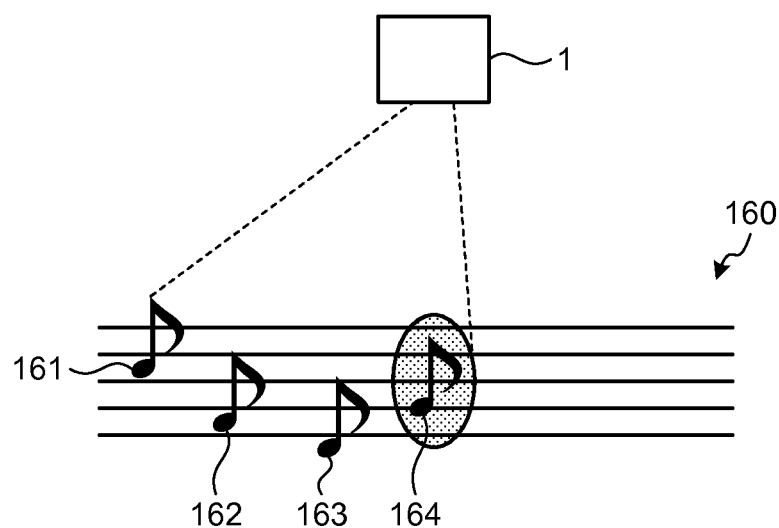
FIG. 19 is an explanatory diagram for explaining an example of the operation of the mobile electronic device.

The mobile electronic device 1 detects that the printed material 160 is in the projection area, that is, that a musical score is therein through the processes illustrated in FIG. 15. Subsequently, the mobile electronic device 1 detects a sound through the processes illustrated in FIG. 15. When detecting the sound, as illustrated in FIG. 16, the mobile electronic device 1 projects a note 161 corresponding to the sound in the highlight mode through the processes illustrated in FIG. 15. Subsequently, when detecting a sound, as illustrated in FIG. 17, the mobile electronic device 1 projects the note 161 in the normal (non-highlight) mode and projects a note 162, corresponding to the sound detected this time, in the highlight mode to the right side of the immediately preceding note 161 through the processes illustrated in FIG. 15. Subsequently, when detecting a sound, as illustrated in FIG. 18, the mobile electronic device 1 projects the note 162 in the normal (non-highlight) mode and projects a note 163, corresponding to the sound detected this time, in the highlight mode to the right side of the immediately preceding note 162 through the processes illustrated in FIG. 15. Subsequently, when detecting a sound, as illustrated in FIG. 19, the mobile electronic device 1 projects the note 163 in the normal (non-highlight) mode and projects a note 164, corresponding to the sound detected this time, in the highlight mode to the right side of the immediately preceding note 163 through the processes illustrated in FIG. 15.

In this way, the mobile electronic device 1 enables composition only by drawing a five-line staff on an arbitrary sheet of paper without using a composition tool or so that runs on a PC (personal computer). Because the size of the display 2 of the mobile electronic device 1 is small, it is difficult to look at the display 2 while playing an instrument. However, according to the mobile electronic device 1, if the user draws a five-line staff in a desired size at a desired location, then he/she can look at notes while playing the instrument.

The final content of the composition may be recorded on a sheet of paper or so by the user tracing the projected notes, or may be stored in the storage unit 24 or in the external storage unit 25 of the mobile electronic device 1 by capturing the notes projected on the five-line staff by the camera 40.

For a purpose of learning music, it may be configured to prepare musical-score information in the storage unit 24 or the external storage unit 25 of the mobile electronic device 1, to project, if a sound played by the user matches a note of the musical score, the note, and to display, if a sound played by the user does not match a note of the musical score, a correct scale in the highlight mode so as to notify the user to that effect.

The second embodiment has been explained using the example in which an image to be projected is a person in a case the image in the projection area is an image of one scene of a picture book or so, the example in which an image to be projected is a map and an image to be projected is an image indicating a destination, and the example in which an image to be projected is a musical score or a five-line staff and an image to be projected is a note. However, a combination of an image in the projection area i.e. an image previously created and placed in the projection area of a printed material or so with an image to be projected i.e. an image to be projected from the projector 34 can include a variety of combinations similarly to the first embodiment.

If the image in the projection area is an image of comic, the mobile electronic device 1 may set a picture of a person or of an object corresponding to a user's voice as an image to be projected. This allows the user to freely select a character and the like that will appear in the comic. By sounding out a word such as when, who, and what, the user can freely create a story by moving the character. An image to be projected may be a dialogue. In other words, a dialogue corresponding to a user's voice may be projected to a balloon of the comic in the projection area. This allows the user to freely create a story. By storing the input dialogue associated with the balloon, the dialogue can be repeatedly displayed. In addition, various dialogues can be assigned to comics.

If the image in the projection area is an image of a score book, the mobile electronic device 1 may set a practice record (when it is practiced, how many times it is practiced) as an image to be projected. This enables to notify the user of how he/she is practicing. A time during which the user plays on that day or a total time during which the user has played the piece of music since the past may be set as an image to be projected. When detecting a sound corresponding to the last note of a page of the score, the mobile electronic device 1 may project a score at a next page. This enables an action of turning the score during playing to be eliminated.

Third Embodiment

Next, another embodiment of the image projection operation of the projector in the mobile electronic device will be explained with reference to FIG. 20 to FIG. 25B. The processes illustrated in FIG. 20 to FIG. 25B can be implemented by the mobile electronic device. The image projection operations illustrated in FIG. 20 to FIG. 25B control each image to be projected based on acquired information using the function of the communication unit (information acquiring unit) 26. For the operations according to the present embodiment, various operations can be implemented even by a configuration not including the sound analyzer 22g and the authentication processor 22h.

Next, the image projection operation of the projector in the mobile electronic device will be explained below with reference to FIG. 20. Part of operations in FIG. 20 is the same as the operations in the flowchart illustrated in FIG. 5. Therefore, the same step numbers are assigned to the operations, of the operations in FIG. 20, the same as these of the flowchart in FIG. 5, and detailed explanation thereof is omitted.

First of all, when an activation instruction of the projector 34 is input, then at Step S12, the processing unit 22 of the mobile electronic device 1 activates the camera 40 and the projector 34. In the processing unit 22, when the camera 40 and the projector 34 are activated at Step S12, then at Step S14, the camera controller 22f controls the operation of the camera 40 to capture an image in the projection area. In the processing unit 22, when the image in the projection area is captured at Step S14, then at Step S16, the condition determining unit 22c determines the condition of the projection area.

When the condition of the projection area is determined at Step S16, then at Step S17, the processing unit 22 acquires information from an external device (e.g., server). Specifically, the processing unit 22 specifies the printed material placed in the projection area based on the condition (identification information) of the projection area determined at Step S16, acquires latest information (e.g., image data associated with information for the printed material, data indicating whether the image data is updated, etc.) corresponding to the specified printed material from the external device by the communication unit 26, and stores the acquired information in the storage unit 24 or the external storage unit 25. When the latest information corresponding to the specified printed material is stored in the storage unit 24 or the external storage unit 25, the processing unit 22 has only to acquire data indicating that the image data is not updated, and therefore there is no need to acquire the image data from the external device.

In the processing unit 22, when acquiring the information from the external device at Step S17, then at Step S18, the projection-image determining unit 22e determines an image to be projected. Specifically, in the processing unit 22, the projection-image determining unit 22e extracts image data corresponding to the specified printed material based on the information acquired at Step S17 and determines an image to be projected. The image data is stored in the storage unit 24 or the external storage unit 25, and the image data corresponding to the specified printed material is stored in association with information for the printed material. Therefore, the projection-image determining unit 22e searches for the image data stored in the storage unit 24 or in the external storage unit 25 using the information for the printed material as a key, thus extracting corresponding image data.

In the processing unit 22, when the image to be projected is determined at Step S18, then at Step S20, the projector controller 22a controls the operation of the projector 34 to project the image determined at Step S18 from the projector 34.

When the image is projected at Step S20, then at Step S22, the processing unit 22 determines whether the image in the projection area has been changed. When it is determined that the image has been changed at Step S22 (Yes at Step S22), the processing unit 22 proceeds to Step S14, performs the processes from Step S14 to Step S20, and changes the image to be projected from the projector 34 according to the image in the projection area.

When it is determined that the image has not been changed at Step S22 (No at Step S22), then at Step S24, the processing unit 22 determines whether projection termination has been instructed. When it is determined that the termination has not been instructed at Step S24 (No at Step S24), the processing unit 22 proceeds to Step S22, and performs the process of Step S22. When it is determined that the projection termination has been instructed at Step S24 (Yes at Step S24), then at Step S26, the processing unit 22 deactivates the camera 40 and the projector 34 and ends the present process.

Figure 21A:
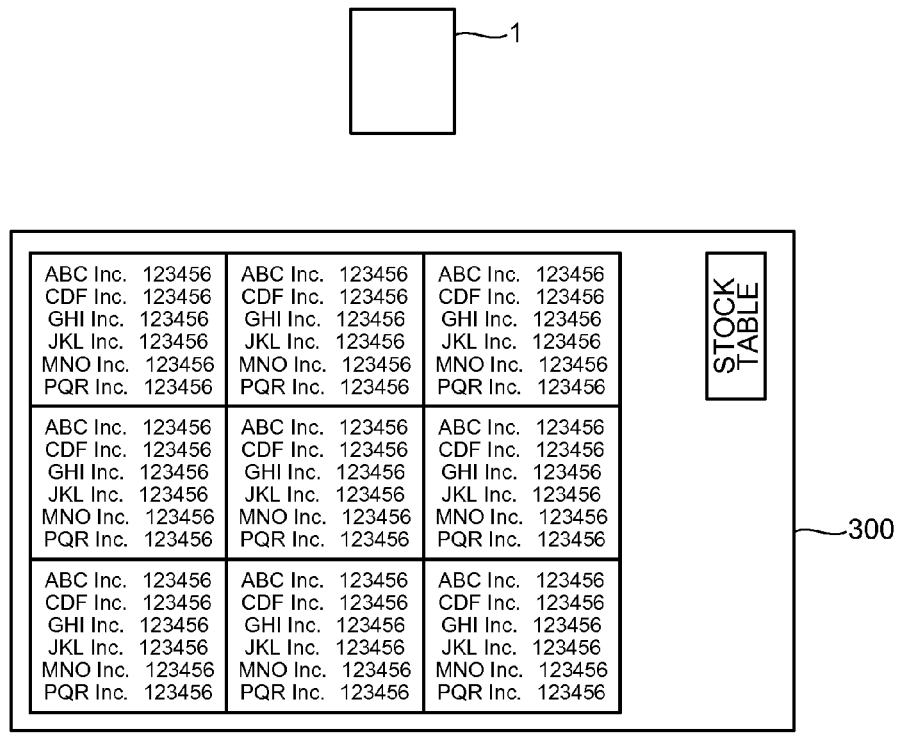
FIG. 21A is an explanatory diagram for explaining an example of the operation of the mobile electronic device.
Figure 21B:
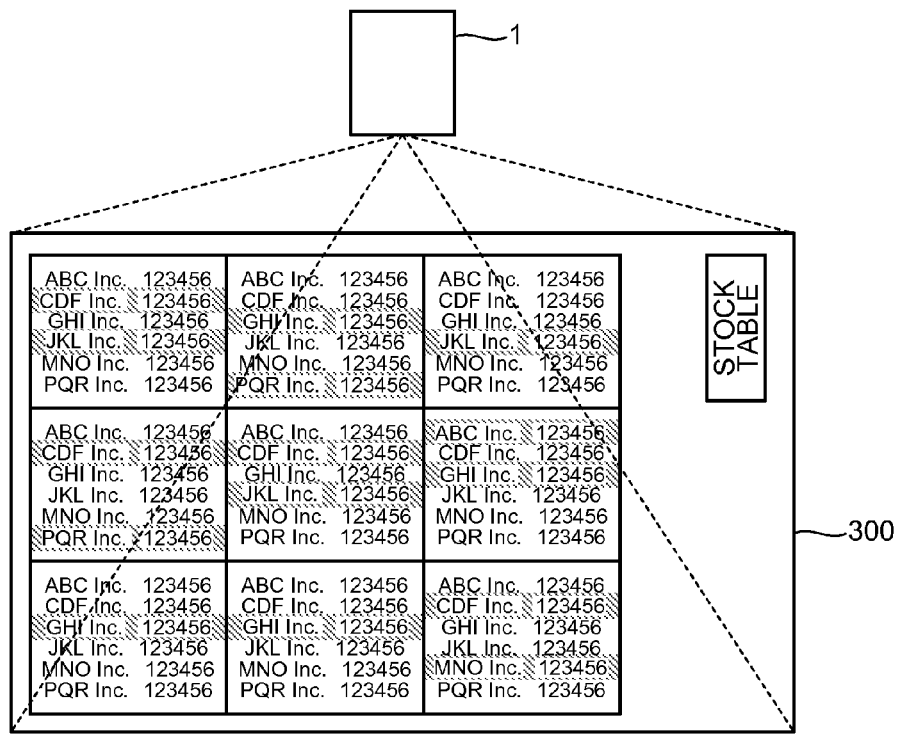
FIG. 21B is an explanatory diagram for explaining an example of the operation of the mobile electronic device.
Figure 22A:
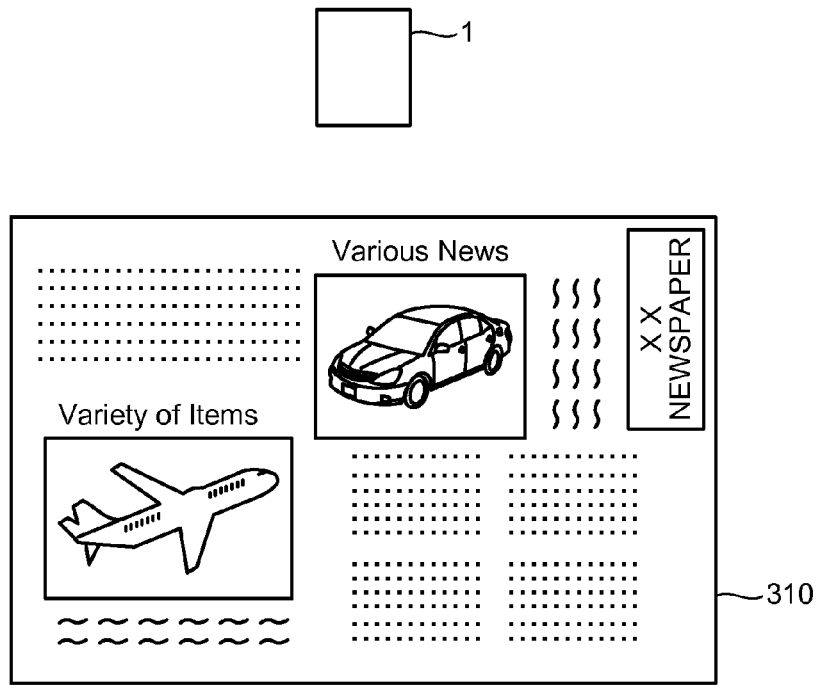
FIG. 22A is an explanatory diagram for explaining an example of the operation of the mobile electronic device.
Figure 22B:
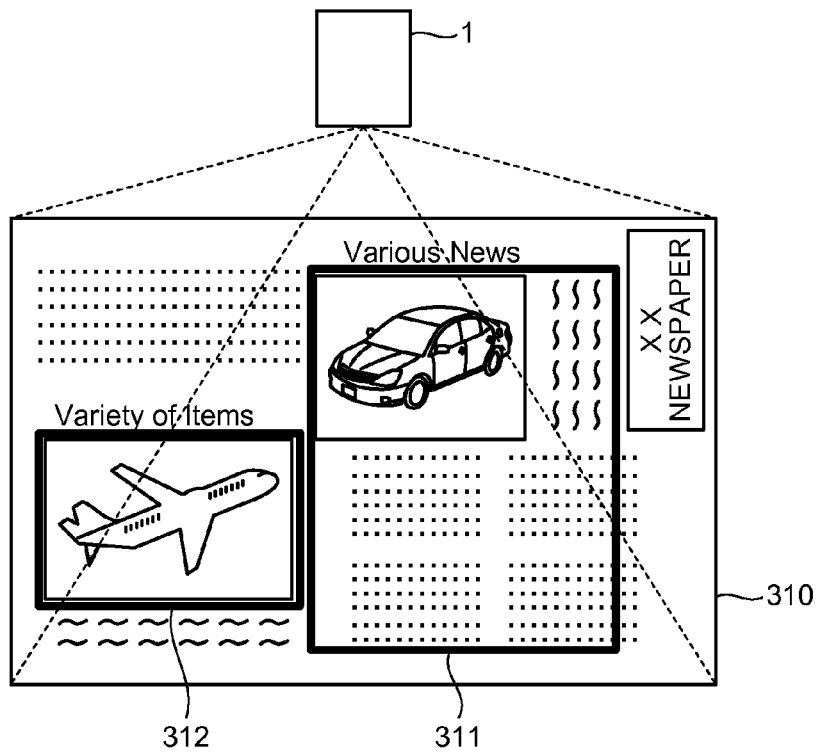
FIG. 22B is an explanatory diagram for explaining an example of the operation of the mobile electronic device.
Figure 23A:
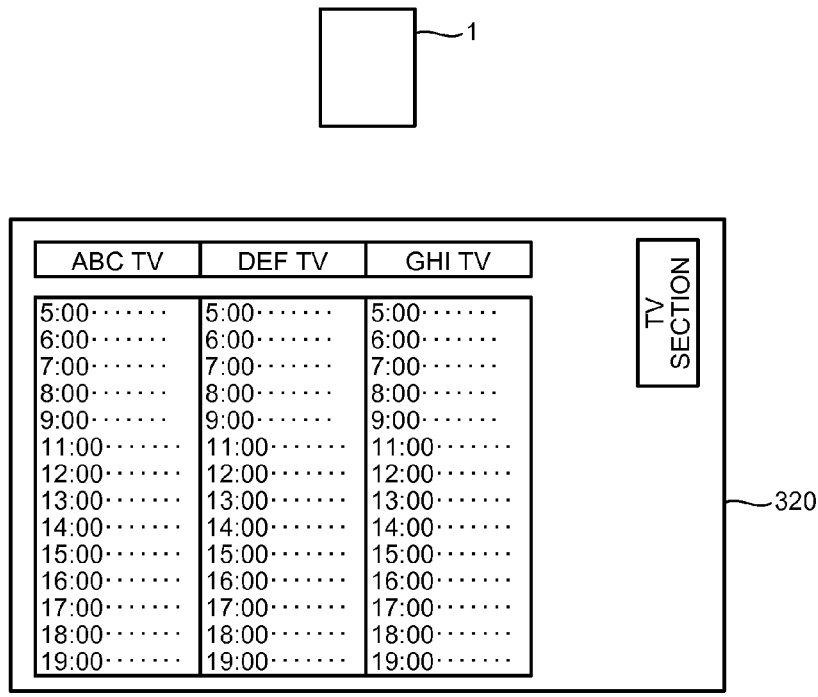
FIG. 23A is an explanatory diagram for explaining an example of the operation of the mobile electronic device.
Figure 23B:
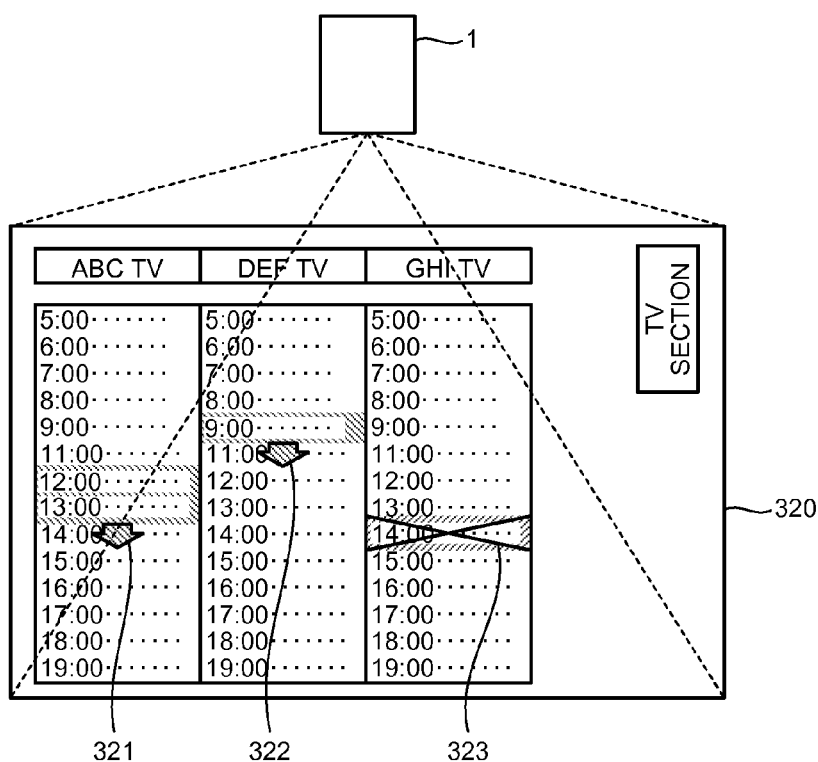
FIG. 23B is an explanatory diagram for explaining an example of the operation of the mobile electronic device.
Figure 24A:
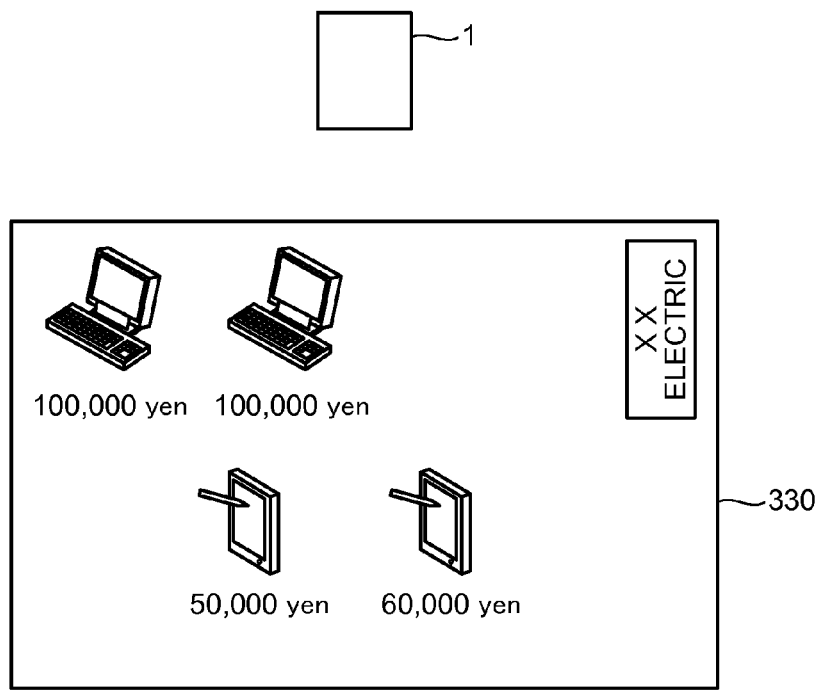
FIG. 24A is an explanatory diagram for explaining an example of the operation of the mobile electronic device.
Figure 24B:
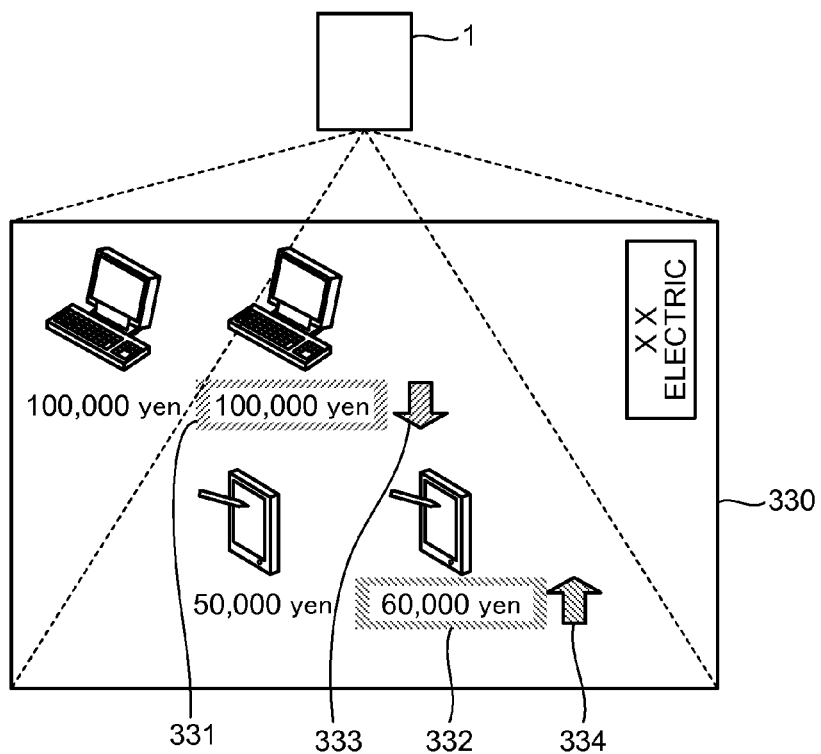
FIG. 24B is an explanatory diagram for explaining an example of the operation of the mobile electronic device.
Figure 25A:
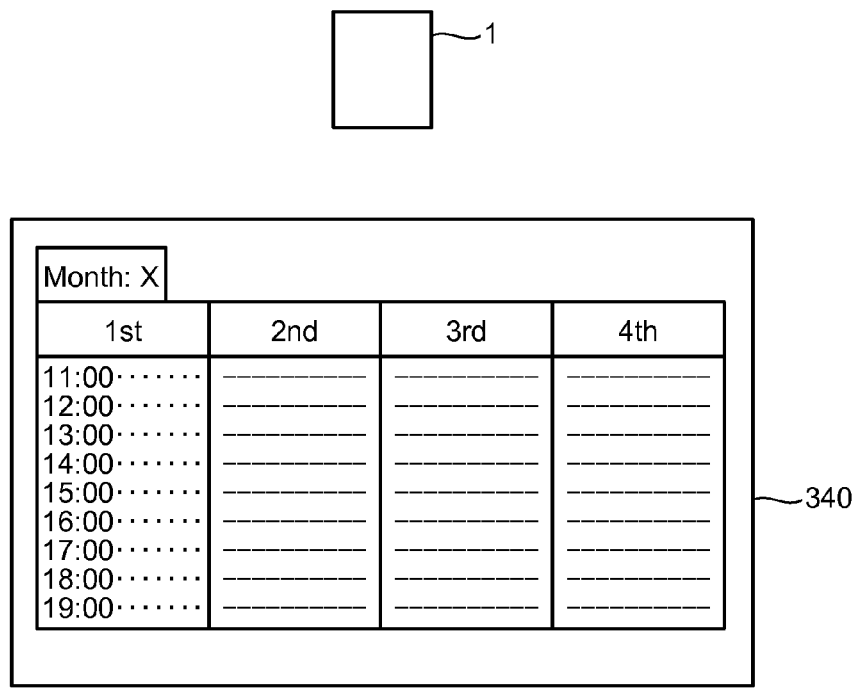
FIG. 25A is an explanatory diagram for explaining an example of the operation of the mobile electronic device.
Figure 25B:
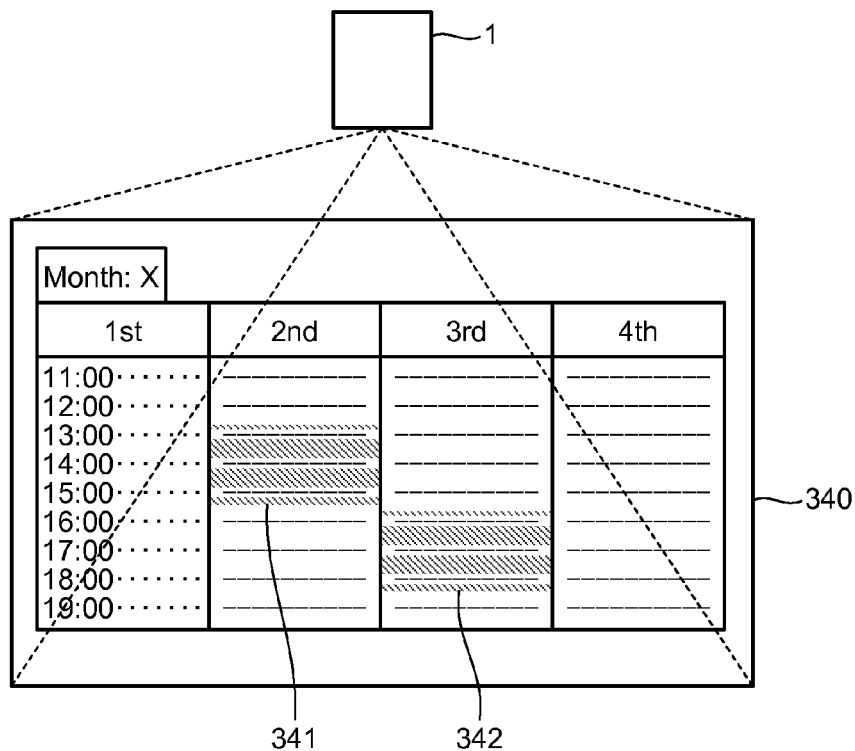
FIG. 25B is an explanatory diagram for explaining an example of the operation of the mobile electronic device.

Next, the mobile electronic device 1 will be explained in more detail using specific examples. FIG. 21A and FIG. 21B are explanatory diagrams for explaining an example of the operation of the mobile electronic device. FIG. 22A and FIG. 22B are explanatory diagrams for explaining another example of the operation of the mobile electronic device. FIG. 23A and FIG. 23B are explanatory diagrams for explaining another example of the operation of the mobile electronic device. FIG. 24A and FIG. 24B are explanatory diagrams for explaining another example of the operation of the mobile electronic device. FIG. 25A and FIG. 25B are explanatory diagrams for explaining another example of the operation of the mobile electronic device. FIG. 21A to FIG. 25B depict the mobile electronic device 1 as a simple box.

First of all, in the example of FIG. 21A, a printed material 300 is placed in the projection area. The printed material 300 is a page of a newspaper. Specifically, a headline ("Stock Table") and previous close of each stock is printed on the printed material 300. Because the stock market opens at 9 a.m., the stock prices on this page become older after 9 a.m. The mobile electronic device 1 stores the positions of the stocks on the page in the storage unit 24 or the external storage unit 25 as layout information.

When detecting that the printed material 300 is in the projection area, that is, that a page of a newspaper is therein through the processes in FIG. 20, the mobile electronic device 1 acquires latest information corresponding to the printed material 300, i.e. fluctuations in the stock price of each stock of the day or the latest stock price of each stock, from an external device (e.g., a server of a newspaper company). Then, as illustrated in FIG. 21B, the mobile electronic device 1 projects a mark (image), for notifying the reader of a stock whose stock price is changed, to the projection area from the projector 34. For example, the mobile electronic device 1 may project a red light to a stock whose stock price has moved up more than that on the previous day or may project a blue light to a stock whose stock price has moved down more than that on the previous day. The image is not limited thereto, and the image has only to be any image that can notify the reader of fluctuations in stock prices. For example, the mobile electronic device 1 may project an up-arrow to a stock whose stock price has moved up more than that on the previous day and may project a down-arrow to a stock whose stock price has moved down more than that on the previous day. For example, the mobile electronic device 1 may project a gauge or a graph indicating price movements to a stock whose stock price has changed as compared with that on the previous day. For example, the mobile electronic device 1 may project the latest stock price to a stock whose stock price has changed as compared with that on the previous day in a range in which text visibility is not affected thereby.

This enables the reader to learn of the latest information on the stock prices. Although the stock page of a newspaper is used herein as an example for explanation, the example is not limited thereto, and therefore the example is applicable to a settlement column of quarterly corporate report. It is also applicable to a page of a newspaper on which prices of financial instruments such as future transactions and funds are printed.

Next, in the example of FIG. 22A, a printed material 310 is placed in the projection area. The printed material 310 in this case is a page of a newspaper. Specifically, the name of the newspaper, headlines, and text and image of contents of each news are printed on the printed material 310. The text and the image of contents of each news are determined when writing about them is completed, and therefore the text and/or the image of the contents of each news are possibly updated by the time the reader views the text and/or the image of contents of each news. The mobile electronic device 1 stores the position of each news on the page in the storage unit 24 or the external storage unit 25 as layout information.

When detecting that the printed material 310 is in the projection area, that is, that a page of a newspaper is therein through the processes in FIG. 20, the mobile electronic device 1 acquires the latest information corresponding to the printed material 310, i.e. the text and/or the image of contents of each news or information as to whether the text and/or the image of contents of each news are updated, from an external device (e.g., a server of a newspaper company). Then, as illustrated in FIG. 22B, the mobile electronic device 1 projects a mark (image), for notifying the reader of update of the text and/or the image of contents of each news, to the projection area from the projector 34. The image projected by the mobile electronic device 1 may be any image if the image can notify the reader of the update of the text and/or the image of contents of each news. For example, as illustrated in FIG. 22B, the mobile electronic device 1 may project boxes 311 and 312 surrounding the updated text and image of the contents of each news so as not to affect the visibility of the text and the image of the contents of each news. For example, the mobile electronic device 1 may project a latest text and/or image to the text and/or the image of the contents of each news printed on the page in a partially overlapping manner in a range in which text visibility is not affected thereby. If there is any error in the text and/or the image of the contents of a news, the mobile electronic device 1 acquires the information for the error or the content of the error from the external device, and may project an image indicating that an error occurs therein or letting the reader know about the content of the error. This enables the reader to learn of the latest information on each news.

Next, in the example of FIG. 23A, a printed material 320 is placed in the projection area. The printed material 320 in this case is a page of a newspaper. Specifically, a headline ("TV Section") and program listings are printed on the printed material 320. The program listings are determined when writing about them is completed, and therefore the program listing are possibly updated by the time the reader views the program listing due to the change in the program listing after the completion thereof or due to extension of sports broadcast.

When detecting that the printed material 320 is in the projection area, that is, that a page of a newspaper is therein through the processes in FIG. 20, the mobile electronic device 1 acquires the latest information corresponding to the printed material 320, i.e. the latest program listings, from the external device. Then, as illustrated in FIG. 23B, the mobile electronic device 1 projects a mark (image), for notifying the reader of a program whose broadcast time or so is changed, to the projection area from the projector 34. Any image may be used if the image to be projected by the mobile electronic device 1 is an image for notifying the reader of the program whose broadcast time or so is changed. For example, if there are programs whose broadcast time is put off, then, as illustrated in FIG. 23B, the mobile electronic device 1 may project light in a predetermined color to the programs whose broadcast time is put off and also project down-arrows 321 and 322 thereto. For example, if there is a program whose broadcast is canceled, then, as illustrated in FIG. 23B, the mobile electronic device 1 may project a cross-mark 323 to the program whose broadcast is canceled. This enables the reader to learn of the latest information on the program listing. The mobile electronic device 1 may also project light in a predetermined color (highlight) to the program currently on air.

This enables the reader to learn of the program currently on air. Although the TV program listing of the newspaper is used as an example for explanation, the program listing is not limited thereto, and therefore it is applicable to a radio program listing of a newspaper. It is also applicable to program listings of satellite broadcasting and CATV (cable TV).

Next, in the example of FIG. 24A, a printed material 330 is placed in the projection area. The printed material 330 in this case is a leaflet inserted in a newspaper. Specifically, a headline ("XX Electric"), electronic products, and their sales prices are printed on the printed material 330. The sales prices are determined when writing about them is completed, and therefore the sales prices are possibly updated by the time the reader views the leaflet due to the change in the sales prices after the completion thereof because some of electronics retail stores emphasize that the sales prices in the stores are lower than any other stores. The mobile electronic device 1 stores the positions of sales prices of the electronic products on the leaflet in the storage unit 24 or the external storage unit 25 as layout information.

When detecting that the printed material 330 is in the projection area, that is, that the leaflet is therein through the processes in FIG. 20, the mobile electronic device 1 acquires the latest information corresponding to the printed material 330, i.e. the fluctuations in the sales prices of the electronic products or the latest sales prices of the electronic products, from an external device (e.g., a server of an electronics retail store and a server of an advertising agency). Then, as illustrated in FIG. 24B, the mobile electronic device 1 projects a mark (image), for notifying the reader of electronics products whose sales prices are changed, to the projection area from the projector 34. For example, as illustrated in FIG. 24B, the mobile electronic device 1 may project a red light 331 to a sales price of the electronics product whose sales price increases more than that of the previous day, or may project a blue light 331 to a sales price of the electronics product whose sales price decreases more than that of the previous day. The image is not limited thereto, and the image has only to be any image that can notify the reader of fluctuations in the sales prices. For example, as illustrated in FIG. 24B, the mobile electronic device 1 may project a down-arrow 333 to the electronics product whose sales price decreases, and may project an up-arrow 334 to the electronics product whose sales price increases. For example, the mobile electronic device 1 may project a gauge to the electronics product whose sales price fluctuates. For example, the mobile electronic device 1 may project the latest sales price to the electronics product whose sales price fluctuates in a range in which text visibility is not affected thereby. This enables the reader to learn of the latest information on the sales prices of the electronics products.

The mobile electronic device 1 may be configured to acquire a lowest price of the sales price of the electronics product from a server of a cost comparison site, to compare the lowest price with the sales price on the leaflet, and to project an image indicating whether the sales price on the leaflet is higher or lower than the lowest price. This enables the reader to learn of the information as to whether the sales price on the leaflet is higher or lower than the lowest price.

The mobile electronic device 1 may also be configured to acquire stock information for the electronics products from the server of an electronics retail store and to project an image indicating the stock status of the electronics products. This enables the reader to learn of the stock status of a desired electronics product.

Next, in the example of FIG. 25A, a printed material 340 is placed in the projection area. The printed material 340 in this case is a schedule table such as a notebook. Specifically, a month ("Month: X") and dates ("1st", "2nd", . . . ) are printed on the printed material 340. In recent years, schedules are managed on a schedule management server. Such a schedule management server allows one's schedule to be entered by other person. If the user uses both the schedule management server and the schedule table such as a notebook, then the both have to be linked to each other.

When detecting that the printed material 340 is in the projection area, that is, that the schedule table is therein through the processes in FIG. 20, the mobile electronic device 1 acquires the latest information corresponding to the printed material 340, i.e. the schedules, from an external device (e.g., schedule management server). Then, as illustrated in FIG. 25B, the mobile electronic device 1 projects (highlights) an image for illuminating a time slot, in which a schedule is updated, to the projection area from the projector 34. For example, as illustrated in FIG. 25B, the mobile electronic device 1 may project lights 341 and 342 for highlight to the time slots in which the schedules are updated. The mobile electronic device 1 may acquire details of the schedule (details of the meeting) from an external device and project the acquired details to the schedule table. This enables the user to learn of the latest schedule. The mobile electronic device 1 may also be configured to capture an image of the printed material 340 by the camera 40, to subject the captured image to the text recognition process to acquire a schedule handwritten on the printed material 340, and to project (highlight) an image for illuminating a time spot in which the schedule handwritten on the printed material 340 conflicts with the schedule acquired from the external device.

This enables the user to learn that the schedules conflict with each other. The mobile electronic device 1 may also be configured to capture an image of the printed material 340 by the camera 40, to subject the captured image to the text recognition process to acquire a schedule handwritten on the printed material 340, and to transmit the schedule handwritten on the printed material 340 to the external device. This enables the schedule managed by the external device to be updated to the latest one.

In this way, by acquiring information from the external device and projecting an image corresponding to the image in the projection area from the projector 34, that is, by superimposing an image projected from the projector 34 on the image in the projection area to create a single image, the mobile electronic device 1 can create a highly effective image with a simple manner. Even when the information is acquired from the external device and an image corresponding to the image in the projection area is projected from the projector 34, the mobile electronic device 1 can obtain the same effects as these of the first embodiment. Moreover, even when the processes according to the present embodiment are performed, the mobile electronic device 1 may be modified in various manners, similarly to the first embodiment.

The embodiment has been explained using the example in which the image in the projection area is a page of a newspaper, and an image to be projected is an image representing fluctuations in stock prices or an image representing an update status of text and image of contents of each news, or an image to be projected is an image representing a change status of a broadcasting time of a program; the example in which the image in the projection area is a leaflet inserted in a newspaper and an image to be projected is an image representing fluctuations in sales prices of electronics products; and the example in which the image in the projection area is a schedule table such as a notebook and an image to be projected is an image representing an update status of a schedule. However, a combination of an image in the projection area, i.e. an image such as a printed material previously created and placed in the projection area, with an image to be projected, i.e. an image to be projected from the projector 34, can include a variety of combinations.

If the image (printed material or so) in the projection area is a timetable of a train or a bus, the mobile electronic device 1 may project (highlight) an image for illuminating a portion of the next departure of the train or the bus taking the current time into consideration. This enables the user to learn of the train or the bus that departs next. If a timetable is changed, the mobile electronic device 1 may acquire the latest timetable information from an external device (e.g., a server of a railroad company, a server of a bus company, or a server of a publisher), and project (highlight) an image for illuminating a portion where the timetable is changed. This enables the user to learn of the train or the bus whose timetable is changed. In addition, the mobile electronic device 1 may acquire operation/delay information from an external device (e.g., a server of a railroad company or a server of a bus company), and project the acquired operation/delay information. This enables the user to learn of the latest operation/delay information.

If the image (printed material or so) in the projection area is a sports section of a newspaper, the mobile electronic device 1 may acquire information on scores of a game or the number of medals won in games that is not determined when writing about them is completed from an external device (e.g., a server of a newspaper company), and project the content of the acquired information. This enables the reader to learn of the information on scores of a game, the number of medals won in games, and so on determined after the completion thereof.

If the image (printed material or so) in the projection area is a travel guide book, the mobile electronic device 1 may acquire updated information for a tour from an external device (e.g., a server of a publisher), and project the acquired information. This enables the reader to learn of the latest tour information. Moreover, the mobile electronic device 1 may acquire information for a menu change and a campaign of stores and so on from an external device (e.g., a server of a publisher or a server of a store), and project a mark or a highlight for notifying the reader of the information for the menu change and the campaign of stores and so on. This enables the reader to learn of the information for the menu change and the campaign of stores and so on.

If the image in the projection area is a magazine, the mobile electronic device 1 may be configured to leave "blank" a ranking table of music CD sales ranking and book sales ranking, to acquire information for music CD sales ranking and book sales ranking from an external device (e.g., a server of a publisher), and to project the acquired ranking information into the blank ranking table. This enables the reader to learn of the latest ranking information. Moreover, the mobile electronic device 1 may acquire information for a stock status of goods from an external device (e.g., a server of an Internet mail-order shop) and project the acquired information for the stock status of the goods. This enables the reader to learn of the latest stock status.

If the image in the projection area is a map, the mobile electronic device 1 may acquire information for a newly constructed road from an external device (e.g., a server of a publisher), and project the newly constructed road on to the map. This enables the user to learn of the latest road information. Moreover, the mobile electronic device 1 may acquire traffic-jam information and construction information from an external device (e.g., a server of an expressway company or a server of VICS), and project acquired information. This enables the user to learn of the latest traffic-jam information and construction information.

If the image in the projection area is an image of a specialized book, the mobile electronic device 1 may acquire revised contents of a text and/or a diagram from an external device (e.g., a server of a publisher), and project the acquired information. This enables the reader to learn of the latest revised contents.

If the image in the projection area is an instruction manual, the mobile electronic device 1 may project a time (finish time) required to assemble an object according to the instruction manual in real time. This enables the user to previously learn of the finish time.

If the image in the projection area is a patient registration card, the mobile electronic device 1 may acquire information for a consultation time and crowded condition from an external device (e.g., a server of a hospital), and project the acquired information. The information for a consultation time and crowded condition may be projected to the patient registration card or may be projected to an arbitrary location (e.g., a wall of a waiting room). This enables the user to learn of the latest consultation time and crowded condition.

If the image in the projection area is an electronic notice board, the mobile electronic device 1 may acquire information for traffic-jam and construction statuses, escape routes, and crowded condition (crowded condition in trains and in stations and bus stops) from an external device (e.g., a server of an expressway company, a server of a railroad company, and a server of a bus company), and project the acquired information. This enables the user to learn of the latest traffic-jam and construction statuses, escape routes, and crowded condition.

Fourth Embodiment

Next, another embodiment of the image projection operation of the projector in the mobile electronic device will be explained with reference to FIG. 26 to FIG. 29C. The processes illustrated in FIG. 26 to FIG. 29C can be implemented by the mobile electronic device. The image projection operations illustrated in FIG. 26 to FIG. 29C control each image to be projected based on acquired authentication information using the function of the authentication processor 22h. For the operations according to the present embodiment, various operations can be implemented even by a configuration not including the sound analyzer 22g.

Next, the image projection operation of the projector in the mobile electronic device will be explained below with reference to FIG. 26. Part of operations in FIG. 26 is the same as the operations in the flowchart illustrated in FIG. 5. Therefore, the same step numbers are assigned to the operations, of the operations in FIG. 26, the same as these of the flowchart in FIG. 5, and detailed explanation thereof is omitted.

First of all, when an activation instruction of the projector 34 is input, then at Step S12, the processing unit 22 of the mobile electronic device 1 activates the camera 40 and the projector 34. In the processing unit 22, when the camera 40 and the projector 34 are activated at Step S12, then at Step S14, the camera controller 22f controls the operation of the camera 40 to capture an image in the projection area. In the processing unit 22, when the image in the projection area is captured at Step S14, then at Step S16, the condition determining unit 22c determines the condition of the projection area.

In the processing unit 22, when the condition of the projection area is determined at Step S16, then at Step S218, the projection-image determining unit 22e determines an image (image data) to be projected. Specifically, in the processing unit 22, the projection-image determining unit 22e specifies a printed material or so placed in the projection area based on the condition (identification information) of the projection area determined at Step S16, extracts image data corresponding to the specified printed material or so, and determines the extracted image data as an image to be projected. The image data is stored in the storage unit 24 or the external storage unit 25, and the image data corresponding to the specified printed material is stored in association with information for the printed material. Therefore, the projection-image determining unit 22e searches for the image data stored in the storage unit 24 or in the external storage unit 25 using the information for the printed material as a key, thus extracting corresponding image data. If the image data of which projection is determined is accompanied (linked) by information, the information that accompanies the image data is extracted together with the image data.

In the processing unit 22, when the image to be projected is determined at Step S218, then at Step S220, the authentication processor 22h determines whether authentication is requested. The authentication processor 22h determines whether the authentication is requested based on the read image in the projection area or based on the acquired information that accompanies (is lined to) the image data. For example, when identification information (code, character, and symbol) of a predetermined shape is included in the image in the projection area, the authentication processor 22h determines that the authentication is requested. When data indicating the request of the authentication is included in the information that accompanies (is lined to) the image data, the authentication processor 22h determines that the authentication is requested. When it is determined that the authentication is not requested at Step S220 (No at Step S220), the processing unit 22 proceeds to Step S20.

In the processing unit 22, when it is determined that the authentication is requested at Step S220 (Yes at Step S220), then at Step S222, the authentication processor 22h performs the authentication process. The authentication process is implemented by performing various processes to determine whether the condition under which the image can be projected is satisfied or whether the image is in a projection permitted state based on the preset condition.

Criteria as to whether the condition is projection permission include, as the authentication process, those as to whether a predetermined operation is performed such that information to be authenticated (for example, information to be authenticated included in a read image) is output to an external communication device through the communication unit 26, whether information to be authenticated (for example, information to be authenticated included in a read image) matches preset information to be authenticated, and whether an instruction of projection permission is acquired from an external communication unit through the communication unit 26. The information to be authenticated is information specified by an identification process, and various pieces of information including the same image (information) as the identification information can be used. Any information for the mobile electronic device 1 other than the information that can be acquired by a read image such as terminal information for the mobile electronic device 1 can be also included in the information to be authenticated. The authentication processor 22h determines the criteria as to whether the projection is permitted based on the read image in the projection area or based on the acquired information that accompanies (is linked to) the image data.

When the authentication process is performed at Step S222, then at Step S224, the processing unit 22 determines whether the projection is permitted, that is, whether the image determined as image data to be projected at Step S218 is in a state in which the image can be projected from the projector 34 based on the authentication process performed at Step S222.

In the processing unit 22, when it is determined that the projection is not permitted at Step S224, that is, that the projection is forbidden (No at Step S224), then at Step S226, the projector controller 22a projects a message indicating non-permission of the projection, that is, indicating that the corresponding image cannot be projected from the projector 34. Thereafter, after a given time has passed since the projection of the message indicating that the corresponding image cannot be projected, or when an instruction to stop the projection function of the projector 34 is input by an operator, the processing unit 22 proceeds to Step S26.

In the processing unit 22, when it is determined that the authentication is not requested at Step S220 (No at Step S220), or when it is determined that the projection is permitted at Step S224 (Yes at Step S224), then at Step S20, the projector controller 22a controls the operation of the projector 34 to project the image determined at Step S218 from the projector 34.

When the image is projected at Step S220, then at Step S22, the processing unit 22 determines whether the image in the projection area has been changed. When it is determined that the image in the projection area has been changed at Step S22 (Yes at Step S22), the processing unit 22 proceeds to Step S14, performs the processes of Step S14 and the subsequent steps, and changes the image to be projected from the projector 34 according to the image in the projection area.

When it is determined that the image in the projection area has not been changed at Step S22 (No at Step S22), then at Step S24, the processing unit 22 determines whether the projection termination has been instructed. When it is determined that the termination has not been instructed at Step S24 (No at Step S24), the processing unit 22 proceeds to Step S22, and performs the process of Step S22. When it is determined that the projection termination has been instructed at Step S24 (Yes at Step S24), or when the process at Step S226 has been completed, then at Step S26, the processing unit 22 deactivates the camera 40 and the projector 34 and ends the present process. The camera 40 and the projector 34 can be deactivated by the control of the camera controller 22f and the projector controller 22a respectively.

Figure 27:
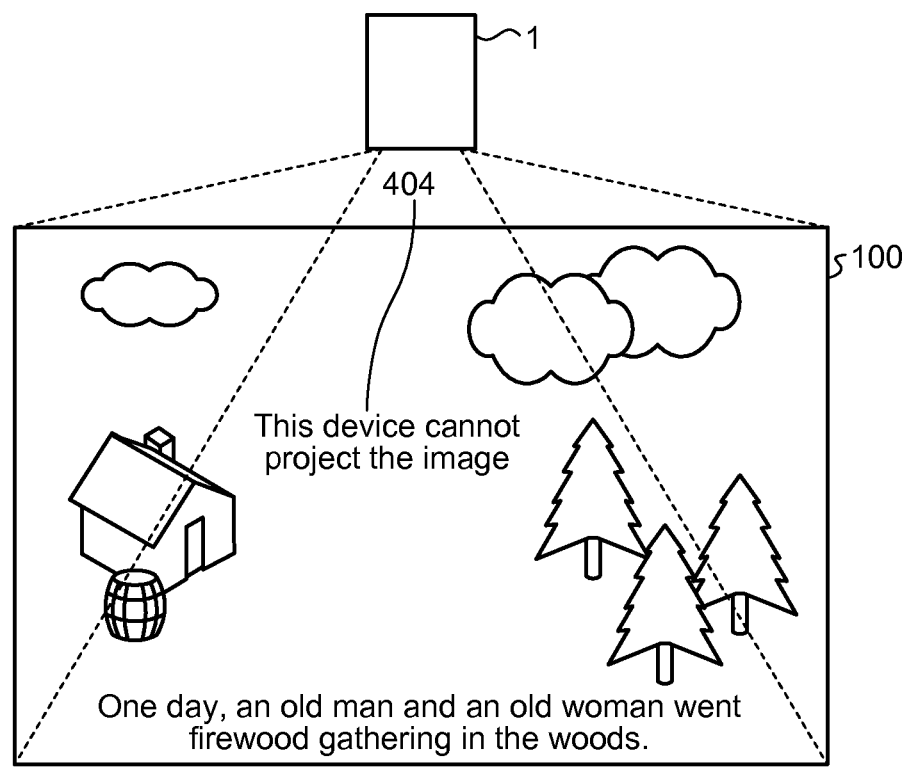
FIG. 27 is an explanatory diagram for explaining another example of the operation of the mobile electronic device.

Next, the mobile electronic device 1 will be explained in more detail using specific examples. The operation of the mobile electronic device 1 according to the present embodiment will be explained below with reference to FIG. 6A, FIG. 6B, and FIG. 27. FIG. 27 is an explanatory diagram for explaining another example of the operation of the mobile electronic device. FIG. 27 represents another state when an image is projected to the printed material 100 similarly to FIG. 6A and FIG. 6B. As illustrated in FIG. 6A, the printed material 100 is placed in the projection area of the mobile electronic device 1.

When detecting that the printed material 100 is in the projection area, that is, that one scene at a predetermined page of a picture book or so is therein through the processes in FIG.

26, the mobile electronic device 1 acquires image data corresponding to the printed material 100. Thereafter, the mobile electronic device 1 performs the authentication process and determines whether projection is permitted. As explained above, the authentication process is performed based on at least one of the acquired identification information and the information associated with the image data to be projected, and when the projection is permitted (it is determined that the set condition is satisfied) in the authentication process, then, as illustrated in FIG. 6B, the mobile electronic device 1 projects the image of the persons 102 from the projector 34 to the projection area. This allows the image of the persons 102 to be displayed on the printed material 110 in addition to the printed components. In the present embodiment, the image of the persons is projected; however, an object or a landscape may be projected.

When the set condition is not satisfied in the authentication process, then, as illustrated in FIG. 27, the mobile electronic device 1 projects a message 404 indicating that the image cannot be projected (non-permission of the projection) instead of the corresponding image. The message 404 in FIG. 27 is composed of a sentence like "This device cannot project the image".

Next, the operation of the mobile electronic device 1 according to the present embodiment will be explained below with reference to FIG. 7A and FIG. 7B. Subsequently, in the example of FIG. 7A, the printed material 110 is placed in the projection area. When detecting that the printed material 110 is in the projection area, that is, detecting the name of a newspaper and the date and the page thereof through the processes in FIG. 26, the mobile electronic device 1 acquires image data corresponding to the printed material 110. Thereafter, the mobile electronic device 1 performs the authentication process and determines whether projection is permitted. As explained above, the authentication process is performed based on at least one of the acquired identification information and the information associated with the image data to be projected, and when the projection is permitted (it is determined that the set condition is satisfied) in the authentication process, then, as illustrated in FIG. 7B, the mobile electronic device 1 projects the images 112 to the frames 111 of the printed material 110 in the projection area from the projector 34. This allows the images 112 to be displayed in the frames 111 on the printed material 110 in addition to the printed components. When it is determined that the set condition is not satisfied in the authentication process, the mobile electronic device 1 projects a message indicating that the image cannot be projected, similarly to the above.

In this way, by projecting the image corresponding to the image in the projection area from the projector 34, that is, by superimposing the image projected from the projector 34 on the image in the projection area to create a single image, the mobile electronic device 1 can create a highly effective image with a simple manner.

By performing the authentication process, the mobile electronic device 1 can project an image only if appropriate. For example, it can be configured so that even if a printed material and data for an image to be projected are acquired, the mobile electronic device that does not satisfy the condition of the authentication process cannot project the image. This enables to prevent an image that is completed by being projected to the printed material from being viewed by an unspecified third party.

The condition of the authentication process is set so that a server of a creation source of a printed material and an image to be projected permits projection when the terminal information of the mobile electronic device 1 is transmitted thereto. Based on this, the creation source can acquire the terminal information of the mobile electronic device 1 that projects the image. Therefore, for example, even if image data is stored in the external storage unit, it can be determined whether the printed material and the image to be projected are projected by the terminal that obtains the projection permission. This enables to prevent the printed material and the projected data from being viewed in an inappropriate state, for example, by illegal copies. When acquiring the terminal information for a mobile electronic device 1 that is not registered, the creation source may perform a billing process on the mobile electronic device 1.

The mobile electronic device 1 can obtain various effects the same as these of the first embodiment even when the authentication process is performed. For example, the mobile electronic device 1 projects an image corresponding to the image in the projection area from the projector 34 and can thereby create a highly effective image with a simple manner. Moreover, even if the processes of the present embodiment are performed, the mobile electronic device 1 may be modified in various manners, similarly to the first embodiment.

It may be set so that the image to be projected is stored in an external server (e.g., a creator of the image to be projected) and that the mobile electronic device 1 acquires image data from the external server each time it is projected. This enables the creator to update the image to be projected and to supply the latest image data. Thus correction of a literal error of image data and update of the data can be easily performed.

The mobile electronic device 1 transmits and receives information through the short-range communication unit 36, but may acquire image data to be projected, acquire the condition of the authentication process, and transmit and receive information to be authenticated through the short-range communication unit 36.

The image in the projection area may be any image with no description except for the identification information. For example, even if a blank sheet with only identification information is placed in the projection area, the mobile electronic device 1 performs the authentication process based on the identification information, and can project a specific image to the projection area (on to the blank sheet).

Figure 28A:
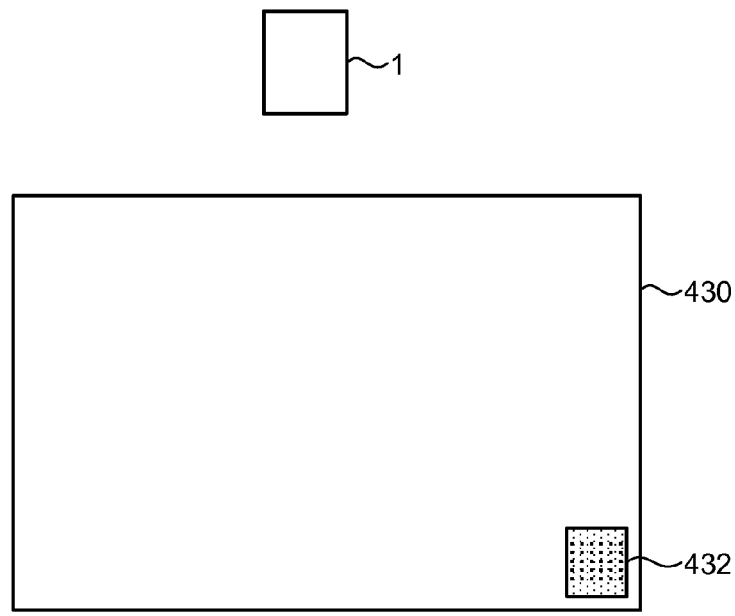
FIG. 28A is an explanatory diagram for explaining an example of the operation of the mobile electronic device.
Figure 28B:
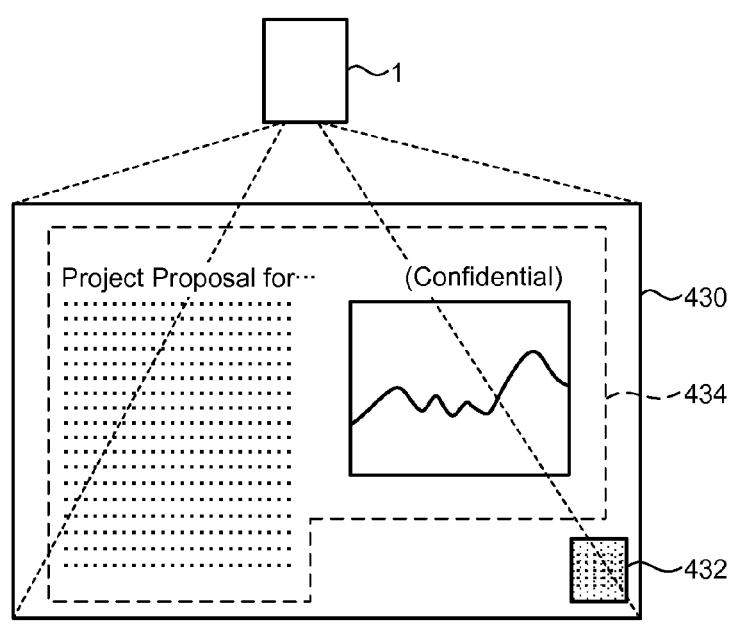
FIG. 28B is an explanatory diagram for explaining an example of the operation of the mobile electronic device.

FIG. 28A is an explanatory diagram for explaining an example of the operation of the mobile electronic device, and FIG. 28B is an explanatory diagram for explaining an example of the operation of the mobile electronic device. In the example of FIG. 28A, a printed material 430 is placed in the projection area. The printed material 430 in this case is basically a blank sheet. Specifically, no characters and text are described on the printed material 430 except for a two-dimensional barcode 432 printed thereon.

When detecting the two-dimensional barcode 432 of the printed material 430 located on the image in the projection area through the processes in FIG. 26, the mobile electronic device 1 acquires image data corresponding to the printed material 430 based on the two-dimensional barcode 432. Thereafter, the mobile electronic device 1 performs the authentication process and determines whether projection is permitted. In the authentication process, as explained above, the condition is set based on at least one of the acquired identification information and the information associated with the image data to be projected, and when it is determined that the condition is satisfied, then, as illustrated in FIG. 28B, the mobile electronic device 1 projects an image 434 to the printed material 430 in the projection area from the projector 34. This allows the image 434 to be displayed on the printed material 430. The image 434 is a project proposal which is a confidential document as company's secret.

In this way, the mobile electronic device 1 can project an image to the printed material with no description thereon except for the identification information. As explained above, it can be configured not to project the confidential document as company's secret, and, therefore, even if the printed material is lost or stolen, the image is not projected by any unauthorized mobile electronic device, thus increasing security of confidential information and secret information. In addition, the condition of the authentication process is set so that projection is allowed only in a specific mobile electronic device, and therefore the information cannot be viewed by any unauthorized mobile electronic device. As a setting method of the condition, for example, the terminal information of a mobile electronic device that initially performs the authentication process has only to be obtained. This enables determination according to whether any terminal information matches the terminal information at the next and subsequent steps. A plurality of mobile electronic devices may be permitted. The mobile electronic device may be configured to transmit, when the authentication process is to be performed, the terminal information to a server that manages it, where it is determined whether the transmitted terminal information match the terminal information. As the terminal information, user ID information such as a serial number and a SIM card (Subscriber Identity Module Card) given for each terminal can be adopted. In short, the information may be any capable of specifying a terminal that projects an image.

Figure 29A:
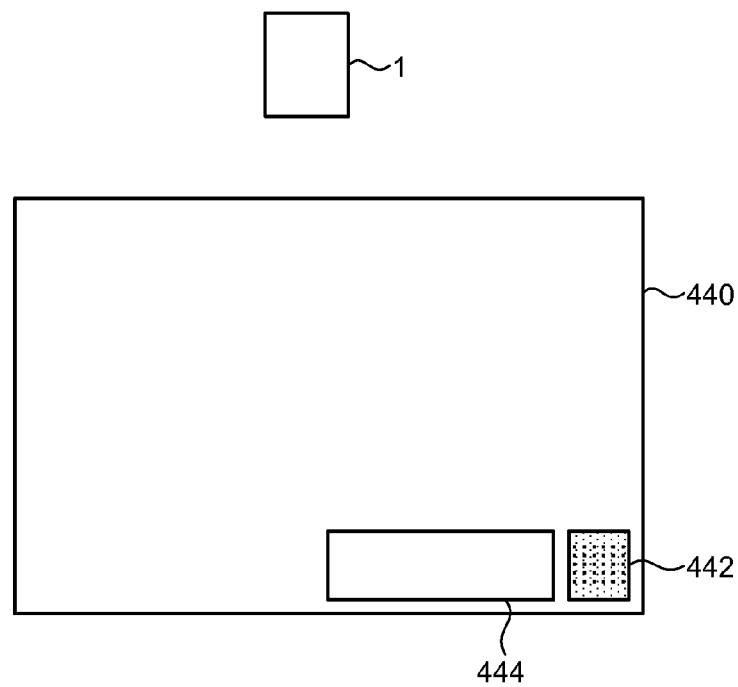
FIG. 29A is an explanatory diagram for explaining another example of the operation of the mobile electronic device.
Figure 29B:
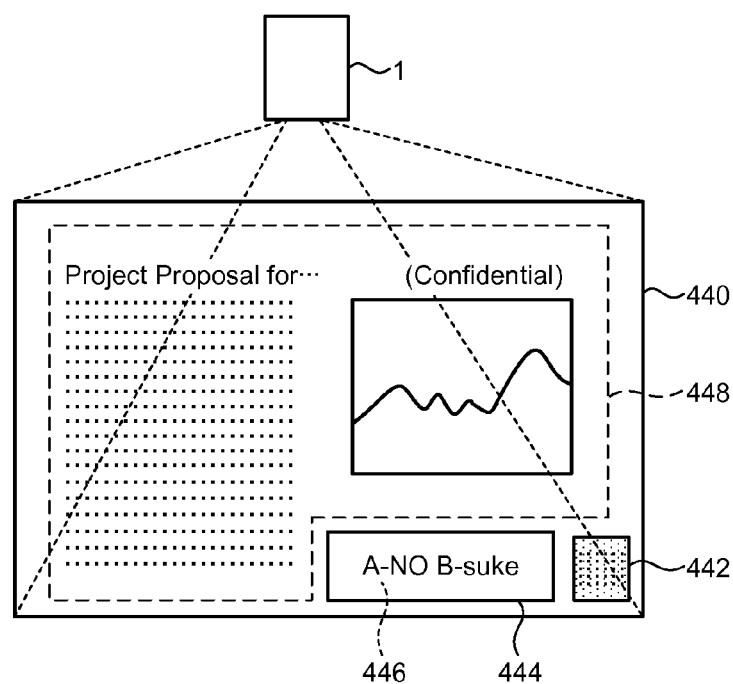
FIG. 29B is an explanatory diagram for explaining another example of the operation of the mobile electronic device.

The mobile electronic device 1 may further be configured to detect a signature entered in an image in the projection area and to process the signature in the authentication process. FIG. 29A is an explanatory diagram for explaining another example of the operation of the mobile electronic device, FIG. 29B is an explanatory diagram for explaining another example of the operation of the mobile electronic device, and FIG. 29C is an explanatory diagram for explaining another example of the operation of the mobile electronic device.

In the example of FIG. 29A, a printed material 440 is placed in the projection area. The printed material 440 is also basically a blank sheet. Specifically, no characters and text are described on the printed material 440 except for a two-dimensional barcode 442 and a signature entry column 444, which are printed thereon.

When detecting the two-dimensional barcode 442 of the printed material 440 located on an image in the projection area through the processes in FIG. 26, the mobile electronic device 1 acquires image data corresponding to the printed material 440 based on the two-dimensional barcode 442. Thereafter, the mobile electronic device 1 performs the authentication process to determine whether projection is permitted. In the authentication process, the mobile electronic device 1 according to the present embodiment determines whether a set signature is entered in the signature entry column 444. As illustrated in FIG. 29B, when a signature 446 that satisfies the condition is entered in the signature entry column 444, the mobile electronic device 1 projects an image 448 to the printed material 440 of the projection area from the projector 34. This allows the image 448 to be displayed on the printed material 440. The image 444 is also a project proposal which is a confidential document as company's secret. A name of "A-NO B-suke" is entered as the signature 446 in FIG. 26B.

Figure 29C:
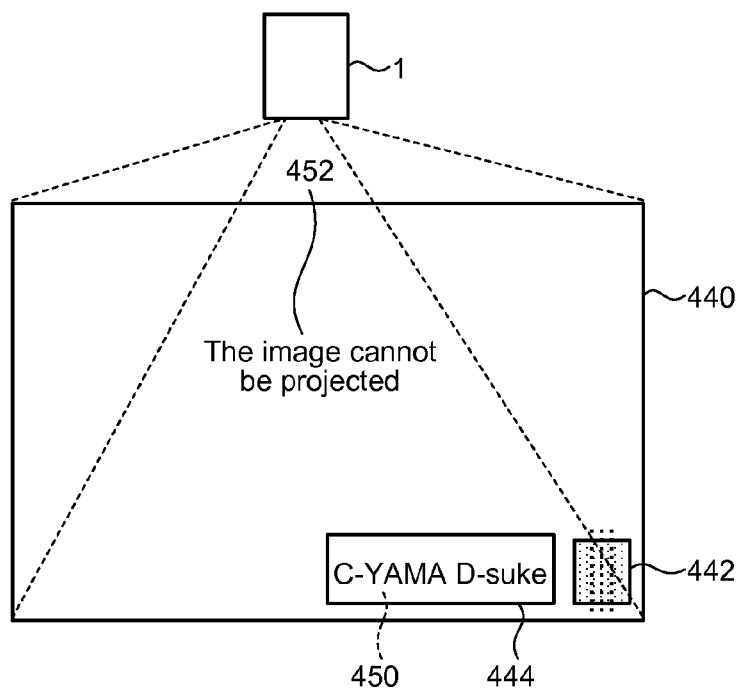
FIG. 29C is an explanatory diagram for explaining another example of the operation of the mobile electronic device.

In the authentication process, as illustrated in FIG. 29C, if a signature 450 that does not satisfy the condition is entered in the signature entry column 444, the mobile electronic device 1 determines that the signature does not satisfy the condition and projects a message 452 indicating that the image cannot be projected (non-permission of the projection) instead of the corresponding image as illustrated in FIG. 29C. The message 452 in FIG. 29C is composed of a sentence like "The image cannot be projected". A name of "C-YAMA D-suke" is entered as the signature 450 in FIG. 29C.

The mobile electronic device 1 may be configured that the condition is satisfied when detected characters of the signature match information for the set signature; however, it may be determined whether handwriting of the signature matches the information. It may be set so that the condition is satisfied when the name of the detected signature matches the name stored as the terminal information.

It may also be set so that the condition is satisfied when it is detected that the signature is entered in the signature entry column. In this way, even if the projection permission is set only by the entry of the signature, by managing the information for the signature in a predetermined server, the record of the signature of a person who requests projection of the image can be kept.

By using the signature for the authentication process as explained in the present embodiment, even if the printed material, as the printed material placed in the projection area, on which the two-dimensional barcode and the signature column are printed by the image data acquired through the Internet or so is used, only a user capable of entering a specific signature can view a target image.

The authentication process is preferably performed each time; however, it may be set so that only a first authentication process is performed and that if projection permission is once set, then the authentication process is not performed the next and subsequent times. It is preferable that the image data to be projected corresponding to the projection area (image data to be projected corresponding to the printed material) cannot be stored in any area other than a set area. It is also preferable that when image projection is finished, the mobile electronic device 1 deletes the data for the projected image from any area such as a memory and a cache except for a predetermined storage area. This enables to prevent the data for an image to be projected from being illegally copied or viewed.

In the fourth embodiment also, a combination of an image previously created and placed in the projection area of the printed material or so with an image to be projected, i.e. an image to be projected from the projector 34, can include a variety of combinations similarly to the embodiments. In any of the examples, by managing a target that can be viewed by the authentication process, an image can be projected in an appropriate state.

For example, if the image in the projection area is a map as explained above, the mobile electronic device 1 may set target information (selected information) as an image to be projected. This enables to project only required information, so that the map can be used in a easy-to-see manner. A newly made road, traffic-jam information, construction information, and the like may be displayed. In this case, it can be configured that only entitled persons who sign up for acquisition of update information can view various pieces of latest information.

If the image in the projection area is an image of a calendar in a notebook as explained above, the mobile electronic device 1 may set a schedule as an image to be projected. When the image in the projection area is an image of the heading of a schedule in the notebook, the mobile electronic device 1 may set the content of the schedule, for example, the content of arrangement if it is arrangement as an image to be projected. This enables to prevent personal information from being leaked even if the content of the printed material in the notebook is seen. It can also be configured so that even if the information is managed by a server or so, the information cannot be viewed by other mobile electronic devices that do not obtain the permission.

If the image in the projection area is a prescription, the mobile electronic device 1 may set a use history or a use method as an image to be projected. This enables to check a frequency of use and the like. If the image in the projection area is an arbitrary place of a hospital, for example, in front of each department, the mobile electronic device 1 may set crowded condition of the place and waiting time as an image to be projected. If the image in the projection area is a patient registration card, the mobile electronic device 1 may set crowded condition of a place of medical examination and waiting time as an image to be projected.

If the image in the projection area is an electronic notice board, the mobile electronic device 1 may set an image corresponding to a content displayed on the notice board as an image to be projected. Specifically, if it is an electronic notice board in stations or bus stops, the mobile electronic device 1 may display an image inside a train displayed when it arrives or crowded condition of each station or bus stop. If it is an electronic notice board installed in roads for notifying whether there is a traffic jam or any construction, the mobile electronic device 1 may display moving images of a traffic jam spot or of a location of the construction. If it is an electronic notice board for guiding a facility, the mobile electronic device 1 may display an image of escape routes.

Fifth Embodiment

Figure 30A:
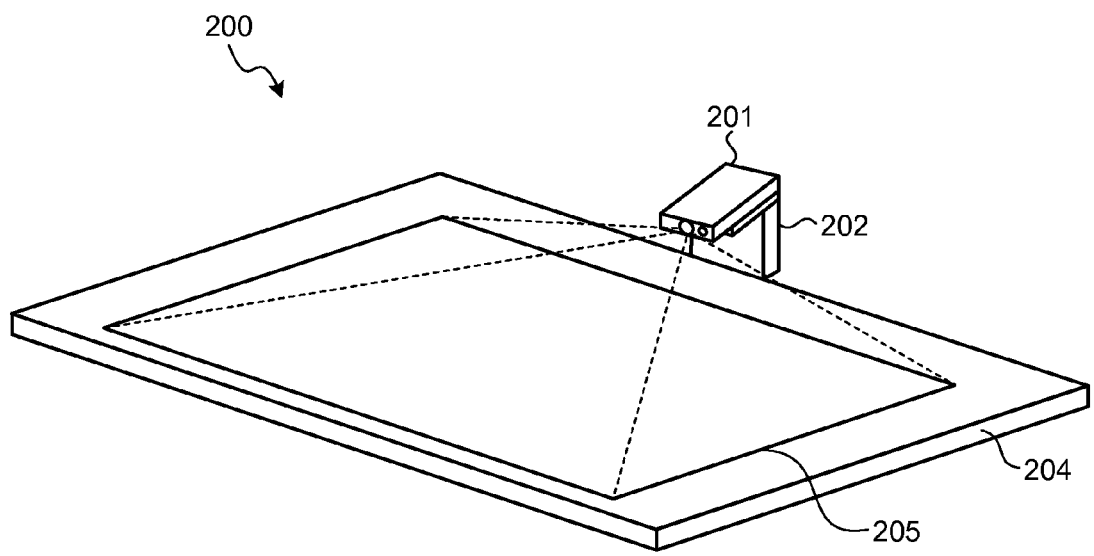
FIG. 30A is a perspective view for explaining a schematic configuration of an image projection unit.
Figure 30B:
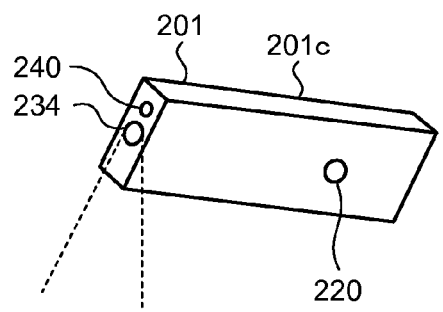
FIG. 30B is an explanatory diagram for explaining a schematic configuration of a mobile electronic device in the image projection unit.
Figure 31A:
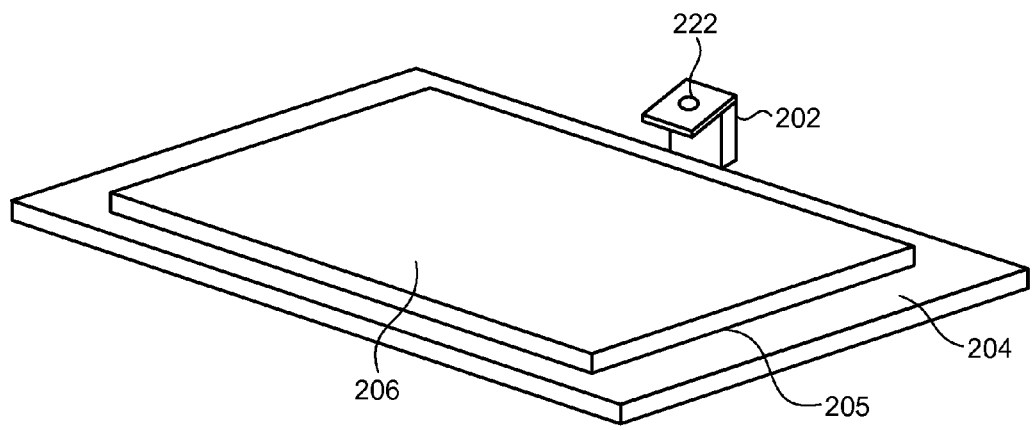
FIG. 31A is a perspective view for explaining a schematic configuration of a dedicated screen and a support.
Figure 31B:
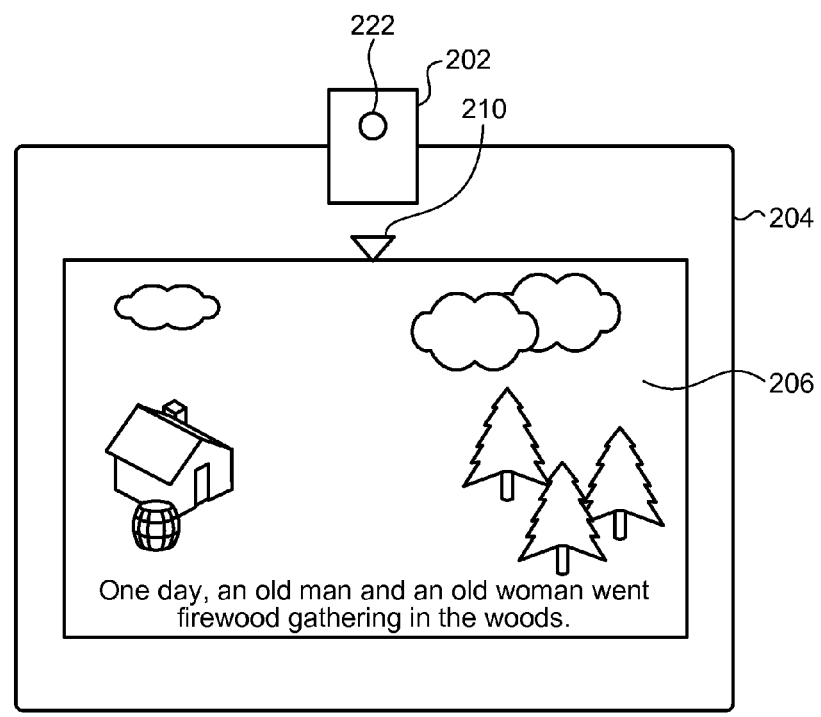
FIG. 31B is a top view for explaining the schematic configuration of the dedicated screen and the support.

In any of the embodiments, the mobile electronic device 1 is movable with respect to the projection area; however, the present invention is not limited thereto. Therefore, a system may be configured so that a dedicated screen is provided for a projection area and the mobile electronic device 1 is fixed to a specific location with respect to the dedicated screen. FIG. 30A is a perspective view for explaining a schematic configuration of an image projection system, and FIG. 30B is an explanatory diagram for explaining a schematic configuration of a mobile electronic device in the image projection system. FIG. 31A is a perspective view for explaining a schematic configuration of a dedicated screen and a support, and FIG. 31B is a top view for explaining the schematic configuration of the dedicated screen and the support. Both FIG. 31A and FIG. 31B represent a state in which a printed material is placed on the dedicated screen. An image projection system 200 illustrated in FIG. 30A includes a mobile electronic device 201, a support 202, and a dedicated screen 204.

As illustrated in FIG. 30B, the mobile electronic device 201 includes a cuboidal housing 201C. Provided on one face of the housing 201C is a connecting mechanism 220 for connecting to the support 202. Provided on an end face of the housing 201C in its longitudinal direction are a light emitting portion of a projector 234 and an imaging window of a camera 240. The rest of components of the mobile electronic device 201 except for the above points are basically the same as these of the mobile electronic device 1, and therefore explanation thereof is omitted.

As illustrated in FIG. 31A and FIG. 31B, the support 202 is a supporting mechanism for fixing the mobile electronic device 201 to a predetermined position, and a connecting mechanism 222 for connecting to the connecting mechanism 220 of the mobile electronic device 201 is provided in the support 202. For example, if the connecting mechanism 220 is a screw hole, the connecting mechanism 222 of the support 202 is a screw. The support 202 is fixed to the dedicated screen 204.

As illustrated in FIG. 31A and FIG. 31B, the dedicated screen 204 is a plate-like member, and the surface thereof faces a fixed position of the mobile electronic device 201. Projected to the surface of the dedicated screen 204 is an image, as illustrated in FIG. 30A, output from the projector 234 of the mobile electronic device 201 fixed to the support 202. In other words, a projection area 205 of the projector 234 is a predetermined area on the surface of the dedicated screen 204.

Provided on the surface of the dedicated screen 204 is a placement area for placing a printed material 206. Furthermore, a guide display 210 is formed on the surface of the dedicated screen 204. The guide display 210 indicates a base of the placement position of the printed material 206 placed on the surface of the dedicated screen 204. By placing the printed material 206 so that the position where the guide display 210 is displayed is a center of one direction, a relation between the projection area 205 and the printed material 206 becomes constant.

The image projection system 200 is configured in the above manner, in which the mobile electronic device 201 is fixed to the support 202 and the printed material 206 is placed on a predetermined position of the dedicated screen 204 and this can thereby project an image corresponding to the printed material 206 from the projector 234 to the printed material 206 in the projection area 205.

In the image projection system 200, a positional relation between the projection area 205 and a position of the printed material 206 (position of an image in an imaging area) is uniquely determined. This enables an image appropriate for the projection area to be displayed without relative position adjustment. In addition, occurrence of a displacement between the image in the projection area and an image to be projected can be reduced.

The dedicated screen 204 and the support 202 are integrally formed, and therefore the probability that the light projected from the projector 234 of the mobile electronic device 201 may be irradiated to any area other than the dedicated screen 204 can be reduced. This enables the projector 234 to be used more safely.

The mobile electronic device 201 may be configured to determine whether the dedicated screen 204 is a projection area based on the image in the projection area captured by the camera 240 in the authentication process, and to set the projection permission when it is determined that the dedicated screen 204 is the projection area. Criteria as to whether the projection area is the dedicated screen 204 can be set by previously forming a two-dimensional code, a barcode, or the like as identification information on the dedicated screen and based on whether the identification information is provided in the image in the projection area. The guide display 210 can be used as identification information. In addition, information such as a distance to a projection plane and a shape thereof is acquired from the image in the projection area, and whether acquired conditions match set conditions may be set as the criteria.

The image projection system 200 does not require adjustment with the projection area, and, therefore, when the authentication process is not executed based on the image captured by the camera 240 or when an image to be projected is selected by the user, it can also be configured not to provide a camera in the mobile electronic device 201.

The mobile electronic device can also execute processes in combinations of the various functions from the first embodiment to the fifth embodiment. For example, after the authentication process is performed by combining the operation of the fourth embodiment with the operation of the second embodiment, the mobile electronic device 1 may change an image to be projected based on the user's voice. It can be also configured that the processes from the first embodiment to the fifth embodiment can be executed based on the setting used by a single mobile electronic device.

INDUSTRIAL APPLICABILITY

As explained above, the mobile electronic device and the image projection system according to the present invention are useful for those with a device such as a projector capable of projecting an image.

The invention claimed is:

1. A mobile electronic device, comprising:
an image projecting unit for projecting an image to a projection area;
a processing unit configured to
acquire information for a second image related to a first image placed in the projection area, and
cause the image projecting unit to project the second image based on the information acquired; and
a sound detecting unit for detecting a sound, wherein
the processing unit is configured to cause the image projecting unit to project the second image in synchronization with the sound detected by the sound detecting unit.

2. The mobile electronic device according to claim 1, wherein
the processing unit is configured to acquire the information for the second image based on the sound detected by the sound detecting unit.

3. The mobile electronic device according to claim 1, wherein
the processing unit is configured to change the second image to be projected when detecting, based on the sound detected by the sound detecting unit, that the first image in the projection area is changed.

4. The mobile electronic device according to claim 1, further comprising:
an imaging unit for capturing an image in a direction in which the image projecting unit projects an image, wherein
the processing unit is configured to
determine the first image in the projection area based on an image captured by the imaging unit, and
cause the second image to be projected based on a result of the determining.

5. A mobile electronic device, comprising:
an image projecting unit for projecting an image to a projection area;
a processing unit configured to
acquire information for a second image related to a first image placed in the projection area, and
cause the image projecting unit to project the second image based on the information acquired; and
an imaging unit for capturing an image in a direction in which the image projecting unit projects an image, wherein
the processing unit is configured to change the second image to be projected when detecting, based on the image captured by the imaging unit, that the first image in the projection area is changed.

6. The mobile electronic device according to claim 4, wherein
the processing unit is configured to
acquire identification information from the image captured by the imaging unit, and
determine the first image in a projection area based on the acquired identification information.

7. A mobile electronic device comprising:
an image projecting unit for projecting an image to a projection area;
an imaging unit for capturing a first image placed in the projection area; and
a processing unit configured to
determine the first image in the projection area based on information captured by the imaging unit,
acquire information for a second image related to the first image based on a result of the determining,
perform an authentication process using at least one of the information for the second image and the first image, and
cause the image projecting unit to project the second image when it is determined that projection is permitted in the authentication process.

8. The mobile electronic device according to claim 7, wherein
the processing unit is configured to,
as the authentication process,
detect information to be authenticated included in the first image, and
cause the second image to be projected when the information to be authenticated included in the first image matches information to be authenticated included in the information for the second image.

9. The mobile electronic device according to claim 7, further comprising:
a communication unit for communicating information with an external device, wherein
the processing unit is configured to, as the authentication process,
detect information to be authenticated included in the first image,
transmit the information to be authenticated to the external device through the communication unit, and
determine, when receiving projection permission from the external device, that the projection is permitted.

10. The mobile electronic device according to claim 8, wherein
the information to be authenticated is identification code printed on a printed material placed in the projection area.

11. The mobile electronic device according to claim 8, wherein
the information to be authenticated is a signature entered in a face of the projection area.

12. The mobile electronic device according to claim 7, wherein, upon detecting that the first image in the projection area is changed based on the image captured by the imaging unit, the processing unit is configured to acquire the information for the second image related to the changed first image, and perform the authentication process again.

13. The mobile electronic device according to claim 7, wherein
the processing unit is configured to
acquire identification information from the image captured by the imaging unit,
determine the first image in the projection area based on the acquired identification information, and
specify the second image related to the first image.

14. The mobile electronic device according to claim 7, wherein
the second image is an image related to the first image in the projection area.

15. The mobile electronic device according to claim 4, wherein
the processing unit is configured to,
based on the image captured by the imaging unit,
adjust a size of the second image to be projected, and
cause the second image to be projected to a predetermined position in the projection area.

16. The mobile electronic device according to claim 1, further comprising:
a connecting mechanism to be connected to a support.

17. An image projection system comprising:
the mobile electronic device according to claim 16;
the support for connecting to the connecting mechanism and fixing the mobile electronic device in a specific attitude; and
a screen fixed to the support and placed in the projection area.

18. The image projection system according to claim 17, wherein
the screen has a guide, indicating a placement position of a material on which the first image is printed, formed on the surface thereof.

* * * * *